United States Patent
Wu et al.

(10) Patent No.: US 8,728,991 B2
(45) Date of Patent: May 20, 2014

(54) CERAMIC PARTICLES WITH CONTROLLED PORE AND/OR MICROSPHERE PLACEMENT AND/OR SIZE AND METHOD OF MAKING SAME

(75) Inventors: Shanghua Wu, Houston, TX (US); Yuming Xie, Houston, TX (US); Christopher E. Coker, Houston, TX (US); Dilip Chatterjee, Houston, TX (US)

(73) Assignee: Oxane Materials, Inc., Houston, TX (US)

( * ) Notice: Subject to any disclaimer, the term of this patent is extended or adjusted under 35 U.S.C. 154(b) by 82 days.

(21) Appl. No.: 12/977,302

(22) Filed: Dec. 23, 2010

(65) Prior Publication Data

US 2011/0160104 A1    Jun. 30, 2011

Related U.S. Application Data

(60) Provisional application No. 61/291,649, filed on Dec. 31, 2009, provisional application No. 61/308,131, filed on Feb. 25, 2010.

(51) Int. Cl.
*C09K 8/74* (2006.01)
*E21B 43/267* (2006.01)

(52) U.S. Cl.
USPC ............... 507/269; 166/280.1; 166/280.2; 264/628

(58) Field of Classification Search
USPC ............ 507/269; 264/628; 166/280.1, 280.2
See application file for complete search history.

(56) References Cited

U.S. PATENT DOCUMENTS

| | | | |
|---|---|---|---|
| 3,690,622 A | 9/1972 | Brunner et al. | |
| 4,303,431 A | 12/1981 | Torobin | |
| 4,303,432 A | 12/1981 | Torobin | |
| 4,303,433 A | 12/1981 | Torobin | |
| 4,303,730 A | 12/1981 | Torobin | |
| 4,303,736 A | 12/1981 | Torobin | |
| 4,415,512 A | 11/1983 | Torobin | |
| 4,493,875 A | 1/1985 | Beck et al. | |
| 4,547,468 A | 10/1985 | Jones et al. | |
| 4,637,990 A | 1/1987 | Torobin | |

(Continued)

FOREIGN PATENT DOCUMENTS

| | | |
|---|---|---|
| EP | 0102761 A1 | 3/1984 |
| EP | 0207668 B1 | 1/1987 |
| JP | 2003137671 A | 5/2003 |

OTHER PUBLICATIONS

International Search Report and Written Opinion for PCT/US2010/061999, mailed Mar. 4, 2011, 14 pages.

(Continued)

*Primary Examiner* — Aiqun Li
(74) *Attorney, Agent, or Firm* — Kilyk & Bowersox, P.L.L.C.

(57) ABSTRACT

The present invention relates to lightweight high strength microsphere containing ceramic particles having controlled microsphere placement and/or size and microsphere morphology, which produces an improved balance of specific gravity and crush strength such that they can be used in applications such as proppants to prop open subterranean formation fractions. Proppant formulations are further disclosed which use one or more microsphere containing ceramic particles of the present invention. Methods to prop open subterranean formation fractions are further disclosed. In addition, other uses for the microsphere containing ceramic particles of the present invention are further disclosed, as well as methods of making the microsphere containing ceramic particles.

44 Claims, 6 Drawing Sheets

Microsphere with gradient boundary in a glass-ceramic, ceramic, metal or composites thereof matrix.

(56) References Cited

U.S. PATENT DOCUMENTS

| | | | |
|---|---|---|---|
| 4,671,909 A | 6/1987 | Torobin | |
| 4,725,390 A | 2/1988 | Laird et al. | |
| 4,743,545 A | 5/1988 | Torobin | |
| 4,777,154 A | 10/1988 | Torobin | |
| 5,183,493 A | 2/1993 | Brandau et al. | |
| 5,212,143 A | 5/1993 | Torobin | |
| 5,225,123 A | 7/1993 | Torobin | |
| 5,397,759 A | 3/1995 | Torobin | |
| 5,420,086 A | 5/1995 | Brandau et al. | |
| 5,472,648 A | 12/1995 | Alisch et al. | |
| 5,762,895 A | 6/1998 | Schwetz et al. | |
| 5,897,838 A | 4/1999 | Kempe | |
| 6,197,073 B1 | 3/2001 | Kadner et al. | |
| 6,330,916 B1 | 12/2001 | Rickards et al. | |
| 6,528,446 B1 | 3/2003 | Stensrud | |
| 6,632,527 B1 | 10/2003 | McDaniel et al. | |
| 7,220,454 B2 | 5/2007 | Barron et al. | |
| 7,459,209 B2 | 12/2008 | Smith et al. | |
| 7,491,444 B2 | 2/2009 | Smith et al. | |
| 7,521,389 B2 | 4/2009 | Shmotev et al. | |
| 7,867,613 B2 | 1/2011 | Smith et al. | |
| 7,883,773 B2 | 2/2011 | Smith et al. | |
| 7,887,918 B2 | 2/2011 | Smith et al. | |
| 7,914,892 B2 | 3/2011 | Smith et al. | |
| 2003/0148893 A1 | 8/2003 | Lunghofer et al. | |
| 2004/0012105 A1 | 1/2004 | Deppe et al. | |
| 2004/0147388 A1* | 7/2004 | Webber et al. | 501/128 |
| 2006/0016598 A1 | 1/2006 | Urbanek | |
| 2006/0177661 A1 | 8/2006 | Smith et al. | |
| 2007/0023187 A1 | 2/2007 | Canova et al. | |
| 2008/0135245 A1 | 6/2008 | Smith et al. | |
| 2009/0020902 A1 | 1/2009 | Tabuchi et al. | |
| 2009/0038797 A1 | 2/2009 | Skala et al. | |
| 2010/0032159 A1 | 2/2010 | Saini et al. | |

OTHER PUBLICATIONS

Evans, et al., "Some Effects of Cavities on the Fracture of Ceramics: II, Spherical Cavities," Journal of the American Ceramic Society, vol. 62, Issue 1, Jan. 1979, pp. 101-106.

Kawai et al., "Effect of Porosity and Microstructure on the Strength of Si3N4: Designed Microstructure for High Strength, High Thermal Shock Resistance, and Facile Machining," Journal of the American Ceramic Society, vol. 80, Issue 10, pp. 2705-2708.

* cited by examiner

20 μm

Microsphere with distinct boundary in a glass-ceramic, ceramic, metal or composites thereof matrix.

Pore in a glass-ceramic, ceramic, metal or composites thereof matrix.

Microsphere with gradient boundary in a glass-ceramic, ceramic, metal or composites thereof matrix.

CERAMIC PARTICLES WITH CONTROLLED PORE AND/OR MICROSPHERE PLACEMENT AND/OR SIZE AND METHOD OF MAKING SAME

This application claims the benefit under 35 U.S.C. §119(e) of prior U.S. Provisional Patent Application No. 61/291,649, filed Dec. 31, 2009, and prior U.S. Provisional Patent Application No. 61/308,131, filed Feb. 25, 2010, which are incorporated in their entirety by reference herein.

BACKGROUND OF THE INVENTION

The present invention relates to microsphere and/or pore containing ceramic particles used as proppants and for other uses. The present invention further relates to methods to make microsphere and/or pore containing ceramic particles to be used as proppants, reinforcing fillers, and other applications, such as where a combination of light weight and strength are required.

For many ceramic articles including ceramic particles, it is desirable to increase the strength of the ceramic body while decreasing its specific gravity (density). A method commonly used to decrease the specific gravity of a ceramic particle is to introduce porosity into the body of the ceramic. The introduction of pores into a ceramic body, however, typically causes a decrease in strength of the resulting pore containing ceramic particle. This effect is due in large part to the creation of stress concentrations in the ceramic created by the presence of the pores. The pores function as flaws in the surface structure that decreases the overall strength of the ceramic particle. The strength of pore containing ceramic materials decreases exponentially with increasing porosity. However, theoretical studies claim that strength will not show an exponential decay if the pores have a spherical shape and are smaller in size (Evans, et al., "Some Effects of Cavities on the Fracture of Ceramics: II, Spherical Cavities," JOURNAL OF THE AMERICAN CERAMIC SOCIETY, Volume 62, Issue 1, January 1979, Pages 101-106 and Chihiro Kawai and Akira Yamakawa, "Effect of Porosity and Microstructure on the Strength of $Si_3N_4$: Designed Microstructure for High Strength, High Thermal Shock Resistance, and Facile Machining," JOURNAL OF THE AMERICAN CERAMIC SOCIETY, Volume 80, Issue 10, pages 2705-2708).

A variety of granular particles are widely used as propping agents to maintain permeability in oil and gas formations. Three grades of proppants are typically employed: sand, resin-coated sand, and ceramic proppants. Conventional proppants offered for sale exhibit exceptional crush strength but also extreme density. Typical density of ceramic proppants exceeds 100 pounds per cubic foot. Proppants are materials pumped into oil or gas wells at extreme pressure in a carrier solution (typically brine) during the hydrofracturing process. Once the pumping-induced pressure is removed, proppants "prop" open fractures in the rock formation and thus preclude the fracture from closing. As a result, the amount of formation surface area exposed to the well bore is increased, enhancing recovery rates. Proppants also add mechanical strength to the formation and thus help maintain flow rates over time. Proppants are principally used in gas wells, but do find applications in oil wells.

Relevant quality parameters include: particle density (low density is desirable), crush strength and hardness, particle size (value depends on formation type), particle size distribution (tight distributions are desirable), particle shape (spherical shape is desired), pore size (value depends on formation type and particle size, generally smaller is better), pore size distribution (tight distributions are desirable), surface smoothness, corrosion resistance, temperature stability, and hydrophilicity (hydro-neutral to phobic is desired). Lighter specific gravity proppants can be desirable, which are easier to transport in the fracturing fluid and therefore can be carried farther into the fracture before settling out and which can yield a wider propped fracture than higher specific gravity proppants.

Proppants used in the oil and gas industry are often sand and man-made ceramics. Sand is low cost and light weight, but low strength; man-made ceramics, mainly bauxite-based ceramics or mullite based ceramics are much stronger than sand, but heavier. Ceramic proppants dominate sand and resin-coated sand on the critical dimensions of crush strength and hardness. They offer some benefit in terms of maximum achievable particle size, corrosion and temperature capability. Extensive theoretical modeling and practical case experience suggest that conventional ceramic proppants offer compelling benefits relative to sand or resin-coated sand for most formations. Ceramic-driven flow rate and recovery improvements of 20% or more relative to conventional sand solutions are not uncommon.

Ceramic proppants were initially developed for use in deep wells (e.g., those deeper than 7,500 feet) where sand's crush strength is inadequate. In an attempt to expand their addressable market, ceramic proppant manufacturers have introduced products focused on wells of intermediate depth.

Resin-coated sands offer a number of advantages relative to conventional sand. First, resin coated sand exhibits higher crush strength than uncoated sand given that resin-coating disperses load stresses over a wider area. Second, resin-coated sands are "tacky" and thus exhibit reduced "proppant flow-back" relative to conventional sand proppants (e.g. the proppant stays in the formation better). Third, resin coating typically increases sphericity and roundness thereby reducing flow resistance through the proppant pack.

Ceramics are typically employed in wells of intermediate to deep depth. Shallow wells typically employ sand or no proppant. As will be described in later sections, shallow "water fracs" represent a potential market roughly equivalent to the current ceramic market in terms of ceramic market size.

The family of non-oxide based ceramic materials, specifically the carbides and nitrides of metallic materials, display exceptional mechanical, thermal and chemical properties all of which in combination would be ideal candidates for a proppant system. Although, they display very high intrinsic failure strength, hardnesses, and fracture toughnesses, their apparent properties are highly dependent upon the microstructure of the ceramic material that develops during the sintering stage. Significant research has been conducted in the sintering of the carbide and nitride class of materials, the most important of which is the use of a glass forming liquid phase sintering aid to assist with the densification of the system. When using materials such as silicon carbide, care must be taken to avoid oxidation of the silicon carbide. The production of silicon dioxide and either carbon monoxide or carbon dioxide weakens the resulting proppant. Although, the liquid phase sintering approach assists with the densification, the properties of such a system are less than optimal and fail to reach the intrinsic properties that these materials are capable of, due primarily to the effects of a relatively weak phase existing at the grain boundaries of the ceramic material. In addition, with the liquid phase sintering approach, a high level of shrinkage occurs during sintering. The shrinkage is dependent upon a number of parameters, the most critical of which is particle size. Typically the shrinkage can approach 20% or higher.

Another approach to improve the sintering and consequently the properties of such ceramic systems has been with a reaction mechanism that forms the appropriate carbide and/or nitride phase directly from the metallic phase. In this method, a preform of the appropriate metal is produced, with approximately 25-30% percent residual porosity. The component is then subjected to thermal treatments under the appropriate atmosphere to induce the formation of the carbide or nitride phase. During the formation of the carbide or nitride phase, a volume increase occurs, which serves to close the residual porosity and yield a highly dense ceramic body that is more or less pore free. By carefully controlling the initial porosity of the preform, the volume expansion associated with the formation of the carbide or nitride phase will completely fill all internal porosity placement and/or size and the outer volume of the preform will remain unchanged. This process is termed net shape forming.

While having porosity in proppants can have advantages with respect to lowering the density or specific gravity of the overall proppant, as stated above, the pores can contribute to a lower crush strength of the overall proppant. It would be advantageous to form pores that not only lower the overall density or specific gravity of the proppant, but also do not contribute to loss of strength (e.g., crush strength) of the overall proppant.

SUMMARY OF THE INVENTION

A feature of the present invention is to provide a microsphere and/or pore containing ceramic particle having a superior balance of crush strength and/or buoyancy as shown by specific gravity.

A further feature of the present invention is to provide a proppant having suitable crush strength and/or buoyancy as shown by specific gravity.

A further feature of the present invention is to provide a proppant that can overcome one or more of the disadvantages described above.

A further feature of the present invention is to provide a high degree of control over the placement, size, and/or size distribution of microspheres and/or pores in the ceramic particle by providing one or more microsphere and/or pore formers of small size and uniform size.

A further feature of the present invention is to provide a microsphere and/or pore containing ceramic particle in which the microspheres and/or pores are of very small size and very uniform size.

A further feature of the present invention is a microsphere and/or pore containing ceramic particle in which a majority of the microspheres and/or pores are not in contact with another microsphere and/or pore.

A further feature of the present invention is the use of a glassy phase in the green body from which the microsphere and/or pore containing ceramic particle is sintered, wherein the glassy phase improves the ability to create microspheres and/or pores that are of very small size and very uniform size.

A further feature of the present invention is to provide a microsphere former and/or pore former that provides a high degree of control over the size and size distribution of microspheres and/or pores in a glass-ceramic, ceramic, metal material, or composites thereof. A microsphere former is a particulate material introduced into a green body prior to sintering which produces an in situ microsphere in the resulting glass-ceramic, ceramic, metal material or composite thereof. A pore former can be used instead of or in addition. A distinction is made here between a microsphere and a pore. FIG. 8 shows a pore in a matrix material. The pore is simply a void inside of a glass-ceramic, ceramic, or metal matrix. FIG. 9 by contrast shows a microsphere in a glass-ceramic, ceramic, or metal matrix. The microsphere is characterized by a void volume surrounded by a material different from the glass-ceramic, ceramic, or metal matrix. In FIG. 9, there is a distinct boundary between the wall of the microsphere and the surrounding glass-ceramic, ceramic, or metal matrix. FIG. 10 shows a microsphere wherein the wall of the microsphere has partially diffused into the surrounding glass-ceramic, ceramic, or metal matrix. In FIG. 10, there is a gradient boundary between the wall of the microsphere and the surrounding glass-ceramic, ceramic, or metal matrix. As one moves radially from the interior of the microsphere into the surrounding glass-ceramic, ceramic, or metal matrix, the composition of the matrix material changes from mostly the wall of the microsphere to mostly the glass-ceramic, ceramic, or metal matrix material. The structure described in FIG. 10 is a microsphere because there is a boundary, distinct or graded, moving radially from the void into the glass-ceramic, ceramic, or metal matrix. In a pore, no such boundary or transition region exists.

A further feature of the present invention is a microsphere former that produces an in situ microsphere with a high strength surface embedded in a glass-ceramic, ceramic, metal matrix or composites thereof.

A further feature of the present invention is a microsphere former that produces in situ microspheres in a glass-ceramic, ceramic, metal matrix or composites thereof that blunts cracks in the glass-ceramic, ceramic or metal matrix.

A further feature of the present invention is a microsphere former and/or pore former that provides control of when and how the microsphere former and/or pore former reacts during the process of sintering a glass-ceramic, ceramic, metal matrix or composites thereof.

A further feature of the present invention is a microsphere former and/or pore former that is easily dispersed in a green body material.

A further feature of the present invention is a microsphere former and/or pore former that is resistant to agglomeration during the green body formation process. The microsphere former and/or pore former may be coated with silica, alumina, silanes, organo silicons, hydrophobic materials, hydrophilic materials, and any combination thereof. The surface of the microsphere former and/or pore former may also be made to contain a static electrical charge.

The present invention provides methods to make microsphere formers and/or pore formers that are uniform in size, shape, and structure, whose properties can be utilized to form in situ microspheres or pores in glass, glass-ceramics, ceramics or composites thereof. Specifically, the microsphere former (or pore former) size and size distribution can be tuned to meet material performance specifications, such as high mechanical strength at low specific gravity.

The present invention in part also relates to a method of making a microsphere former (or a pore former) from microsphere former (or a pore former) of a predetermined size, selecting a subset of the sized microsphere (or pore) former templates, and optionally coating the sized microsphere (or pore) former with inorganic or organic materials. The microsphere (or pore) former size, size distribution, and inorganic or organic coating materials are selected to provide one or more of the features described herein.

As an example, the present invention relates to a method of making a lightweight high strength ceramic particle from a green body material comprising a ceramic or ceramic precursor combined with a microsphere former (and/or pore former) material such as silicon carbide, forming the green body material, for instance, into a spherical, donut-shaped, rod-like, or star-shaped green body, sintering the green body under an atmosphere containing oxygen to form a high strength ceramic particle via liquid phase or solid phase fusion. In addition, the sintering process optionally oxidizes at least a portion of the microsphere (and/or pore) former to form a viscous glassy phase material that forms at least a part of the boundary or outer surface of the microsphere and a gas. The gas pressure created in the sintering step is contained by the viscous glassy phase material to form a bubble, pore, or microsphere in the ceramic particle. The oxidation of the microsphere (or pore) former in this manner provides the unexpected benefit of providing a high degree of control over the size and size distribution of the microspheres (or pores) in the ceramic particle. To produce microspheres (or pores) of the desired size and size distribution, the number, the size, the size distribution and the shape of the microsphere (or pore) former is controlled before it is combined with the ceramic precursor. The controlled morphology of the microsphere (or pore) former along with the time, temperature and pressure associated with the oxidation of the microsphere (or pore) former produces a microsphere (and/or pore) containing ceramic particle with a superior balance of crush strength and specific gravity.

Another aspect of the present invention incorporates a template such as a cenosphere, synthetic cenosphere, polymer bead or micro glass sphere into the green body material. The incorporation of a template can produce a central void in the ceramic particle allowing further reduction of specific gravity. When a template is used, formation of the green body is typically accomplished by coating the green body material onto the template, such as by spray drying or fluidized bed coating, or other coating techniques.

Another aspect of the present invention is the ability to produce controlled radial distributions of microspheres (and/or pores) in the ceramic particle.

The present invention further relates to products made by the processes of the present invention such as proppants. The proppant can have, for example, a specific gravity of from about 1.0 to about 3.0 and a crush strength of from about 10 MPa to about 180 MPa, or a specific gravity of from about 1.8 to about 2.25 and a crush strength of from about 10 MPa to about 100 MPa, or other combinations. The proppant can have a microsphere (and/or pore) amount, for example, of from about 6% to about 40% by volume of proppant (including any optional central void space) and at least 95% (by number) of proppant microspheres (and/or pores) having a microsphere (or pore) size of from about 0.1 µm to about 10 µm, or a microsphere (or pore) amount of from about 6% to about 25% by volume of proppant and at least 95% (by number) of proppant microspheres (or pores) having a microsphere (or pore) size of from about 1.0 µm to about 5 µm, or other combinations. For purposes of the present invention, the microsphere or pore size is a diameter or the longest straight line distance within the microsphere or pore. The microsphere or pore size can be a volume in cubic microns.

Also, the present invention relates to a method of making a proppant comprising a green body material comprising a ceramic or ceramic precursor comprising cordierite, mullite, bauxite, silica, spodumene, clay, silicon oxide, aluminum oxide, sodium oxide, potassium oxide, calcium oxide, zirconium oxide, lithium oxide, iron oxide, spinet steatite, a silicate, a substituted alumino silicate clay, an inorganic nitride, an inorganic carbide or a non-oxide ceramic or any mixtures thereof and a microsphere-former (and/or pore former), for instance, comprising a carbide, silicon carbide, a nitride, an oxynitride, a sulfide, a halide, a boride, carbon black, a carbon toner, crushed coal, a carbonate, a nitrate, a sulfate, a sulfite, a chlorate, a bromate, an iodinate, borax, a phosphate, a peroxide, a persulfide, a perchlorate, a perbromate, an ammonium salt, an organometalic, an organometalic composite, a metallic alloy with at least one metal capable of forming an oxide vapor, a microorganism or any combination thereof. As an option, the green body material can include or be one or more sedimentary and/or synthetically produced materials.

The green body material can comprise the ceramic or ceramic precursor in a major amount (by weight) and the microsphere-former (and/or pore former) in a minor amount (by weight). The green body material can comprise, for example, from about 0.1% to about 35% by weight, or from about 0.1% to about 15% by weight, microsphere (and/or pore) former based on total weight of ceramic or ceramic precursor and microsphere-former (and/or pore former). Use of a sintering temperature, such as in the range of from about 900° C. to about 1,500° C., in SiC and metal oxide composites can provide formed $SiO_2$ having a suitable viscosity to permit a hollow structure to be blown, so that a microsphere (and/or pore) containing ceramic particle can be provided. Also, the silicon carbide can have a sufficiently small particle size and large surface area to allow oxidation to proceed as desired. For example, silicon carbide having a particle size of from about 0.1 µm to about 1.0 µm and a BET surface area of from about 1 $m^2/g$ to about 20 $m^2/g$ can be used.

The present invention further relates to proppant products made by the processes of the present invention. These proppant products can have a specific gravity, crush strength, and/or microsphere (and/or pore) placement and/or size such as indicated. A low specific gravity, high strength proppant composition for use in hydraulic fracturing of subterranean formation surrounding oil wells, gas wells and similar bore holes is provided, and other products based on the present proppants.

The present invention also relates to membrane separation processes to control particle sizes for the starting materials used to form the green body. The membrane separation processes can provide an extremely accurate way to control the size and/or size distribution of one or more of the starting materials. The use of one or more membrane filtration devices permits a very accurate "sieve cut" of choice for particle sizes which then permits the formation of green bodies having the desired starting particle size distributions. Such control leads to proppants and other materials that have the product performance desired and reduces flaws and failure rates in proppants.

In addition, the present invention relates to a variety of uses for the microsphere (and/or pore) containing ceramic particles as explained herein. The present invention also relates to a method to prop open subterranean formation fractions using one or more proppants of the present invention, which are preferably contained in proppant formulations. The present invention further relates to the use of the microsphere (and/or pore) containing ceramic particle for the uses described herein, including, but not limited to, proppants for hydrocarbon recovery, matrix materials, concrete formulations, composite reinforcement phase, thermal insulating material, electrical insulating material, abrasive material, catalyst substrate and/or support, chromatography column materials (e.g., column packings), reflux tower materials (e.g., reflux tower packings, for instance, in distillation columns), and the like.

It is to be understood that both the foregoing general description and the following detailed description are exemplary and explanatory only and are intended to provide a further explanation of the present invention, as claimed.

The accompanying drawings, which are incorporated in and constitute a part of this application, illustrate an embodiment of the present invention and together with the description, serves to explain the principles of the present invention.

DETAILED DESCRIPTION OF THE PRESENT INVENTION

Figure 1:
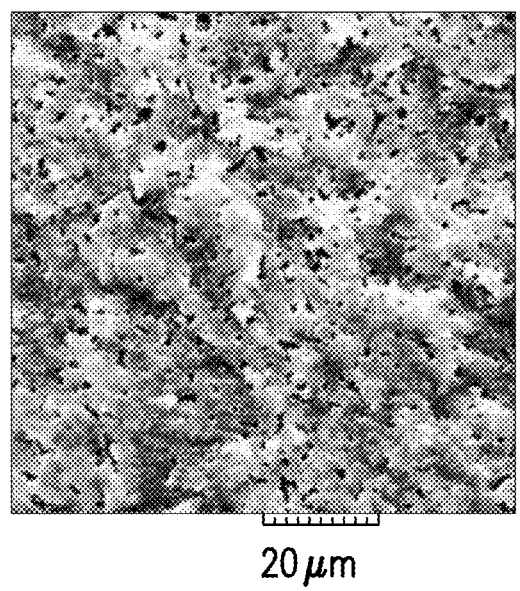
FIG. 1 is an SEM image showing a fractured surface of a split-tested pellet formed with a pellet composition of 10% SiC in cordierite.
Figure 2:
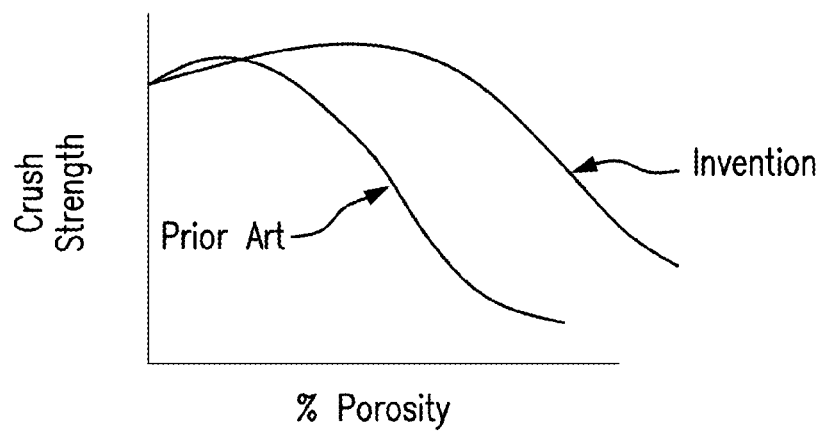
FIG. 2 is a crush strength vs microsphere (or pore) placement and/or size diagram showing the relationship between these two variables and showing an advantage of the present invention.
Figure 3:
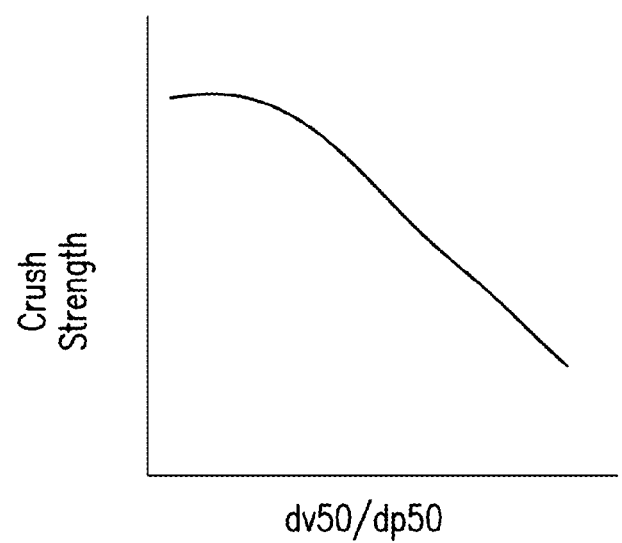
FIG. 3 is a diagram showing the relationship between the ratio of microsphere (or pore) size to particle size ($d_{v50}/d_{p50}$) to crush strength and its significance in the present invention.

The present invention relates to methods for producing particles, such as ceramic particles, for example microsphere containing ceramic particles and/or pore containing ceramic particles. The present invention further relates to particles, such as ceramic particles, for example microsphere containing ceramic particles and/or pore containing ceramic particles. It is to be understood for purposes of the present invention that these particles can be useful in many applications, including, but not limited to, as proppants for hydrocarbon recovery operations. It is to be further understood that the term "proppant" or "proppants" while having an understood meaning in hydrocarbon recovery, is used herein to not be limiting to its manner of use. The proppant or proppants described herein are useful in other applications, such as the examples provided in the paragraphs preceding the examples. For purposes of the present invention, the present invention relates to microsphere containing ceramic particles and/or pore containing ceramic particles and methods of making the same and using the same. Set forth below are various details of the present invention. However, it is to be understood that while microsphere containing particles and the formation of microspheres are described, it is understood that each and every one of these embodiments and features apply to pore formers, the formation of pore forming ceramic particles, and their uses. With the present invention, microspheres can be formed, pores can be formed, or both microspheres and pores can be formed and present in the ceramic particles or proppants of the present invention. The difference between a microsphere and a pore is described above and applies equally here. To avoid redundancy, the description below additionally or alternatively applies to pore containing particles/proppants, the formation of pores in particles/proppants, and uses thereof.

The present invention provides methods to make microsphere containing particles, such as microsphere containing ceramic particles that have a controlled placement and/or a controlled distribution and/or a controlled size and/or a controlled formation. One or more of these controlled properties provides particles that are very useful in a number of applications, including as proppants for hydrocarbon recovery. The one or more controlled properties preferably provides micro sphere containing particles having high strength (e.g., crush strength) and/or low weight (e.g., low specific gravity) and/or more uniform strength through the particle or a portion of the particle (e.g., outer radius, outer surface, and the like). The term "controlled" herein preferably means that the one or more properties are "dialed in" due to the process(es) of the present invention, and a desired size (e.g., microsphere size) and/or a desired distribution (e.g., concentration of microspheres and/or size distribution of microsphere), and/or a desired placement (e.g., location of microsphere in particle) can be achieved and controlled with the present invention as further described herein. This ability to achieve control of one or more of these properties is desirable for purposes of achieving desirable strength and/or weight of the particles and is desirable for providing a consistent product to users of the particles, and/or is desirable to provide particles to meet customer needs based on the particular project since the particles can be made based on the "dialed in" specifications that are achievable herein.

It is to be understood, for purposes of the present invention, that a microsphere is a microsphere that has a micron or sub-micron diameter or size. The microsphere can have a non-spheroidal shape. The microsphere has a boundary (e.g., wall) or outer surface that defines the microsphere. Unlike conventional pores, wherein the pore is simply defined by the void that is created in a matrix and the matrix defines the outer parameter of the pore, with the microspheres of the present invention, the microsphere has its own discernable outer surface or boundary that defines the microsphere. This can be accomplished, for instance, in the present invention because the microspheres are formed in situ, and, during the in situ process, at least one of the reaction products forms a shell, or outer surface, or boundary that defines at least part of, if not substantially or entirely, the boundaries of the microsphere. The micro sphere can be hollow in the interior of the microsphere or have one or more voids in the interior of the microsphere or can be completely solid. Preferably, the microsphere has a specific gravity or lower density than the overall proppant and/or has a lower density or lower specific gravity than one or more or all of the other materials that form the proppant. For instance, the microsphere can have a specific gravity or density of at least 10%, at least 20%, least 30%, at least 40%, at least 50%, at least 75%, at least 100%, at least 150%, at least 200%, at least 250%, or at least 300% lower in density or specific gravity than the overall proppant and/or one or more materials that form the proppant other than the microsphere. The micro spheres typically are present as a plurality of microspheres that can be uniformly dispersed in the overall proppant throughout or in selected regions, such as radial regions or layers that form the proppant. The present invention permits this controlled ability to provide desired placement of the microspheres in the proppant.

In more detail, and purely as examples, methods of the present invention are described below. The various methods or steps thereof or parts thereof, or materials used, as described herein, can be combined or modified with one or more other methods or parts thereof described herein.

The present invention, in part, involves a method for producing a microsphere containing ceramic particle(s). The method includes, but is not limited to, forming a green body from a green body material that includes at least one ceramic or ceramic precursor and at least one microsphere former. The majority of the microsphere formers can be distributed in the green body such that the majority of the microsphere formers are not in contact with each other. The micro sphere formers can have a substantially uniform shape and/or size. The method further includes sintering the green body. The sintering conditions are preferably such that under the sintering conditions, a sintered body is formed having gas bubbles contained therein. The gas bubbles are optionally at least partially (e.g., partially, nearly fully, or fully) surrounded by at least one glassy compound that defines the boundary of the microsphere or is the wall of the microsphere. With this method, a majority (e.g., over 50% in number of the individual gas bubbles present in the particle or particles) of the gas bubbles (and thus the microspheres and/or pores) are preferably not in contact with each other.

The present invention further relates to methods to use microsphere formers with features as described herein in the production of glass-ceramics, ceramics, metals or composites thereof.

The present invention relates to a method to engineer microsphere formers to meet the technical requirements of a material system. A fugitive microsphere former is a microsphere former which is removed before and/or during the sintering process by chemical transformation to a gas and/or by thermal decomposition. For a fugitive phase, the microsphere former, the control of microsphere former size, and/or the shape are helpful to achieving a balance of properties, such as strength and specific gravity. Narrow size distribution is highly desirable.

The present invention also relates to a method to chemically modify the surface of a microsphere former. For both natural and synthetic microsphere formers, chemicals can be added to modify the microsphere former surface, for instance, to improve its dispersion behavior in a slurry. The chemical modification makes the slurry system more stable, improves dispersion over a wider pH range, and/or prevents incompatibility among the various materials.

The present invention also relates to the use of reactive microsphere formers in chemical reactions that occur during the reactive sintering process. A reactive microsphere former is a microsphere former which reacts chemically with one or more materials during the sintering process to form one or more new materials, wherein such new materials may be a solid, liquid, gas or any combination thereof. During the sintering process at elevated temperature, the reactive microsphere former can react with any one component or all components of the glass-ceramic, ceramic, or metal matrix materials to produce one or more gases and form an in situ coating (e.g., wall) on the microsphere former. The reaction products can react further with the components in the glass-ceramic, ceramic, or metal matrix.

The present invention also relates to a method wherein the reactive microsphere formers can be converted to a liquid phase upon heating. The liquefied materials can be transported into the glass-ceramic, ceramic or metal matrix material by forces such as capillary force, concentration gradients and/or chemical reaction of liquefied phase with surrounding materials.

The present invention also relates to coating a microsphere former with one or more inorganic and/or organic materials. The coating(s) can form multiple layers with the same or different chemical compositions in each layer. Upon heating, the coating materials can react with the gases and/or the surrounding glass-ceramic, ceramic or metal matrix material to form localized glassy materials. Due to surface tension of the localized glassy material, the shape of the resultant microspheres or pores can have a high degree of sphericity.

The present invention also relates to a method wherein the microsphere former can be partially liquefied and transported (at least in part) to the glass-ceramic, ceramic, or metal matrix to act as a sintering aid or flux.

The present invention also relates to the use of hollow particles as microsphere formers. The hollow microsphere former may be or include cenospheres, polymer microspheres, glass microspheres or any combination thereof. The hollow microsphere formers can be screened and selected to provide microsphere formers of relatively uniform size. The hollow microsphere formers may optionally be coated to provide improved dispersion, improved strength at the microsphere wall, and/or other desirable characteristics.

In the methods of the present invention, the ceramic or ceramic precursor can be or include cordierite, mullite, bauxite, silica, spodumene, silicon oxide, aluminum oxide, sodium oxide, potassium oxide, calcium oxide, zirconium oxide, lithium oxide, iron oxide, spinet steatite, a silicate, a substituted alumino silicate clay, an inorganic nitride, an inorganic carbide, a non-oxide ceramic or any combination thereof. The ceramic or ceramic precursor can be or include one or more sedimentary materials (e.g., feldspar, quartz, amphiboles, clay, shale, siltstone, sandstone, conglomerates, breccias, quartz sandstone, arkose, greywacke, quartz arenites, lithic sandstone or any combinations thereof) and/or synthetically produced materials (e.g., cenospheres). As an option, the ceramic or ceramic precursor is not igneous or metamorphic materials and/or the proppant of the present invention has the complete absence or substantial absence (e.g. less than 1% by weight of proppant) of igneous or metamorphic materials, which can be less suitable for certain proppant uses.

The ceramic or ceramic precursor can have any particle size distribution. For instance, the ceramic or ceramic precursor can have a particle size distribution, $d_{gs}$, from about 0.5 to about 15, wherein, $d_{gs}=\{(d_{g90}-d_{g10})/d_{g50}\}$ wherein $d_{g10}$ is a particle size wherein 10% of the particles have a smaller particle size, $d_{g50}$ is a median particle size wherein 50% of the particles have a smaller particle size, and $d_{g90}$ is a particle size wherein 90% of the particle volume has a smaller particle size. The particle size distribution, $d_{gs}$ can be from 0.5 to 15, from 0.75 to 12, from 1 to 6, from 1 to 10, from 1.5 to 8, from 2 to 8, from 2.5 to 8, from 2.5 to 6, from 3 to 10, from 1 to 8, from 0.5 to 10, from 0.5 to 1, from 0.5 to 2, from 0.5 to 3, from 0.5 to 4, from 0.5 to 5, from 0.5 to 6, from 0.5 to 7, from 0.5 to 8 or any various combination of ranges provided herein.

The median particle size, $d_{g50}$, of the ceramic or ceramic precursor can be of any median size, for instance, from about 0.01 µm to about 100 µm, wherein $d_{g50}$ is a median particle size where 50% of the particles of the distribution have a smaller particle size. The median particle size, $d_{g50}$, of the ceramic or ceramic precursor can be from about 1 µm to about 5 µm, from 0.01 µm to 100 µm, from 0.05 µm to 100 µm, from 0.1 µm to 100 µm, from 0.5 µm to 100 µm, from 0.75 µm to 100 µm, from 1 µm to 100 µm, from 2 µm to 100 µm, from 5 µm to 100 µm, from 10 µm to 100 µm, from 20 µm to 100 µm, from 0.01 µm to 10 µm, from 0.05 µm to 10 µm, from 0.1 µm to 10 µm, from 0.5 µm to 10 µm, from 0.75 µm to 10 µm, from 1 µm to 10 µm, from 2 µm to 10 µm, from 5 µm to 10 µm, from 0.01 µm to 5 µm, from 0.05 µm to 5 µm, from 0.1 µm to 5 µm, from 0.2 µm to 5 µm, from 0.3 µm to 5 µm, from 0.4 µm to 5 µm, from 0.5 µm to 5 µm, from 0.75 µm to 5 µm, from 2 µm to 8 µm, from 2 µm to 6 µm, from 1 µm to 20 µm, from 1 µm to 30 µm, or any various combination of ranges provided herein, wherein $d_{g50}$ is a median particle size where 50% of the particles of the distribution have a smaller particle size.

In the present invention, the ceramic or ceramic precursor can be present in the green body in any amount, such as from about 50% by weight to about 99.9% by weight of the green body, from 50% to 99.9%, from 55% to 99.5%, from 60% to 99%, from 65% to 98%, from 70% to 97%, from 75% to 95%, from 80% to 90%, from about 90% to about 99.9%, or any various combination of ranges provided herein, wherein the % is a weight percent based on the weight of the green body.

The microsphere former that is used in the present methods can be any microsphere former or microsphere forming material that is capable of forming a microsphere as described herein. Preferably, as an option, the microsphere former can be capable of forming a glassy compound(s), for instance in the particle. As an example, the microsphere former can form a glassy compound(s) and a gas, for instance, in the particle. The gas can be produced by various techniques, such as by a chemical reaction, for instance a chemical reaction(s) of the microsphere former with an oxidizing agent. The oxidizing agent can be or include oxygen, air, a peroxide or any combination thereof. The gas can be or include carbon monoxide, carbon dioxide or any combination thereof.

The microsphere former can be or include a variety of materials that can form microspheres. For instance, the microsphere former can be or include a carbide, a nitride, an oxynitride, a sulfide, a halide, a boride or any combination thereof. The microsphere former can be or include an organometallic compound(s) or a composite thereof. The microsphere former can be or include a metallic alloy with at least one metal capable of forming an oxide vapor. For instance, the microsphere former can be a silicon carbide(s). The microsphere former can be or include a combustible inorganic or organic material. For instance, the combustible inorganic or organic material can be or include cellulose-based material, wood-based material, and/or carbonaceous material, or any combination thereof. The combustible inorganic or organic material can be or include crushed tree nut shell material, carbon black, carbon fiber, charcoal, activated carbon, carbon toner, graphite, coal, paper, plant material, starch, starch granules, flour, or any combination thereof. The microsphere former can be or include a carbonate(s), a nitrate(s), a sulfate(s), a sulfite(s), a chlorate(s), a bromate(s), an iodinate(s), borax, a phosphate(s), a peroxide(s), a persulfide(s), a perchlorate(s), a perbromate(s), an ammonium salt(s), or any combination thereof. The microsphere former can be or include a microorganism, for instance, one that produces and/or releases a gas.

The microsphere former can have a surface area (BET) of from about 0.5 m²/g to about 100 m²/g. For example, the silicon carbide can have a surface area (BET) of from about 0.5 m²/g to about 100 m²/g. Other surface areas within this range or outside of this range (below or above) can be used. Other surface areas that can be used, include, but are not limited to, 0.5 m²/g to about 50 m²/g, 0.5 m²/g to about 25 m²/g, 0.5 m²/g to about 10 m²/g, 1 m²/g to about 25 m²/g, 1 m²/g to about 15 m²/g, 1 m²/g to about 10 m²/g, 5 m²/g to about 50 m²/g, 5 m²/g to about 25 m²/g, about 8 m²/g to about 15 m²/g. or any various combinations within these ranges. The BET ranges are applicable to the microsphere former in general and/or to silicon carbide. Preferably, with the microsphere former(s) that are used in the present invention, the microsphere former can at least partially (e.g., partially, almost fully, or fully) decompose to generate a gas. The microsphere former can swell, for instance, in the presence of moisture. As stated, the microsphere former further contributes to the formation of the wall or boundary defining the microsphere. The microsphere former can form the wall or boundary of the microsphere during the reaction or decomposing alone or with at least a part of the green body material that surrounds the microsphere former.

The microsphere (and/or pore) former can have any particle size distribution. For instance, the microsphere former can have a particle size distribution, $d_{fs}$, from about 0.5 to about 5.0, wherein, $d_{fs}=\{(d_{f90}-d_{f10})/d_{f50}\}$ wherein $d_{f10}$ is a particle size wherein 10% of the particles have a smaller particle size, $d_{f50}$ is a median particle size wherein 50% of the particles have a smaller particle size, and $d_{f90}$ is a particle size wherein 90% of the particles have a smaller particle size. The microsphere former can have a particle size distribution, $d_{fs}$, of from about 0.5 to about 1.5, from 0.5 to 5, from 0.5 to 4.5, from 0.5 to 4, from 0.5 to 3.5, from 0.5 to 3, from 0.5 to 2.5, from 0.5 to 2, from 0.5 to 1.5, from 0.5 to 1, from 0.75 to 5, from 0.75 to 2.5, from 0.75 to 2, and any various combinations of ranges provided herein.

The median particle size, $d_{f50}$, of the microsphere (and/or pore) former can be from about 0.01 µm to 50 µm (or between this range), wherein $d_{f50}$ is a median particle size where 50% of the particles of the distribution have a smaller particle size. The median particle size, dm, of the microsphere former can be from about 0.2 µm to about 5 µm, from 0.01 µm to 50 µm, from 0.01 µm to 40 µm, from 0.01 µm to 30 µm, from 0.01 µm to 20 µm, from 0.01 µm to 10 µm, from 0.01 µm to 5 µm, from 0.05 µm to 50 µm, from 0.1 µm to 50 µm, from 1 µm to 50 µm, from 0.1 µm to 25 µm, from 0.1 µm to 10 µm, or any various combinations of ranges herein, wherein $d_{f50}$ is a median particle size where 50% of the particles of the distribution have a smaller particle size.

The microsphere (and/or pore) former can be present in an amount of from about 0.01% by weight to about 90% by weight, based on the weight of the green body. The microsphere former can be present in an amount of from about 0.01% by weight to about 50% by weight, from 0.01% to 40%, from 0.01% to 30%, from 0.01% to 20%, from 0.01% to 10%, from 0.01% to 5%, from 0.1% to 90%, from 0.1% to 50%, from 0.1% to 10%, from 1% to 90%, from 1% to 50%, from 1% to 10%, from 5% to 90%, from 5% to 50%, from 5% to 15%, from 10% to 90%, from 10% to 50%, from 10% to 25%, and any various combinations of these ranges, wherein the % are weight %, based on the weight of the green body.

The glassy compound that is present or formed can be any type of glassy compound(s). For instance, the glassy compound can be or include a silicon dioxide. The viscosity of the glassy compound when present and when formed can be beneficial to achieving desirable properties such as formation of the microsphere (and/or pore), and/or obtaining the desirable integrity of the microsphere that is formed. The viscosity of the microsphere (and/or pore) former can be from about 1×10$^5$ Pa·s to about 2×10$^6$ Pa·s, or from about 6×10$^5$ Pa·s to about 8×10$^5$ Pa·s, or from about 5×10$^5$ Pa·s to about 1×10$^6$ Pa·s. The viscosity of the silicon dioxide can be from about 1×10$^5$ Pa·s to about 2×10$^6$ Pa·s, or from about 6×10$^5$ Pa·s to about 8×10$^5$ Pa·s, or from about 5×10$^5$ Pa·s to about 1×10$^6$ Pa·s.

The green body or the material used to form the green body can include at least one slurrying agent. The slurrying agent can be or include water, an organic solvent or any combination thereof.

The green body or the material used to form the green body can include at least one sintering promoter. The sintering promoter can be or include one or more sintering aids, glassy phase formation agents, grain growth inhibitors, ceramic strengthening agents, crystallization control agents, or phase formation control agents, or any combination thereof. The sintering promoter can be or include zirconium, iron, magnesium, alumina, bismuth, lanthanum, silicon, calcium, cerium, yttrium, a silicate, a borate or any combination thereof. The sintering promoter can be or include a compound containing zirconium, iron, magnesium, alumina, bismuth, lanthanum, silicon, calcium, cerium, yttrium, a silicate, a borate or any combination thereof.

The green body or the material used to form the green body can include yttrium oxide, cerium oxide or any combination thereof. The green body or the material used to form the green body can include one or more binders. The binder can be or include a wax, a starch, polyvinyl alcohol, a sodium silicate solution, a low molecular weight functionalized polymer or any combination thereof. The green body or the material used to form the green body can include a dispersant. The dispersant can be or include one or more surfactants.

The green body can be formed from the same material throughout (a single body) or can be or include at least one or more layers as part of the green body. Each layer can be the same composition or materials, or can be different from each other. Each layer can be the same or different composition or materials and can be the same or different from the portion of the green body that the layers are present on. When one or more layers are present, each layer can comprise the same or different $d_{gs}$, $d_{g50}$, $d_{fs}$, and/or $d_{f50}$ from each other and/or from the portion of the green body that the layer(s) are present on. The circumference of the layer can have the same or about the same radius from the center of the green body and can have uniform thickness or substantially uniform thickness about the circumference of the layer.

The green body can be produced by spray drying, die pressing, extrusion coating, fluidized bed coating, mixer granulation, high shear mixing, roller compaction injection molding, tumbling or any combination thereof.

The green body can further include a hollow template (the hollow template can have one or multiple voids). The green body can be formed over or around at least one template so that the green body encapsulates or surrounds the template. The template can be any template material (e.g., hollow or solid, one or more voids, microsphere containing or non-microsphere containing, porous or non-porous), such as a cenosphere, micro glass bead, synthetic cenosphere, polymer bead, or any combination thereof. The hollow template can be or include a cenosphere, a micro glass sphere, a synthetic cenosphere, a polymer bead or any combination thereof, or more than any one of these.

The green body can be formed by deposition of the green body material onto one or more hollow templates. The deposition can be achieved using a variety of techniques, such as, but not limited to, spray drying, fluidized bed coating or any combination thereof. As an example, the spray drying can be performed at an air temperature of from about 40° C. to about 90° C., and/or an air flow of from about 90 liters per minute to about 150 liters per minute, and/or a nozzle air pressure of from about 10 psig to about 25 psig. Any one or more of these parameters can be above or below these ranges and these ranges are provided as exemplary.

The sintering can occur in any device used for sintering or similar purpose. For instance, the sintering can be achieved with (or take place in) induction heating, rotary kiln, microwave, tunnel kiln, shutter kiln, electric furnace, gas furnace, convection furnace, self-propagation high temperature sintering, radiation, plasma, spark plasma, roller hearth, chain hearth, pusher sled, vertical shaft furnace or any combination thereof. The sintering, as an option, can create reactive diffusion and/or local melting of the ceramic or ceramic precursor in the green body.

With respect to the sintering of the green body, the sintering can be performed in the presence of a gas or a mixture of gases. The gas can be or include from about 100 ppm to about 100% by weight oxygen. The gas can be or include from about 250 ppm to about 90% by weight oxygen. The gas can be or include from about 500 ppm to about 79% by weight oxygen. The gas can be or include from about 1000 ppm to about 50% by weight oxygen.

As an option, during the sintering, yttrium oxide, cerium oxide and any combination thereof can be introduced or present into the sintering furnace as a separate component.

The sintering of the green body can be performed under elevated pressure, such as a pressure of from about 0.1×10$^5$ Pa to about 10×10$^5$ Pa, or from 0.5×10$^5$ Pa to about 10×10$^5$ Pa, or from 1×10$^5$ Pa to about 10×10$^5$ Pa, or from 2×10$^5$ Pa to about 10×10$^5$ Pa, or any various amount within these ranges. For instance, the sintering can be performed under a pressure of from about 0.5×10$^5$ Pa to about 7×10$^5$ Pa, or from about 1×10$^5$ Pa to about 5×10$^5$ Pa.

The sintering can be performed at any temperature sufficient to achieve the sintering results mentioned herein. For instance, the sintering can be performed at a temperature from about 500° C. (or less) to about 2500° C. (or more) and/or a pressure of from about 0.1 MPa (or less) to about 200 MPa (or more) for about 1 hour (or less) to about 20 hours (or more). As an example, the sintering can be performed at a temperature from about 1100° C. to about 1300° C. and/or a pressure of from about 0.1 MPa to about 200 MPa, for instance, for about 4 hours (or less) to about 6 hours (or more). The sintering can be performed at any suitable firing rate to achieve the sintering results mentioned herein. For instance, the sintering can be performed at a firing rate of from about 0.01° C./min to about 2000° C./min or any firing rates within this range or outside of this range. As an option, the sintering creates a reactive liquid phase of the ceramics or ceramic precursor in the green body. The following sintering conditions can be used in the present invention and these conditions can generally achieve a reactive liquid phase. For example, the temperature can be from about 500° C. to about 2500° C. and the pressure can be from about 0.1 MPa to about 200 MPa, for instance, for about 1 hour to about 20 hours. An another example, the temperature can be from about 1100° C. to about 1300° C. and the pressure can be from about 0.1 MPa to 200 MPa, for instance, for about 4 hours to about 6 hours.

As indicated, in the present invention, the glassy compound, if present, can be produced from the sintering of the ceramic or ceramic precursor. In forming the gas bubbles in the particle, the gas bubbles can be formed from oxidation of the microsphere former(s), and/or degradation of the microsphere former(s) or any combination thereof. The gas bubbles can be formed from the microsphere former(s) and/or from the ceramic or ceramic precursor that at least partially decomposes to generate a gas. With respect to the gas bubbles that are formed or present in the particle, as indicated, a majority of the gas bubbles (and the microspheres formed) are not in physical contact with each other in the particle. For instance, at least 80% by total number, of the gas bubbles (and the microspheres and/or pores formed) are not in contact with each other in the particle, or at least 90% by total number, of the gas bubbles (and the microspheres and/or pores formed) are not in contact with each other. These gas bubbles will become the microsphere in the particle and will also have the property of a majority of the microspheres not being in physical contact with each other (e.g., separate and discrete).

The present invention can include a method for producing microsphere (and/or pore) formers that can include the steps of:

1. producing microsphere (and/or pore) former templates of a predetermined size, and
2. selecting a subset of the sized microsphere (and/or pore) former templates, and
3. optionally coating the microsphere (and/or pore) former templates with inorganic or organic materials.

The microsphere (and/or pore) formers of the present invention are useful in producing proppants and other glass-ceramic, ceramic and/or metal articles with controlled porosity and a superior balance of physical, chemical, and thermal properties. The size and/or size distribution of the microsphere (and/or pore) formers are useful to obtaining physical properties of the resulting glass-ceramic, ceramic and/or metal article. The optional coating on the microsphere (and/or pore) former provides useful properties in the formation of a green body in preparation for sintering and it also provides useful properties developed during the sintering process.

Microsphere (and/or pore) formers and microsphere (and/or pore) former templates are used interchangeably herein. Solid microsphere (and/or pore) former templates may be produced by size reduction operations such as crushing, grinding, prilling, pelletizing, roller mill, hammer mill, rod mill, jar mill, pulverizing, disc mill, attrition mill, and any combination thereof. The size reduction may be performed in the presence of a liquid, such as water, solvents, oil, or any combinations thereof. Following size reduction, the size distribution of microsphere former templates can be controlled by screening, filtration, air separation, sedimentation, impingement, flotation, or any combinations thereof.

The coating on the microsphere former template can be applied by spray coating, fluid bed coating, vapor deposition, tumbling, or any combinations thereof.

The microsphere former template may be a hollow particle or a solid particle. In the case of hollow particles, the microsphere former template may be cenospheres, polymer microspheres, glass microspheres or any combinations thereof.

In the case of a solid particle, the microsphere former template may be a reactive material or a fugitive phase material. Reactive materials can chemically react with gases, liquids, or solids present or produced during the sintering step in the production of a glass-ceramic, ceramic, metal article or any combination thereof or it can react with the ceramic or ceramic precursors that make up the matrix. Reactive materials used as microsphere former templates can be or include a carbide(s), a nitride(s), an oxynitride(s), a sulfide(s), a halide(s), a boride(s), an organometallic compound(s), metal(s), metal alloy(s), carbonate(s), a nitrate(s), a sulfate(s), a sulfite(s), a chlorate(s), a bromate(s), an iodinate(s), borax, a phosphate(s), a peroxide(s), a persulfide(s), a perchlorate(s), a perbromate(s), an ammonium salt(s), a microorganism(s) or any combination thereof. Fugitive phase materials can be removed during the sintering process by burning (oxidation), thermal decomposition, solvent extraction, vaporization, sublimation or any combination thereof. Fugitive phase materials used as microsphere former templates can be or include starches, walnut shells, flour, carbon, carbon black, graphite, toner particles, or any combination thereof. Solid particles using microsphere formers may be lower in specific gravity than the glass-ceramic, ceramic, metal materials or combinations thereof present in the green body. Microsphere formers with low specific gravity can be used to lower the overall composite specific gravity of the glass-ceramic, ceramic, metal article or combinations thereof. Solid particles using microsphere formers may be porous (or non-porous) and have a lower specific gravity than the glass-ceramic, ceramic, metal materials or combinations thereof used in the green body. Porous microsphere formers with low specific gravity can be used to lower the composite specific gravity of the glass-ceramic, ceramic, metal article or any combinations thereof.

Inorganic coating materials applied to the microsphere former (a.k.a., microsphere former template) can be or include oxides, nitrides, borides, carbides or any combination thereof. An example of an oxide is silicon dioxide. Silicon dioxide forms a viscous phase during sintering and aids in controlled in situ microsphere formation in the glass-ceramic, ceramic, metal matrix or any combination thereof.

Organic coating materials applied to the microsphere former template can be or include polymers, such as polymethyl methacrylate (PMMA), polycarbonate, silicone polymers, polystyrene, polyolefins, or any combinations thereof. Polymers can form a viscous phase during sintering and can aid in control of in situ microsphere formation in the glass-ceramic, ceramic, metal matrix or any combination thereof. Organic materials applied to the microsphere former template may include one or more surfactants, such as DOLAPIX CE 64 (Zschimmer & Schwarz, GmbH), DARVAN C(RT Vanderbilt Company, Industrial Minerals & Chemicals) and similar materials. Dispersant coatings aid in the uniform distribution of microsphere formers in the green body prior to sintering.

More than one layer of inorganic and/or organic materials may be applied to the microsphere former template and these layers may be the same or different in amounts and/or materials. Multiple layers can perform different functions during the steps involved in the production of a glass-ceramic, ceramic, metal article or any combinations thereof. For example, a silicon dioxide layer may be applied to the microsphere former template followed by a surfactant. The surfactant coating enhances dispersion of the microsphere former in the green body and the silicon dioxide enhances formation of in situ microspheres during the sintering step.

The inorganic and/or organic materials used to coat the microsphere former template may optionally include a minor amount of fibers or whiskers. The whiskers and fibers can toughen the resulting interior surface of the in situ microsphere and blunt cracks that may form under stress. Whiskers in the coating may also act as seeds for development of whiskers or fibers in a glass-ceramic, ceramic, metal matrix or any combinations thereof or in the interior of the in situ microsphere. The whiskers or fibers formed may be present at the interface between the microsphere and the glass-ceramic, ceramic, or metal or any combinations thereof. The combination of whiskers or fibers and controlled microsphere morphology can produce the unexpected benefit of superior balance of high strength and low specific gravity. The organic materials used to coat the microsphere former template may optionally contain a promoter to form fibers or whiskers either inside the resulting in situ microsphere or in the surrounding glass-ceramic, ceramic, metal matrix or any combinations thereof. Promoters can be or include zirconium, iron, magnesium, alumina, bismuth, lanthanum, silicon, calcium, cerium, yttrium, a silicate, a borate, a halide (e.g., fluorine or chlorine), or any combination thereof. Promoters may include zirconium, iron, magnesium, alumina, bismuth, lanthanum, silicon, calcium, cerium, yttrium, a silicate, a borate or any combinations thereof, or one or more compounds containing one or more of these elements or moieties.

The coating on the microsphere former template may be formed in situ by reaction with gases in the sintering process or by chemical reaction with the ceramic precursors during the sintering process. For example, if the microsphere former template is silicon carbide (SiC), the silicon in the SiC may react with oxygen in the sintering process to form silicon dioxide ($SiO_2$). The $SiO_2$ initially forms on the surface of the SiC particle forming an in situ coating on the microsphere former template.

The ceramic particle can be any shape and/or size, and for instance can be spherical, nearly spherical, oblong in shape, doughnut shape, star shape, or any combination thereof. For instance, the ceramic particle can be in the shape of a sphere having a Krumbein sphericity of at least about 0.5, and a roundness of at least about 0.5.

The microsphere (and/or pore) containing ceramic particle can have any microsphere (and/or pore) size distribution. For instance, the particle can have a microsphere (and/or pore) size distribution, $d_{vs}$ of from about 0.5 to about 10.0, wherein $d_{vs}=(d_{v90}-d_{v10})/d_{v50}$ and wherein $d_{v10}$ is a microsphere (and/or pore) size wherein 10% of the microspheres (and/or pores) have a smaller microsphere size, $d_{v50}$ is a median microsphere (and/or pore) size wherein 50% of the microspheres (and/or pores) have a smaller microsphere (and/or pore) size, and $d_{v90}$ is a microsphere (and/or pore) size wherein 90% of the microspheres (and/or pores) have a smaller microsphere (and/or pore) size. The microsphere (and/or pore) containing ceramic particle can have a microsphere (and/or pore) size distribution, $d_{vs}$ of from about 0.5 to about 5.0, or from 0.5 to 10, 0.5 to 10, 0.5 to 3, 0.5 to 1, from 0.75 to 10, from 0.75 to 5, from 0.75 to 3, from 1 to 10, from 1 to 5, and the like.

The microsphere containing ceramic particle can have any median microsphere size, such as a median microsphere size, $d_{v50}$, of from about 0.1 μm to about 100 μm (e.g., from 0.1 μm to 75 μm, from 0.1 μm to 50 μm, from 0.1 μm to 25 μm, from 0.1 μm to 15 μm, from 0.1 μm to 8 μm, from 0.5 μm to 75 μm, from 1 μm to 75 μm, from 1 μm to 50 μm, from 1 μm to 25 μm,) wherein $d_{v50}$ is a median microsphere size where 50% of the microspheres of the distribution has a smaller microsphere size. As stated earlier, this applies to pores also.

The microsphere containing ceramic particle can have a specific gravity of from about 1.0 (or less) to about 3.5 (or more), and/or a microsphere placement and/or size of from about 1% (or less) to about 49% (or more), and/or a crush strength of from about 10 MPa (or less) to about 300 MPa (or more), and/or a four point bending strength of about 50 MPa (or less) to about 400 MPa (or more). For instance, the microsphere containing ceramic particle can have a specific gravity of from about 1.8 to about 2.25, and/or a microsphere placement and/or size of from about 1% to about 10%, and/or a crush strength of from about 10 MPa to about 300 MPa, and/or a four point bending strength of about 50 MPa to about 400 MPa. As stated earlier, this applies to pore containing ceramic particles also.

Regarding the product(s) formed, the microsphere containing ceramic particle can have one or more of the various properties and/or parameters and/or materials mentioned herein. For instance, the microsphere containing ceramic particle(s) can be or include a sintered body having microspheres contained therein, and wherein the microspheres are optionally at least partially surrounded by at least one glassy compound, and a majority of the microspheres are not in contact with each other. The sintered body can be or include at least in part cordierite, mullite, bauxite, silica, spodumene, silicon oxide, aluminum oxide, sodium oxide, potassium oxide, calcium oxide, zirconium oxide, lithium oxide, iron oxide, spinet steatite, a silicate, a substituted alumino silicate clay, an inorganic nitride, an inorganic carbide, a non-oxide ceramic or any combination thereof.

The microsphere containing ceramic particle can be in the shape of a sphere having a Krumbein sphericity of at least about 0.5, and a roundness of at least about 0.5. The microsphere containing ceramic particle can have a specific gravity of from about 0.8 to about 3.5, and/or a microsphere amount of from about 1% to about 49% (by volume of proppant), and/or a crush strength of from about 10 MPa to about 300 MPa, and/or a four point bending strength of about 50 MPa to about 400 MPa. As a further example, the microsphere containing ceramic particle can have a specific gravity of from about 1.8 to about 2.25, and/or a microsphere amount of from about 1% to about 10% (by volume of proppant), and/or a crush strength of from about 10 MPa to about 300 MPa, and/or a four point bending strength of about 50 MPa to about 400 MPa.

As an option, the sintered body can surround or encapsulate a different material or template material, such as a hollow material or solid material, like a cenosphere, a micro glass bead, a synthetic cenosphere, a polymer bead or any combination thereof.

As stated, the microsphere containing ceramic particle can be considered a proppant, for instance, that is useful as a proppant in hydrocarbon recovery or other subterranean operations that use proppants.

The microsphere (and/or pore) containing ceramic particle can have a $d_{ps}$ of from about 0.4 to about 1.0, wherein $d_{ps}=(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size. The microsphere (and/or pore) containing ceramic particle can have a $d_{ps}$ of from 0.4 to 1, from 0.5 to 1, from 0.6 to 1, from 0.7 to 1, from 0.8 to 1, from 0.4 to 0.6, from 0.4 to 0.5, from 0.4 to 0.75, and the like.

The microsphere (and/or pore) containing ceramic particle can have any median particle size, such as a median particle size, $d_{p50}$, of from about 90 μm to about 2000 μm (e.g., from 90 μm to 2000 μm, from 100 μm to 2000 μm, from 200 μm to 2000 μm, from 300 μm to 2000 μm, from 500 μm to 2000 μm, from 750 μm to 2000 μm, from 100 μm to 1000 μm, from 100 μm to 750 μm, from 100 μm to 500 μm, from 100 μm to 250 μm, from 250 μm to 2000 μm, from 250 μm to 1000 μm), wherein $d_{p50}$ is a median particle size where 50% of the particles of the distribution have a smaller particle size.

The microsphere containing ceramic particle can have a $R_p$ of from about 0.01 to about 0.1, wherein $R_p=d_{v50}/d_{p50}$ wherein $d_{v50}$ is a median microsphere size where 50% of the microspheres of the distribution has a smaller microsphere size and $d_{p50}$ is a median particle size where 50% of the particles of the distribution have a smaller particle size. The $R_p$ can be from about 0.03 to about 0.05, or from 0.01 to 0.1, from 0.05 to 0.1, from 0.075 to 0.1, from 0.01 to 0.08, from 0.02 to 0.07, and the like.

Figure 4:
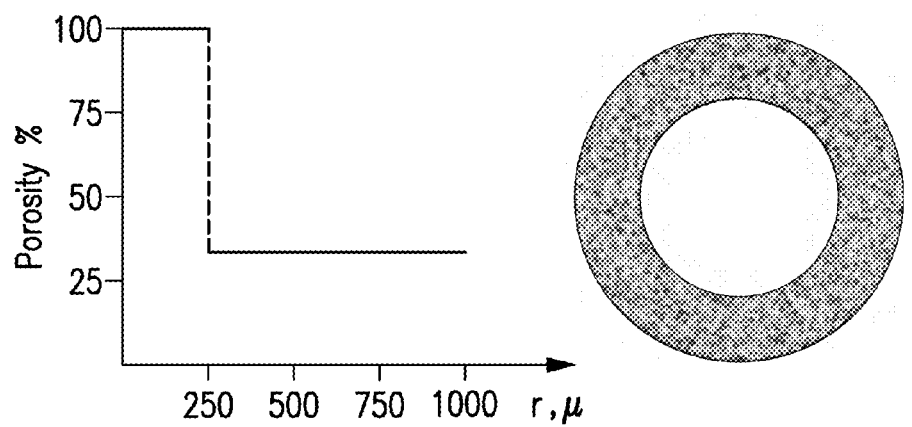
FIG. 4 is a diagram showing the radial distribution of microspheres (or pores) in a ceramic particle including a hollow template.
Figure 5:
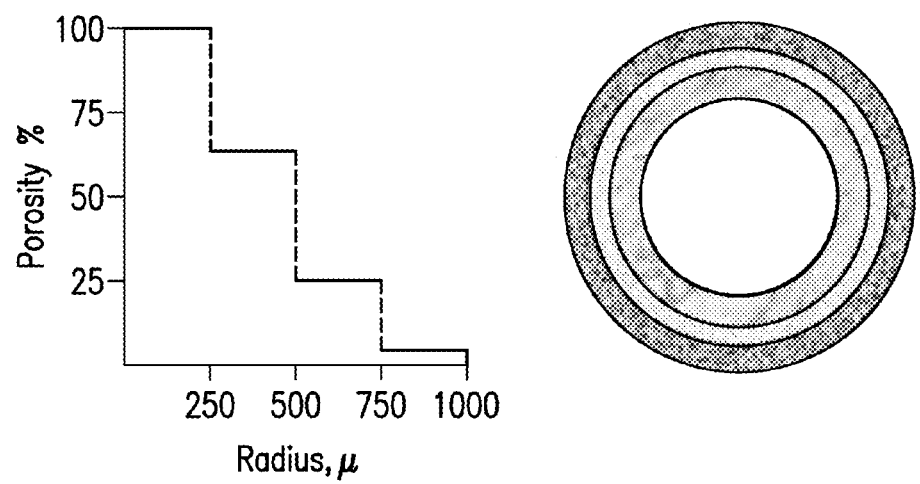
FIG. 5 is a diagram showing the radial distribution of microspheres (or pores) in a ceramic particle comprising a hollow template and multiple layers of ceramic material.
Figure 6:
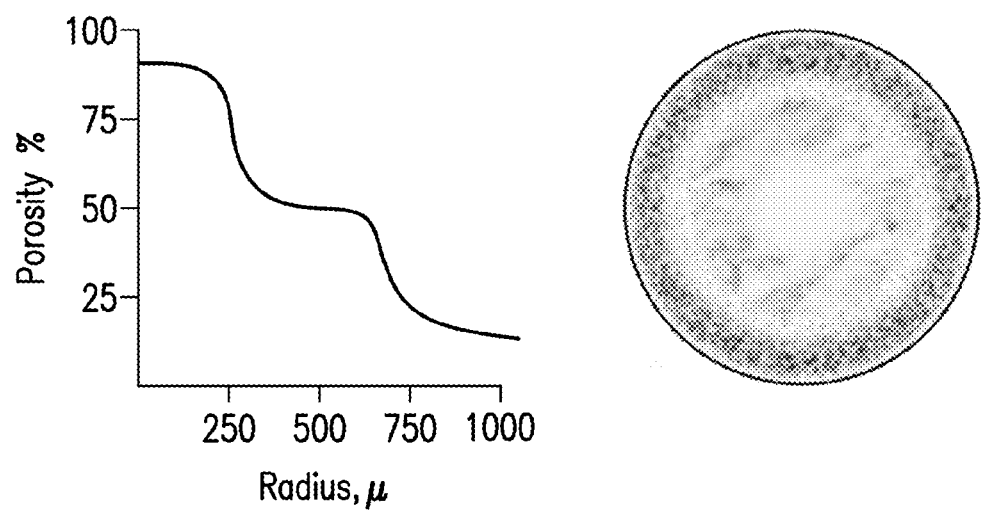
FIG. 6 is a diagram showing a continuously varying distribution of microspheres (or pores) in a ceramic particle that does not include a template.
Figure 7:
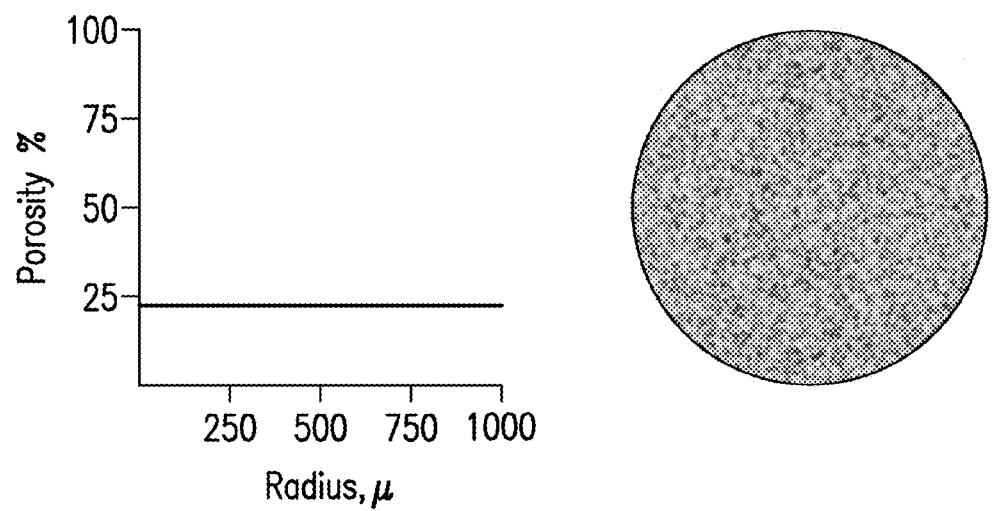
FIG. 7 is a diagram showing the uniform radial distribution of microspheres (or pores) in a ceramic particle that does not include a template.
Figure 8:
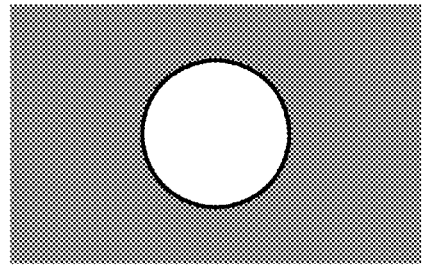
FIG. 8 shows a microsphere with distinct boundary in a glass-ceramic, ceramic, or metal matrix or composites thereof.
Figure 9:
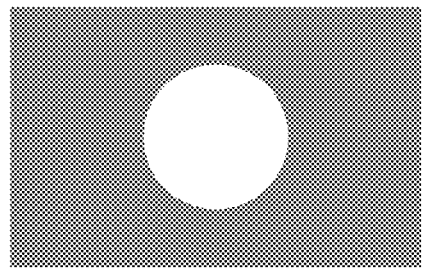
FIG. 9 shows a pore in a glass-ceramic, ceramic, metal matrix or composites thereof.
Figure 10:
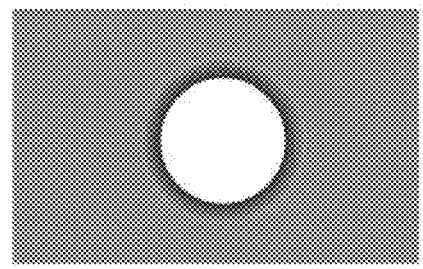
FIG. 10 shows a microsphere with a gradient boundary in a glass-ceramic, ceramic, or metal matrix or composites thereof.

Another aspect of the invention is the ability to produce controlled radial distributions of microspheres in the ceramic particle. For instance, the particle can have concentrations of microsphere density that differ, as an option. For example, the region closer to the surface of the proppant can have a different microsphere density and/or microsphere size and/or microsphere distribution than other regions of the particle, such as regions closer to the geometric center of the particle. Considering that the particle has a generally spherical or similar type of shape many of the times, a radius can be drawn from the geometrical center of the particle to the outer surface of the particle. The geometrical center would be where the radius is zero. Going from the center (radius=0) to the outer surface, any of the parameters described herein for the ceramic material and/or microsphere forming material and/or the resulting microspheres can the same or vary. The variance can be controlled in such a manner as to produce consistent linear type incremental changes (e.g., increases or decreases in one or more parameters) or can be controlled in such a manner as to produce step changes (e.g., radial zones with different parameters per zone). Essentially, gradients can exist in the particle such that regions (outer or near outer surface, geometrical center, regions between the outer or near outer surface and geometrical center) can have one or more different parameters with respect to ceramic material and/or microsphere forming material and/or the resulting microspheres and/or the properties described herein for them, such as particle size distribution, median particle size, BET surface area, strength, microsphere placement and/or size, specific gravity, $d_{ps}$, $R_p$, (for the resulting particle, the microsphere former, the microspheres, or any of the starting ingredients). As an example, FIG. 7 shows the radial distribution of microspheres in a generally spherical ceramic particle made by forming a green body containing a composition of green body material. In this case, 20% microsphere placement and/or size is shown from a radius of 0-1,000 μm. FIG. 4 shows a radial distribution of microspheres in a ceramic particle containing a cenosphere. In this case, 100% microsphere placement and/or size is shown from a radius of 0-250 μm. This is the hollow area inside the cenosphere. About 35% microsphere placement and/or size is shown from 250-1000 μm. This is the microsphere placement and/or size generated in the ceramic material by the microsphere former. FIG. 5 shows a radial distribution of microspheres in a ceramic particle containing a cenosphere and three layers of ceramic. Each layer of ceramic is formed by a separate application of green body material wherein each layer of green body material has a different composition of ceramic or ceramic precursor and microsphere former. In this case, 100% microsphere placement and/or size is shown from a radius of 0-250 μm. This is the hollow area inside the cenosphere. About 65% microsphere placement and/or size is shown from 250-500 μm. This is the microsphere placement and/or size in layer 1. About 25% microsphere placement and/or size is shown from a radius of 500-750 μm. This is the microsphere placement and/or size in layer 2. About 5% microsphere placement and/or size is shown from a radius of 750-1,000 μm. This is the microsphere placement and/or size in layer 3. FIG. 6 shows a radial distribution of microspheres in a ceramic particle in which the distribution is continuously varied or shifted (e.g., a gradient). In this case, the microsphere placement and/or size starts at about 90% at a radius of zero and declines in a controlled manner out to a radius of 1,000 μm. The various percents provided in these examples can be any % from 1 to 100% in each instance. The gradients as stated can be linear, logarithmic, step wise in a positive or negative manner starting at a radius of zero. The gradients when stepwise for instance can change or shift at any location such as every 5% to every 50% of the radius (e.g., from 10% to 50%, 20% to 50%, 30% to 50% and so on).

The microspheres in the proppant can have a wall or boundary that is sharp and distinct from the surrounding matrix or surrounding environment or the microspheres can have a wall or boundary that at least partially diffuses into the surrounding matrix or surrounding environment to form a gradient boundary for the micropheres. For instance, the wall thickness of the microsphere can be from about 0.001 micron to 0.2 micron, such as from 0.005 micron to 0.1 micron, or from 0.01 micron to 0.1 micron, or from 0.05 micron to 0.08 micron and the like. The gradient, if present, can have a thickness or boundary of from about 0.05 micron to about 5 microns, such as from 0.1 micron to 4 microns, from 0.2 micron to 3 microns, from 0.3 micron to 2 microns, from 0.4 micron to 1 micron and the like.

For purposes of the present invention, the proppant or ceramic material of the present invention can include any of the components described in U.S. Provisional Patent Application No. 61/299,700, which is incorporated in its entirety by reference herein. For instance, the proppant or ceramic material of the present invention can have present ceramic whiskers or fibers, pre-formed and/or in-situ formed, can have an amorphous phase, and/or can have a crystalline phase, and the like, as described in said provisional application.

The microsphere (and/or pore) containing ceramic particle can have one or more of the following characteristics:
  a. an overall diameter of from about 90 microns to about 2,000 microns;
  b. a Krumbein sphericity of at least about 0.5 and a roundness of at least about 0.5;
  c. a crush strength of about 10 MPa or greater;
  d. a specific gravity of from about 1.0 to about 3.0;
  e. a microsphere and/or pore amount of from about 6% to about 40% (with a central void) or 6% to 33%, based on percent volume of particle;
  f. at least 90% (by number) of microspheres having a microsphere size of from about 0.1 μm to about 10 μm,
  g. at least 50.1% or at least 80% (by number) of microspheres are not in contact with each other.

The microsphere containing ceramic particle can have one, two, three, four, five, six, or all seven of these properties. Any combination of the a. thru g. can be present (such as a. and b., a. and c., a. and d., a. and e., a. and f., a. and g. and so on).

Based on a study of the proppants made by following one or more of the methods of the present invention, various advantageous properties/characteristics of the proppants were found. The following properties/characteristics of the proppants can be present in any of the proppants of the present invention and, further, any of these properties/characteristics can be in combination with any one or more of the characteristics/properties/features identified in the present application. Any combination of such characteristics/properties/features is possible and is considered part of the present invention. The following advantageous characteristics/properties were determined based on an analysis of the proppants using high-resolution scans of the proppants of the present invention, for instance, a resolution of 2 μm/voxel, 0.6 μm/voxel, 0.065 μm/voxel, or less. This can be determined by InGrain, Inc. (Houston, Tex.):

a) a majority (e.g., 50.1% or greater; 51% to 99%, 60% to 99%, 65% to 95%, 70% to 90%, 65% to 85%, 60% to 80% (percent based on count of total pores/microspheres)) of pores and/or microspheres in the proppant (not counting any central void that may be present) have a size of less than 50 cubic microns, such as less than 40 cubic microns, less than 30 cubic microns, less than 20 cubic microns, less than 10 cubic microns, less than 1 cubic micron; less than 0.5 cubic micron, 0.01 (or less) to 49 cubic microns, or 20 to 49 cubic microns, or 0.1 to 20 cubic microns, or 0.1 to 1.0 cubic micron, or 0.1 to 3 cubic microns;

b) a population of proppants (based on a 50 gram sample of proppants) has a specific gravity variance (from the average specific gravity) of ±0.8, or ±0.7, or ±0.6, or ±0.5, or ±0.4, ±0.3, or ±0.2, or ±0.1;

c) the characteristics of a) and/or b) above can be present in any proppant of the present invention, including a proppant with a specific gravity of 3 or less, or 2.6 or less, such as 1.0 to 2.6, 1.0 to 2.5, 1.0 to 2.4, 1.0 to 2.3, 1.0 to 2.2, 1.0 to 2.0, 1.0 to 1.8;

d) the proppants of the present invention can have a total porosity of 1% to 33% by vol of proppant (excluding any central void that is optionally present) (e.g., 5% to 33%, 6% to 30%, 8% to 28%, 10% to 25%, 12% to 20%, 15% to 22% by volume of proppant), wherein a majority of the pores/microspheres are not in contact with each other (e.g., 50.1% or more, 50.1 to 99.9%, 51% to 99%, 55% to 99%, 60% to 98%, 65% to 98%, 70% to 95%, 75% to 98%, 60% to 90%, 60% to 85%, 51% to 80%, 80% to 99.9%, 80% to 95%, 51% to 75%, 51.1% to 70%, wherein the percent is based on total count of pores/microspheres in the proppant;

e) the pores/microspheres are uniformly distributed in the proppant such that the pore/microsphere density (e.g., detectable pores/microspheres at an image resolution of 2 μm/voxel and/or 0.065 μm/voxel or less) is about the same throughout the proppant (excluding any central void that is optionally present), such as a pore/microsphere density in a sector or portion that is within ±25%, ±20, ±15%, ±10%, ±5%, ±4%, ±3%, ±2%, ±1% of a different sector or portion of the same proppant. For instance, a section/sector of a proppant that encompasses 5% to 10% (by volume) of the total volume of proppant has about the same total porosity as a different randomly selected section/sector of 5% to 10% by volume (of the same proppant). As a more specific example, a sector can have a total porosity of 15%, and a different sector (of the same vol) in the same proppant can have a total porosity ranging from 18.75% to 11.25%;

f) the crush strength (based on API RP60) of the proppants of the present invention can be at least 2,000 psi, such as 2,000 psi to 10,000 psi or more.

The particles or proppants (e.g., ceramic particles/proppants) can have a), b), c), d), e), and/or f) in any combination. The particles or proppants can optionally have one or more layers or shells, and characteristics a) and e) above can alternatively or equally apply to a layer(s) or shell(s) that can be part of the proppant.

The microsphere containing ceramic particle can be used to form other products, such as matrix materials, a concrete formulation, a composite reinforcement phase, a thermal insulating material, an electrical insulating material, an abrasive material, a catalyst substrate a catalyst support, a chromatography column material or a reflux tower material.

As indicated, the particles can be used in a method to prop open subterranean formation fractures. The method can include introducing a proppant formulation that is or includes the microsphere containing ceramic particle(s) of the present invention into a subterranean formation. The particles can be used in a method of treating a subterranean producing zone penetrated by a well bore. The method can include preparing or providing a treating fluid that includes a fluid, energized fluid, foam, or a gas carrier having the microsphere containing ceramic particle(s) of the present invention and pumping the treating fluid into the subterranean producing zone whereby said particles are deposited therein. The treating fluid can be or include a fracturing fluid and the particles can be deposited in fractures formed in the subterranean producing zone. The treating fluid can be a gravel packing fluid and the particles can be deposited in the well bore adjacent to the subterranean producing zone.

The present invention can be a matrix that includes a plurality of the particles (e.g., proppants) of the present invention and at least one solid matrix material in which the particles are distributed.

Further details of the present invention are provided below. Some of the description/disclosure below uses silicon carbide in describing the present invention, but it is to be understood that this is only exemplary and in lieu of silicon carbide, any other microsphere former(s) could be used entirely or in combination with the silicon carbide.

The present invention provides high strength and light weight ceramic particles such as proppants by sintering a green body material containing a ceramic precursor such as alumina and a microsphere former such as silicon carbide under an atmosphere containing oxygen to oxidize at least a portion of a silicon carbide component to form molten or flowable silicon dioxide and a carbonaceous oxide gas. The green body material can be a green ceramic precursor powder mixture that includes the silicon carbide (microsphere former) and other optionally ceramic forming ingredients. Gaseous pressure at the silicon carbide-silicon dioxide interface and viscosity of the silicon dioxide is controlled during sintering of the green body material to permit a hollow structure to be blown in the alumina, providing a microsphere containing structure in the sintered composite product, and hence a more microsphere containing proppant product. The silicon carbide can be blended with a ceramic-forming material, such as a metal oxide, in particulate form, and then sintered to provide a ceramic product having partially oxidized, and thus microsphere containing, silicon carbide particles substantially uniformly distributed throughout the ceramic product material. The resulting microsphere containing proppant products can have high strength (e.g., at least 10 MPa (1,500 psi)) and light weight (e.g., specific gravity, SG, 3.0 or less). For purposes herein, "sintering" is a high-temperature treatment in which a powder compact (green body) or other powder mixture is transformed into a unitary ceramic material.

Green body materials of the present invention can be made, for example, by ceramic processing encompassing spray drying, die pressing (e.g., green powder compacting/pelletizing), extrusion coating, fluidized bed coating, mixer granulation, high shear mixing, roller compaction injection molding, tumbling or any combination thereof, as adapted to make the present lightweight, high strength SiC-containing proppants or other ceramic composites. In making the present green body materials, silicon carbide is blended with one or more ceramic-forming powders and any other proppant ingredients prior to compacting/pelletizing or spraying, and sintering. Procedures for blending ceramic forming powders and compacting/pelletizing or spraying such powders that are conventionally used can be applied to silicon carbide and ceramic forming powders used in making the present proppants. For example, aspects of ceramic processing with respect to powder blending and pressing or spraying can be adapted to make metal oxide-SiC composites and proppants of the present invention, such as those disclosed in U.S. Pat. No. 7,459,209 and U.S. Patent Application Publication Nos. 2009/0038797; 2007/0023187; and 2003/0148893, which are incorporated in their entireties by reference herein.

As indicated, sintering of the silicon carbide green body materials is uniquely controlled in the present methods to provide lightweight and high strength microsphere containing SiC-containing proppants or other composites.

Under reaction conditions used during sintering in the present methods, silicon carbide (SiC) can be controllably oxidized in an oxygen gas-containing environment, such as air or other oxygen sources, by the reaction (1) below:

$$SiC(s) + xO_2(g) \rightarrow SiO_2(s) + CO_y(g) \quad (1)$$

where "x" is 1.5 or 2.0 and "y" is 1 or 2, respectively.

The oxidation of silicon carbide under the conditions of the present methods creates gases and at least in part creates bubbles due to the formation of viscous silica ($SiO_2$). In monolithic silicon carbide parts, oxidation and bubble formation in SiC is more naturally considered detrimental to the strength and applications of the SiC parts, since both the microspheres and the silica can weaken the materials. However, the current applicants have surprisingly found that in proppant production, the oxidation of silicon carbide using the present methods introduces a controlled microsphere placement and/or size that can reduce overall proppant specific gravity without sacrificing overall proppant strength.

In the indicated chemical reaction (1), for bubbles to be formed, the following conditions are provided in the present methods: (i) sufficiently high gas pressure at the SiC—$SiO_2$ interface and (ii) low $SiO_2$ viscosity, to allow a hollow structure to be blown. Therefore, in fabrication of proppants containing SiC, by controlling an oxidation reaction of SiC according to the present methods, a tailored microsphere placement and/or size (amount, size and narrow microsphere distribution) can be introduced into the matrix. The strength of brittle materials, such as ceramics, depends highly on its maximum flaw size and flaw population. In the case of proppants with microsphere placement and/or size, the size of the biggest microsphere can determine the strength of the proppants. In order to maintain the strength, the size and distribution of microsphere placement and/or size needs to be tailored or controlled. For example, if the microsphere size is too large, the part may fail prematurely which leads to a low strength; if the microsphere size is too small, it may not be possible to reduce the specific gravity to the desired level; or if the size distribution of the microspheres is too wide, there may be a large standard deviation in the strength of the proppants in the same production batch, which is not desired. Size distribution of microspheres can also be adversely affected when two or more bubbles merge during the formation stage. When this happens, an abnormally large microsphere results. The present invention minimizes this occurrence by tight control of the number and size of SiC particles in the green body material. The present methods limit the number of merged microspheres to about 20% or less of the total number of microspheres. Furthermore, the viscous phase silicon dioxide formed also aids in prevention of bubble merging. Griffith (Griffith, A. A. (1921), "The phenomena of rupture and flow in solids," PHILOSOPHICAL TRANSACTIONS OF THE ROYAL SOCIETY OF LONDON, A 221: 163-198) observed that the fracture stress increases as particle diameter decreases. Furthermore, fracture is propagated by the presence of cracks of at least a critical size that are present. In the present invention, the size of the microsphere compared to the size of the ceramic particle is a determining factor in crush strength as the microsphere represents a crack in terms of Griffith's theory. The desired relationship of microsphere size to particle size is $R_p = d_{v50}/d_{p50}$ wherein $d_{v50}$ is a median microsphere size where 50% of the microspheres of the distribution has a smaller microsphere size and $d_{p50}$ is a median particle size where 50% of the particles of the distribution have a smaller particle size. The applicants have unexpectedly found that a superior balance of crush strength and specific gravity are obtained for values of $R_p$ ranging from about 0.01 to about 0.1. The present methods make it possible to control the microsphere placement and/or size, both in amount, in size, and in distribution of the microspheres throughout the microsphere containing ceramic particle to provide a fine narrowly-distributed microsphere size in the proppant, which is desirable for better strength and consistent performance.

The green body material can comprise silicon carbide and a metal oxide or a mixture of different metal oxides. For instance, the green body material can be a material that contains, in addition to silicon carbide, at least 5% metal oxide, such as at least 10% metal oxide, at least 15% metal oxide, at least 20% metal oxide, at least 25% metal oxide, at least 30% metal oxide, at least 50% metal oxide, at least 75% metal oxide, at least 85% metal oxide, at least 95% metal oxide, wherein all percents are by weight of the material. The percentage (%) can be for one or more or total content of metal oxides present in the green body material. For instance, the metal oxide content of the green body material can be from 5% by weight to 99.99% by weight. The remaining percent by weight content of the green body material comprises silicon carbide, and can be other metal oxides, metals, other elements, and/or oxides, nitrides, carbides, borides, and the like. Examples of suitable metal oxides can be, for example, cordierite, mullite, bauxite, silica, spodumene, silicon oxide, aluminum oxide, sodium oxide, potassium oxide, calcium oxide, titanium oxide, zinc oxide, zirconium oxide, lithium oxide, iron oxide, spinet steatite, a silicate, a substituted alumino silicate clay, or any combination thereof. In the case of metal oxides, such as cordierite (stoichiometric composition: $5.SiO_2.2Al_2O_3.2MgO$, or 51.36% $SiO_2$+34.86% $Al_2O_3$+ 13.78% MgO by weight), mullite, alumina, or silica based materials, and the like or combinations thereof, adding SiC to the metal oxide has been found to be a very powerful tool to introduce a specific gravity-lowering microsphere placement and/or size with maintenance of high strength in the proppant products.

The green body material can comprise, for example, from about 0.1 wt % to about 35 wt % silicon carbide based on total weight of the silicon carbide and metal oxide that is cordierite, mullite, alumina, silica, or any combination thereof, or the green body material can comprise from about 0.01 wt % to about 15 wt % silicon carbide based on total weight of the silicon carbide and metal oxide that is cordierite, mullite, alumina, silica, or any combination thereof. The green body material can comprise metal oxide that is cordierite, mullite, alumina, silica, or any combination thereof, in a predominant amount (≥50 wt %) or a major amount (>50 wt %), and the silicon carbide in a minor amount (<50 wt %), based on total weight of silicon carbide, metal oxide or other ceramic forming materials other than silicon carbide, and any other ingredients included in the green body material.

The range of SiC particle size used in the green body material can have effects on both microsphere placement and/or size and strength enhancement in the composite proppant product. The SiC powder used in the green body material should have a small size with a large enough surface area to allow the oxidation to proceed as desired. SiC particles can have a particle size distribution with $d_{fs}$ from about 0.5 to about 5.0 and from about 0.5 to about 1.5, wherein, $d_{fs} = \{(d_{f90} - d_{f10})/d_{f50}\}$ wherein $d_{f10}$ is a particle size wherein 10% of the particles have a smaller particle size, $d_{f50}$ is a median particle size wherein 50% of the particles have a smaller particle size, and $d_{f90}$ is a particle size wherein 90% of the particles have a smaller particle size. The median particle size, $d_{f50}$, of the SiC is from about 0.01 µm to about 100 µm or from about 0.2 µm to about 5 µm, wherein $d_{f50}$ is a median particle size where 50% of the particles of the distribution have a smaller particle size. The SiC comprises from about 0.01 to about 50% of said green body or from about 0.01 to about 10% of the green body. The silicon carbide has a surface area (BET) of from about 0.5 m²/g to about 100 m²/g or from about 8 m²/g to about 15 m²/g.

The metal oxide powder used in the green body material can have a particle size distribution, $d_{gs}$, of from about 0.5 to about 15 or from about 0.5 to about 6.0, wherein $d_{gs} = \{(d_{g90} - d_{g10})/d_{g50}\}$, and $d_{g10}$ is a particle size wherein 10% of the particles have a smaller particle size, $d_{g50}$ is a median particle size wherein 50% of the particles have a smaller particle size, and $d_{g90}$ is a particle size wherein 90% of the particle volume has a smaller particle size. The median particle size, $d_{g50}$, of the metal oxide powder is from about 0.01 µm to about 100 µm or from about 0.1 µm to about 5 µm, wherein $d_{g50}$ is a median particle size where 50% of particles of the distribution have a smaller particle size. The metal oxide powder can occupy from about 50% to about 100% of the green body or from about 90% to about 99.9% of the green body. The particle size of the metal oxide powder may be the same as or different to the particle size of the silicon carbide powder.

The methods of the present invention can make proppants with controlled dimensions and/or controlled diameters. With respect to controlled dimensions and controlled diameters, the methods of the present invention can make proppant particle sizes having uniform or nearly uniform dimensions and/or diameters for a plurality of proppant particles, meaning that the method provides a tight distribution in the proppants formed. Proppants can have a size distribution, $d_{ps}$, from about 0.4 to about 1.0, or from about 0.4 to about 0.6, wherein $d_{ps} = (d_{p90} - d_{p10})/d_{p10}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size. Median particle size, $d_{p50}$, can be from about 90 µm to about 2000 µm, wherein $d_{p90}$ is a median particle size where 50% of the particles of the distribution have a smaller particle size.

The methods of the present invention can make proppants having controlled microsphere (and/or pore) dimensions and/or controlled microsphere (and/or pore) diameters. With respect to controlled microsphere dimensions and controlled microsphere diameters, the methods of the present invention can make microsphere sizes having uniform or nearly uniform dimensions and/or diameters for a plurality of microspheres, meaning that the method provides a tight distribution in the microsphere sizes. Microspheres (and/or pores) can have a size distribution, $d_{vs}$, from about 0.5 to about 10.0 or from about 0.5 to about 5.0, wherein $d_{vs} = (d_{v90} - d_{v10})/d_{v50}$ and wherein $d_{v10}$ is a microsphere size wherein 10% of the microspheres have a smaller microsphere size, $d_{v50}$ is a median microsphere size wherein 50% of the microspheres have a smaller microsphere size, and $d_{v90}$ is a microsphere size wherein 90% of the microspheres have a smaller microsphere size. Median microsphere size, $d_{v50}$, can be from about 0.1 µm to about 100 µm, wherein $d_{v50}$ is a median microsphere size where 50% of the microspheres of the distribution have a smaller microsphere size. Furthermore, a minimum of from about 50.1% to over 90%, such as from about 80% to about 90% (by number) of the microspheres are not connected to any adjacent microsphere. This keeps the average microsphere size low and also keeps flaws below the Griffiths critical flaw size thus reducing stress failure.

An unexpected feature of the invention is the ratio of microsphere size to particle size, $R_p$, and can be an important factor determining crush strength. $R_p$ is from about 0.001 to about 0.1, wherein $R_p = d_{v50}/d_{p50}$ wherein $d_{v50}$ is a median microsphere size where 50% of the microspheres of the distribution has a smaller microsphere size and $d_{p50}$ is a median particle size where 50% of the particles of the distribution have a smaller particle size.

The methods of the present invention can make proppants with a specific gravity of from about 1.0 to about 3.5, a microsphere total volume (the total volume taken up by all of the microspheres combined and present in the proppant) of from about 1% to about 95%, and a crush strength of from about 10 MPa to about 300 MPa, and a four point bending strength of about 50 MPa to 400 MPa or the proppant can have a specific gravity of from about 1.8 to about 2.25, a microsphere total volume of from about 1% to about 10%, and a crush strength of from about 10 MPa to about 300 MPa, and a four point bending strength of about 50 MPa to 400 MPa.

In present invention, the ceramic particles or any type of proppant particle can benefit from using membrane separation processes for one or more of the starting materials that are used to form the ceramic particles or any type of proppant. The membrane separation processes can be also useful in the final product as well.

The starting material(s) particle size and its distribution can be strictly controlled by membrane separation processes. The selected incoming raw materials can be dispersed into a slurry, such as an aqueous slurry like water. At least one dispersant can be used as well for improving the dispersion of the slurry. The slurry can be milled, such as through an attrition mill, ball mill, jet mill, hammer mill or any combination thereof. After milling or otherwise obtaining the desired general particle size, the slurry can be diluted to a desirable concentration, then feed into at least one membrane filtration device. By such a process, the larger particles are left in the filtration cake or in the retant slurry while the smaller particles remain in the effluent slurry. With such a process, the larger particles are filtered out. The effluent slurry can be then feed in to a second membrane filter with a smaller pore size. Going through the same process as described above, the filtration cake or the retant slurry having a narrow particle size distribution of raw materials is obtained. Essentially this membrane process permits a very accurate and controlled way to obtain a "cut" of desirable particle sizes, whereby the unwanted smaller particles and the unwanted larger particles are removed.

In the present invention, one can use the above membrane filtration process to separate particle size into various groups, such as with an average particle size of 0.2 micron, 0.5 micron, 1 micron, 1.5 micron, and 2.0 microns, and so on, depending on the membrane pore size. The width of the size distribution can be determined by the two "cuts" of membrane sizes. In general, a much narrower size distribution is desirable for product performance and this process permits such a distribution.

As an example, raw material particles with the same particle size distributions can be mixed, and then spray coated to form ceramic green spheres, or granulated in a granulator. Due to the same particle sizes, particle packing is well controlled. Pores between particles can be well preserved. During the firing process, particles sinter together, and the porosity can be well preserved after the firing process, with a narrow pore size distribution. By controlling the particle size with the narrow distribution, a pore size can be well controlled after the sintering process. Narrow pore size distribution can be achieved, so that an adequate amount of porosity can be added in to the ceramics, while most of mechanical strength can be preserved.

As a further example, two different size cuts of raw materials can be mixed together (e.g., 2 micron particles mixed with 0.5 micron particles and 0.2 micron particles), going through the forming processes described above. After forming, the green body can be subjected to firing at a high temperature, and a near zero porosity containing proppant can be produced.

In the present invention, two types of a membrane separation device can be used (e.g., a "dead end filtration" and another type is cross flow membrane separation.) The former one can handle a relatively high concentration of slurry, which yield a broader particle size distribution. The later gives very narrow and clean cut particles size distribution.

In the present invention, size control of the raw or starting material, provide the possibility of precise sintering under well controlled firing cycles. So the grain size growth can be controlled, and high strength materials with uniform small grain size materials can be produced under the same specific gravity.

In the present invention, the pore size can be well controlled, so an adequate amount of porosity can be added into a ceramic proppant, while loss of mechanical strength can be minimized. Therefore, high strength/low specific gravity proppant can be produced.

As an option, in the present invention, the various average particle sizes and/or particle size distributions are the same or about the same with respect to each of the starting materials that form the green body. When the particle sizes of one or more, and, preferably all of the starting materials that can have particle sizes, are about the same or the same, the formation of the green body by mixing the various starting materials together can be more uniform and the distribution of the different starting materials gets distributed throughout the green body in a more uniform way, such that the overall green body and the resulting sintered body, such as the proppant, has a uniform distribution of each of the starting materials, thereby forming a very consistent sintered body having consistent properties throughout the sintered body or selected parts or regions thereof, and thereby reducing the chances of a flaw or defect existing in the sintered body. The average particle size and/or distribution of two or more of the starting materials can be within +/−20% of each other, +/−15% of each other, +/−10% of each other, +/−7% of each other, +/−5% of each other, +/−4% of each other, +/−3% of each other, +/−2% of each other, +/−1% of each other, +/−0.75% of each other, +/−0.5% of each other, +/−0.25% of each other, +/−0.1% of each other, +/−0.05% of each other, or +/−0.01% of each other.

As a result of such techniques, such as the membrane filtration device, the particle size distribution for any of the starting materials, such as the ceramic or ceramic precursor, the microsphere former, metal oxide, metals, (or, for that matter, any particulate starting material) and the like can have a particle distribution that is very tight, such that the particle size distribution as defined herein ($d=[(D_{90}-D_{10})/D_{50}]$, wherein d is 0.4 to 1, such as 0.05 to 0.9, 0.07 to 0.5, 0.09 to 0.4, and the like.

In a present method, sintered, spherical proppants can be produced, for example, according to the following general method:

1. Silicon carbide and metal oxide are ground into an indicated or desired fine particle size and particle size distribution. The silicon carbide and metal oxide(s), and any other proppant components, can be ground independently and blended, or they can be blended and then co-milled. In either case, the silicon carbide can be homogenously mixed with and distributed in the metal oxide or other ceramic materials or proppant ingredients.

2. The silicon carbide, metal oxide(s), other components, and water are added in a predetermined ratio to a high intensity mixer, and stirred to form a wet homogeneous particulate mixture. Suitable commercially available intensive stirring or mixing devices used for this purpose can have a rotatable horizontal or inclined circular table and a rotatable impacting impeller, such as described in U.S. Pat. No. 3,690,622, to Brunner, the entire disclosure of which is incorporated herein by reference.

3. While the mixture is being stirred, sufficient water can be added to cause the formation of a composite, that is essentially spherical pellets of desired size from the mixture of silicon carbide, metal oxide(s), and any other components such that intense mixing action can rapidly disperse the water throughout the particles. In general, the total quantity of water which is sufficient to cause essentially spherical pellets to form is from about 15 to about 30 percent by weight of the mixture of silicon carbide and metal oxide(s), and any other components. The total mixing time can be, for example, from about 2 to about 15 minutes, or other time periods depending on equipment, settings, compositions, and conditions used. Those of ordinary skill in the art will understand how to determine a suitable amount of water to add to the mixer so that substantially round and spherical pellets are formed.

4. Optionally, a binder, for example, various resins or waxes, starch, or polyvinyl alcohol, may be added to the initial mixture to improve the formation of pellets and to increase the green strength of the unsintered pellets. Suitable binders include, but are not limited to, corn starch, polyvinyl alcohol or sodium silicate solution, or a blend thereof. Liquid binders can be added to the mixture and bentonite and/or various resins or waxes known and available to those of ordinary skill in the art may also be used as a binder. A suitable binder can be, for example, CERAFIX K33 (Zschimmer & Schwarz, Inc.—U.S. Division, Milledgeville, Ga.) or PVA 405 (Kuraray America, Inc., Houston, Tex.) and similar materials, which may be added at levels of from about 0 percent by weight to 10% by weight, or from 0.25% by weight to 1% by weight, or any other amount so as to assist formation of the pellets. Whether to use more or less binder than the values reported herein can be determined by one of ordinary skill in the art through routine experimentation.

5. Optionally, a dispersant such as a surfactant may be added to the initial mixture to improve the homogeneity of the green body material, improve the dispersion of particulates such as the metal oxide(s), microsphere formers such as SiC, binder and other materials and decrease the number of microsphere former particles that are in contact with each other. The dispersant also effectively reduces the time required to make a uniform mixture. Specific dispersants can include but are not limited to DOLAPIX CE 64 (Zschimmer & Schwarz, GmbH), DARVAN C (RT Vanderbilt Company, Industrial Minerals & Chemicals) and similar materials which may comprise from about 0% by weight to about 5% by weight of the green body material or any other amount to assist in the dispersion of materials in the slurrying agent.

6. Optionally, a sintering aid may be added to the initial mixture to enhance the bonding of particles in the ceramic and speed the sintering process by providing an internal source of oxygen. Sintering aids can include but are not limited to yttrium oxide ($Y_2O_3$) and cerium oxides ($CeO_2$, $Ce_2O_3$). Sintering aids may comprise from about 0% to about 5% by weight of the green body material or any other amount to enhance and speed the sintering process. Alternatively, the sintering aid may be added directly to the sintering furnace as a separate component that provides necessary oxygen for oxidation of the microsphere former through a redox reaction of the metal oxide, in addition to the green bodies and oxygen. In this case, the sintering aid may be added in an amount comprising from about 0% to about 50% by weight of the total material in the furnace.

7. The resulting pellets can be dried and screened to an appropriate pre-sintering size that can compensate for shrinkage that occurs during sintering. Rejected, oversized, and undersized pellets, and powdered material obtained after the drying and screening steps may be recycled. The pellets may also be screened either before drying or after firing or both.

8. The dried pellets are then fired at a sintering temperature for a period sufficient to enable recovery of sintered, spherical pellets having a specific gravity and crush strength of the present proppants. The sintered pellets can be screened for sizing purposes.

The slurry containing the green body material to form the green body can be sprayed or otherwise applied to a hot plate(s) (horizontal or inclined surface). The hot plate can have a metal or ceramic surface. A burner or a series of burners are located under the plate to provide heat to the hot plate surface. The surface is maintained above the evaporation temperature of the solvent (e.g., water) and preferably a lot higher (e.g., at least 10% higher or at least 30% or at least 50% higher in temperature). The droplet sizes are bigger in size than the desired dried size. For instance, the droplet size can be at least 10% larger, at least 50%, at least 100% larger than the final granule size that forms after evaporation occurs. The process/device described in U.S. Pat. No. 5,897,838 (incorporated in its entirety by reference herein) can be adopted as well for this purpose.

The dried pellets are sintered at a sintering temperature for a period sufficient to enable recovery of sintered, spherical pellets having the indicated specific gravity and strength features. The specific time and temperature to be employed in sintering the pellets is, of course, dependent on the ingredients and furnace employed. The optimum time and temperature for a given starting composition including silicon carbide can be determined empirically according to the results of physical testing of the resulting pellets after sintering.

The sintering temperature can be in the range, for example, of from about 900° C. to about 1700° C. in an atmosphere containing oxygen for about 1 hour to about 20 hours, or from about 1100° C. to about 1300° C. in an atmosphere containing oxygen for from about 4 to about 6 hours, or from about 1150° C. to about 1280° C. in an atmosphere containing oxygen for from about 4 to about 6 hours. These sintering temperature conditions, for example, have been found appropriate to achieve a balance between the microsphere placement and/or size (as an inverse function of specific gravity) and strength of proppants formed from metal oxide-SiC composites. The SiC can start to oxidize in air at around 900° C. At around 1150° C. to 1300° C. range, the formed $SiO_2$ can have a suitable viscosity to allow a hollow structure to be formed.

The oxidizing atmosphere provided in the reactor or furnace in which the metal oxide-SiC mixture is sintered has an oxygen content of from about 100 ppm to 100% oxygen, or from about 250 ppm to about 90% oxygen, or from about 500 ppm to about 79% oxygen, or from about 1000 ppm to about 50% oxygen, where percent is by weight of gas. The oxidizing atmosphere can comprise air.

The sintering process can be enhanced by the addition of one or more sintering promoters comprising a sintering aid, a glassy phase formation agent, a grain growth inhibitor, a ceramic strengthening agent, a crystallization control agent, or phase formation control agent, or any combination thereof. Sintering promoters can further comprise zirconium, iron, magnesium, alumina, bismuth, lanthanum, silicon, calcium, cerium, yttrium, a silicate, a borate or any combination thereof. Sintering promoters can further comprise a compound containing zirconium, iron, magnesium, alumina, bismuth, lanthanum, silicon, calcium, cerium, yttrium, a silicate, a borate or any combination thereof. A source of high oxygen content gas also can be introduced as a sintering promoter. Solid or liquid oxygen gas generating materials also can be used that release oxygen gas under sintering conditions. For example, solid oxygen gas generating materials, such as yttrium oxide ($Y_2O_3$), or cerium oxides ($CeO_2$, $Ce_2O_3$), can be used. The solid phase oxygen storage agent can be materials provided in powder or particulate form to facilitate their admixture and distribution throughout the green body material before sintering. In addition, the oxygen gas generating materials can be introduced directly into the sintering furnace. Alternatively, liquid or gas oxygen can be directly introduced into the sintering furnace, if there is not enough oxygen available for oxidation of microsphere former.

The gaseous pressure inside the reactor can be, for example, from about $0.1 \times 10^5$ Pa to about $10 \times 10^5$ Pa, or from about $0.5 \times 10^5$ Pa to about $7 \times 10^5$ Pa, or from about $1 \times 10^5$ Pa to about $5 \times 10^5$ Pa. If the gaseous pressure is too low in the reactor, insufficient carbon dioxide ($CO_2$) or carbon monoxide (CO) can form in reaction (1) to support the microsphere forming mechanism.

A balance of silicon dioxide viscosity also is needed so that the silica has a melt/flow property suitable to glaze inner surfaces of the microspheres being formed in the SiC with retention therein to enhance the strength of the microsphere containing product. If the silicon dioxide viscosity is too high or low, microspheres cannot form or efficiently form in the SiC. The $SiO_2$ viscosity can be, for example, from about $1 \times 10^5$ Pa·s to about $2 \times 10^6$ Pa·s, or from about $5 \times 10^5$ Pa·s to about $1 \times 10^6$ Pa·s, or from about $6 \times 10^5$ Pa·s to about $8 \times 10^5$ Pa·s.

Sintering conditions are controlled such that the silicon carbide is preferably only partially oxidized during sintering such that sufficient original SiC material is left intact to at least provide wall structure for the cells or voids blown into the material via the indicated reaction (1). After sintering, a metal oxide-SiC mixture, the resulting composite can retain at least about 60%, or at least about 70%, or at least about 80%, or at least about 85%, or at least about 90%, or at least about 95%, of the original SiC, wherein the percent is with reference to percent by weight of the overall silicon carbide present in the green body material. Stated differently, 5% or more, or 10% or more, or 15% or more, or 20% or more, or 30% or more, or 40% or more, or 50% or more, or 60% or more, but less than 100% of the silicon carbide present in the green body material can be converted to silicon dioxide by sintering, wherein the percent is with reference to percent by weight of the overall silicon carbide present in the green body material.

Sintering conditions can also be controlled such that substantially all of the SiC material is oxidized to form silicon dioxide and a carbonaceous gas, primarily CO and $CO_2$. In this case, the silicon dioxide provides a viscous material at sintering conditions promoting the formation of an expanding gas bubbles that form microspheres in the ceramic material. Furthermore, the bubble wall consisting primarily of silicon dioxide forms a coating on the interior surface of the microsphere producing a smoother surface that can increase crack resistance at the microsphere-ceramic interface.

Sintering furnaces that can be used as a reactor in the present method can be any vessel that would permit the present method with the indicated reaction (1) to be achieved. For instance, the reactor can be a fluidized bed furnace or fluidized furnace. The reactor can be a high temperature reactor, for instance, with process atmospheric control(s). Other types of furnaces can be used. The high temperature reactor can be a sealed chamber that permits control of the process atmosphere (composition, pressure, and the like) and can be heated by any means, including, but not limited to, radiant, infra-red, microwave, induction, RF, laser, self propagating combustion, and the like. The fluidized bed furnace can use air or an oxygen-containing gas, or an inert gas as the fluidizing medium where oxygen gas releasing material is included in the ceramic forming green body materials that include silicon carbide. Other gases can be included with the fluidizing medium. Alternatively, hydrogen or any reducing agent, such as NH3, can be used to react with reducible metal oxide in the ceramics to generate water vapor that acts as a blowing agent. The size of the void can be controlled by the size of reducible metal oxide particles within the ceramic and amount of reducing gas reaches to the reducible metal oxide particles. The fluidized medium can be, for example, an oxygen-containing fluid, which is optionally pre-heated. Other possible furnaces (or reactors) can include:

i. Rotary
  ii. Static Bed (or other dynamic bed furnace)
  iii. Muffled
  iv. Drop Tower
  v. Mechanical fluid bed where the air is recycled and/or
  vi. Microwave,
      These above furnaces generally use a sealed environment.
  vii. Conventional fluidized bed furnace.

The process can involve an oxidizing step or multiple oxidizing steps, which can comprise utilizing at least one oxygen-containing source in the presence of the green body material comprising silicon carbide. As indicated, the oxygen-containing source can be in the form of a gas fed into the furnace or an oxygen containing gas derived from solid or liquid oxygen-releasing source contained in the ceramic forming mixture including silicon carbide. Air or other oxygen-containing gases can be pre-heated, for instance, at a temperature of from about 25° C. to about 1500° C., or other temperatures, before introduction into the furnace. For purposes herein, reaction temperatures and pressures are determined inside the furnace. Other aspects of sintering applied to traditional production of ceramics can be adapted to the present methods, which include, for example, those disclosed in U.S. Pat. No. 7,459,209, which is incorporated in its entirety by reference herein.

The proppants can be made using or including spraying methods. Spray processing refers generally to coating a template material with a formulation, such as a composition comprising silicon carbide and a ceramic material or oxide thereof or metal oxide in the present invention, to form a shell around a template, and then this formulation can be sintered, such as using the indicated conditions and apparatus, to create a sintered shell having a densified structure. As indicated, the sintering can occur at any temperature to achieve oxidation of the silicon carbide and densification of the ceramic material or oxide thereof of metal oxide, such as from about 900° C. to about 1500° C. Sintering can occur by ramping up to the desired temperature. The sintering temperature is the temperature in the oven or sintering device. As indicated, the coating of the template material can be achieved by spray coating. For instance, in creating the shell, a mixture of silicon carbide and metal oxide, for example, can be coated onto a template material and then upon sintering, form a partly oxidized-microsphere containing silicon carbide and metal oxide coating. The formulation can be in the form of a slurry comprising the silicon carbide and ceramic material or oxide thereof or metal oxide along with a carrier such as a liquid carrier. When spray coating, a spray coating chamber can be used such as a spray coater from Vector Corporation, Model MLF.01. The formulation can be introduced as an atomized spray and the template material is suspended in air within the chamber during the coating of the template material. Ranges for key parameters for the spray coating process include, for example: Air temperature: 40-90° C., Airflow: 90-150 liters per minute, Nozzle Air Setting: 10-25 psi. After coating, the sintering can occur. Other guidance on spray coating methods and materials that can be applied to the present methods are set forth in U.S. Pat. No. 7,459,209 and U.S. Patent Application Publication No. 2009/0038797, which are incorporated in their entireties by reference herein.

After sintering the metal oxide-SiC powder mixture, the resulting metal oxide-SiC composite can have a microsphere (and/or pore) total volume of at least 6%, or at least about 10%, or at least about 15%, or at least about 20%, or at least about 25%, or at least about 30% or at least about 35%, or at least about 40%, or from about 6% to about 40%, or from about 10% to about 35%, or from about 15% to about 30%, or from about 20% to about 25%, or other ranges, wherein the percent is with reference to volume based on the overall volume of the composite or proppant. The microsphere total volume of the SiC component of the composite can represent at least about 50%, or at least about 60%, or at least about 70%, or at least about 80%, or at least about 90%, or at least about 95%, of the total microsphere total volume.

The present methods can include formulating the green body material to further comprise a fugitive microsphere and/or pore forming agent, in addition to or in place of the silicon carbide content. The fugitive pore forming material can be formed from material that can burn out or otherwise be removed at some point in the formation of the proppant. The fugitive pore forming agent can be a material that can be pyrolized during sintering of the green body material and leaves a void space within the sintered green body material. Examples include, but are not limited to, cellulose-based material, wood-based material, and carbonaceous material. Specific examples include, for example, crushed tree nut shell material (e.g., crushed walnut shells); carbon-based or carbonaceous material such as carbon black, carbon fibers, charcoal, activated carbon, toner particles, graphite, coal; paper and plant material; starch (e.g., rice starch, potato starch, corn starch, and the like), starch granules, flour, other particulates that are combustible, and the like. Also, the carbonaceous material may alternatively or additionally provide an additional source of carbon monoxide to serve as a pore forming gas. In the alternative or in addition, the presence of carbonaceous material, such as pulverized carbonaceous material, also can provide a source of carbon to form a silicon carbide in situ in the green body material. The fugitive microsphere and/or pore forming agent can be uniformly or nonuniformly present in the green body material or ceramic precursor powder mixture. The fugitive pore forming agent can then form void areas upon the fugitive material being optionally burned out (e.g., sintering) or otherwise removed by other means (e.g., chemical dissolution). The green body material optionally can contain hollow material (e.g., hollow spheres, hollow particulates, hollow materials having other shapes, wherein the hollow material can have one central void and/or multiple voids or cells). The amount of fugitive pore forming agent and/or microspheres or other hollow material can be any volume percentage based on the volume of the green body material. For instance, the fugitive pore and/or microsphere forming agent and/or hollow material can be present in a volume amount of from about 0% to about 15% by volume (e.g., 0.1% to 10%, 0.5% to 7%, 1% to 5% by volume). The fugitive pore and/or microsphere forming agent and/or hollow material can lighten and/or toughen the proppant from the standpoint of crush strength due to this amount. When amounts greater than 15% by volume are present, this amount may lead solely to a supplemental lightening effect (e.g., overall lowering of density and/or weight of the proppant) as opposed to any supplemental strengthening effect. The size diameter of the fugitive pore and/or microsphere forming material can be, for example, from 0.2 to 2 microns such as 0.2 to 1 micron. The hollow material can be smaller in size than the fugitive pore and/or microsphere forming material. The sizes can be, for instance from about 0.1 micron and 0.2 micron, to 10 microns or greater. For any of the above particle sizes, these numbers can be an average particle size, or can be maximum particles sizes. The hollow material can be obtained from: Apollo SRI and Nanoridge Materials, or formed following U.S. Pat. No. 7,220,454, incorporated herein by reference. As stated previously, the pore former would be a material that forms a pore(s) without any walls, and wherein the boundaries are defined by the matrix that surrounds it, whereas a microsphere former is a material that forms a microsphere that has its own walls that define the microsphere.

The fugitive pore and/or microsphere forming material can be "burned" out during the heating cycle and usually occurs at temperatures less than that of sintering. In the case of carbon based fugitive microsphere and/or pore forming material, the decomposition temperature can be from about 400° C. to about 800° C. in an oxidizing atmosphere (the temperature being dependent upon the fugitive microsphere and/or pore forming phase). Other temperatures can be used. The temperatures herein are a reference to the temperature of the material being subjected to the heating. The actual time for "burn-out" of the fugitive microsphere and/or pore forming material may vary from 15 minutes up to 60 minutes or more. Alternatively, the heating rate may be slowed from about 400° C. to about 800° C. to allow time for "burn-out" to occur without the requirement for a dwell time at a specific temperature. The size of the fugitive microsphere and/or pore forming material and/or hollow material that can be used can vary in diameter size of from about 0.1 μm to about 10 μm, such as from about 0.1 μm to about 0.5 μm or other sizes can be used.

The proppant can further comprise additional components used to contribute one or more properties to the proppant. For instance, the proppant can further comprise at least one sintering aid, glassy phase formation agent, grain growth inhibitor, ceramic strengthening agent, crystallization control agent, and/or phase formation control agent, or any combination thereof. It is to be understood that more than one of any one of these components can be present and any combination can be present. For instance, two or more sintering aids can be present, and so on. There is no limit to the combination of various agents or the number of different agents used. Generally, one or more of these additional agents or aids can include the presence of zirconium, iron, magnesium, alumina, bismuth, lanthanum, silicon, calcium, cerium, yttrium, one or more silicates, one or more borates, or one or more oxides thereof, or any combination thereof. For instance, a sintering aid can assist in permitting uniform and consistent sintering of the ceramic material or oxide. A glassy phase formation agent, such as a silicate, generally can enhance sintering by forming a viscous liquid phase upon heating in the sintering process. A grain growth inhibitor can assist in controlling the overall size of the grain. A ceramic strengthening agent can provide the ability to strengthen the overall crush strength of the proppant. A crystallization control agent can assist in achieving a desired crystalline phase of the proppant upon heat treatment such as sintering. For instance, a crystallization control agent can assist in ensuring that a desirable phase is formed, such as an alpha aluminum oxide. A phase formation control agent can be the same or similar to a crystallization control agent, but can also include assisting in achieving one or more amorphous phases (in addition to crystalline phases), or combinations thereof. The various aids and/or agents can be present in any amount effective to achieve the purposes described above. For instance, the aid and/or agents can be present in an amount of from about 0.1% to about 5% by weight of the overall weight of the proppant. The proppant(s) can comprise one or more crystalline phases and/or one or more glassy phases, or combinations thereof.

The present invention further relates to lightweight high strength proppant products formed by the above processes and compositions.

The proppant of the present invention can have a specific gravity of from about 0.8 to about 3.0, a microsphere (and/or pore) total volume of from about 6% to about 40% by volume, and/or a crush strength of from about 10 MPa to about 180 MPa. The proppant product can have, for example, a specific gravity of from about 1.8 to about 2.25, a microsphere (and/or pore) total volume of from about 6% to about 25% by volume, and/or a crush strength of from about 10 MPa to about 100 MPa. The proppant can have a microsphere (and/or pore) total volume of from about 6% to about 40% by volume and at least 90% (by volume) of the microspheres (and/or pore) having a microsphere (and/or pore) size of from about 0.1 μm to about 10 μm, or has a microsphere (and/or pore) total volume of from about 6% to about 30% by volume and at least 95% (by volume) of the microspheres (and/or pore) having a microsphere (and/or pore) size of from about 0.1 μm to about 5 μm, or has a microsphere (and/or pore) total volume of from about 10% to about 25% by volume and at least 95% (by volume) of the microspheres (and/or pores) having a microsphere (and/or pore) size of from about 1 μm to about 5 μm. For any of the above particle sizes, these numbers can be an average particle size, or can be maximum particles sizes. Unless indicated otherwise, microsphere (and/or pore) size is determined as maximum microsphere (and/or pore) dimension as visible on a scaled SEM image of a cross-section of the proppant particle.

The proppants of the present invention can comprise a single particle or multiple particles. The green body material can be in any shape and preferably is in a shape desirable for proppant use, such as particulates. The particle can be spherical, nearly spherical, oblong in shape, doughnut shape, star shape (or any combination thereof) or have other shapes suitable for purposes of being a proppant. For instance, the green body material can be in the shape of a sphere. The term "spherical" can refer to roundness and sphericity on the Krumbein and Sloss Chart by visually grading 10 to 20 randomly selected particles. The green body material can have a shape of a sphere having a Krumbein sphericity of at least about 0.5 and a roundness of at least about 0.5, or a Krumbein sphericity of at least about 0.6 and a roundness of at least about 0.6, or a Krumbein sphericity of at least about 0.7 and a roundness of at least about 0.7.

The proppant can have any particle size adequate to support the microsphere containing silicon carbide component.

For instance, the proppant can have an overall particle diameter size of from about 90 microns to about 2000 microns, or a diameter of from about 100 microns to about 1500 microns, or a diameter of from about 300 microns to about 1000 microns. Other particle sizes can be used. The optimum size of the proppant product can also be dependent on the particular application. Further, the particle sizes as measured by their diameter can be above the numerical ranges provided herein or below the numerical ranges provided herein.

The proppant also can have one or any combination of the following characteristics (a)-(g):
(a) an overall diameter of from about 90 microns to about 2,000 microns;
(b) a Krumbein sphericity of at least about 0.5 and a roundness of at least about 0.5;
(c) a crush strength of about 10 MPa or greater;
(d) a specific gravity of from about 1.0 to about 3.0;
(e) a microsphere (and/or pore) total volume of from about 6% to about 40%; and
(f) at least 90% of the microspheres (and/or pores) having a microsphere (and/or pore) size of from about 0.1 µm to about 10 µm; and
(g) at least 50.1% or at least 80% of the microspheres (and/or pores) are not in contact with each other.

An unexpected benefit of glass-ceramic, ceramic, metal or any combination thereof particles produced by the method of the present invention is a concentration gradient formed at the interface of the in situ microsphere and the glass-ceramic, ceramic, metal or any combination thereof matrix in a sintered ceramic article. Moving from the interior of the in situ microsphere radially into the glass-ceramic, ceramic, metal or any combination thereof matrix, the ratio of microsphere material to matrix material can vary in any manner, linear or non-linear. Concentration gradients at interface of the in situ microsphere and the glass-ceramic, ceramic, metal or any combination thereof is important because of potential mismatches in coefficient of thermal expansion (CTE). If the matrix material and the in situ microsphere material differ in CTE, stresses can occur during the sintering process and also possibly in the end use of the glass-ceramic, ceramic, metal or any combination thereof article. The thermally induced stresses can weaken the glass-ceramic, ceramic, metal or any combination thereof article. By controlling the material choice, temperature, pressure, gases present, sintering temperature and sintering time appropriate gradients can be formed and CTE mismatch can be controlled to avoid weakening of the glass-ceramic, ceramic, metal or any combination thereof article.

The present invention also relates to a method to prop open subterranean formation fractures comprising introducing the present proppants into a subterranean formation.

One or more proppants of the present invention can be used alone or in a formulation to prop open subterranean formation fractions by introducing the proppant formulation into the subterranean formation such as by pumping or other introduction means known to those skilled in the art. In proppant formulations of the present invention, the present proppant can be suspended in a flowable medium. The liquid phase may make the proppant easier to transport to a drill site. Transportation may be by rail transport, road or ship, or any other appropriate method, depending on geography and economic conditions. In addition to transport to the drill site, the suspended mixture is preferably pumpable or otherwise transportable down the well to a subterranean formation and placed such as to allow the flow of hydrocarbons out of the formation. The flowable medium chosen for pumping the proppant can be any desired medium capable of transporting the proppant to its desired location including, but not limited to a gas and/or liquid, energized fluid, foam, like aqueous solutions, such as water, brine solutions, and/or synthetic solutions.

An example of a well completion operation using a treating fluid containing proppants or particles is gravel packing. In gravel packing operations, particles referred to in the art as gravel are carried to a subterranean producing zone in which a gravel pack is to be placed by a hydrocarbon or water carrying fluid (or other carrier source, such as a fluid, energized fluid, foam, gas, and the like). That is, the particles are suspended in the carrier fluid, which can be viscosified and the carrier fluid is pumped into the subterranean producing zone in which a gravel pack is to be placed. Once the particles are placed in the zone, the treating fluid leaks off into the subterranean zone and/or is returned to the surface. The gravel pack produced functions as a filter to separate formation solids from produced fluids while permitting the produced fluids to flow into and through the well bore. An example of a production stimulation treatment utilizing a treating fluid having particles suspended therein is hydraulic fracturing. That is, a treating fluid, referred to in the art as a fracturing fluid, is pumped through a well bore into a subterranean zone to be stimulated at a rate and pressure such that fractures are formed and extended into the subterranean zone. At least a portion of the fracturing fluid carries particles, referred to in the art as proppant particles into the formed fractures. The particles are deposited in the fractures and the fracturing fluid leaks off into the subterranean zone and/or is returned to the surface. The particles function to prevent the formed fractures from closing whereby conductive channels are formed through which produced fluids can flow to the well bore. The present proppants can be used in such well completion and production stimulation treatments.

The present invention provides improvements with respect to proppant technology. Currently, there is a balance of properties that must be met, such as with respect to specific gravity or buoyancy and/or sufficient crush strength. In the past, if one wanted to achieve a proppant having sufficient crush strength, the specific gravity and density of the overall proppant was too high such that the proppant would be difficult to pump to the particular location in the subterranean formation or, when in the subterranean formation, the proppant would not be uniformly distributed since the proppant was too heavy and would sink in the medium used to transport the proppant. On the other hand, some proppants may have sufficient low specific gravity, meaning that the proppant would satisfy buoyancy requirements, however, by doing so, the proppant typically does not have reliable crush strength and, therefore, the proppant would fail (e.g., deform, fracture or break) once in the subterranean formation, if not earlier. The present proppants have a desirable balance of specific gravity (buoyancy) and strength properties as made by the indicated present methods in which a ceramic precursor powder mixture including SiC is sintered under conditions allowing for oxidation and void formation in the SiC component of the resulting composite product.

The present proppants can exhibit high buoyancy and high crush strength, and also may have high sphericity, narrow size distribution, and/or high smoothness. The size, size distribution, micro sphere size distribution, shape, and/or surface smoothness properties of the present proppants suggest that flow resistance through the proppant pack could be reduced, such as by more than 50%, or other values. Buoyancy enhances proppant transport into the formation, increasing the amount of fracture-area propped thereby increasing the mechanical strength of the reservoir. Without desiring to be bound to any particular theory, it is believed that the present proppants can achieve substantially increased flow rates and/or enhanced hydrocarbon recovery. Further, proppants of the present invention can be made without requiring significant additional process operations in the proppant production line as compared to some conventional synthetic proppant production. Relatively low or at least non-substantially increased production cost of the present proppants, and reduced material requirements (on a per pound basis), can be advantages of the present proppants. The low specific gravity of the present invention's proppants may enable reductions in transportation costs in certain situations. Also, a lighter proppant allows more proppant to be added, which can be useful in hydraulic fracturing operations or other uses. Also, pumping costs can be lower because the proppant is lighter and therefore less pumping force is needed which is helpful to costs and does less damage to the formation since less pump pressure is used to pump the same volume of material. Once in place, the proppants can prop open subterranean formations with high strength. Significantly improved flow rate of the hydrocarbon recovery can occur in a more sustained manner.

The proppants of the present invention also can present oil and gas producers with one or more of the following benefits: improved flow rates, improved productive life of wells, improved ability to design hydraulic fractures, and/or reduced environmental impact. The proppants of the present invention also can eliminate or materially reduce the use of permeability destroying polymer gels, and/or reduce pressure drop through the proppant pack, and/or the ability to reduce the amount of water trapped between proppants thereby increasing hydrocarbon "flow area."

The high density of conventional ceramic proppants and sands (roughly 100 lb/cu.ft.) inhibit their transport inside fractures. High density causes proppants to "settle out" when pumped thereby minimizing their efficacy. To maintain dense proppants in solution, expensive polymer gels are typically mixed with the carrier solution (e.g. completion fluid). Once suspended in a gelled completion fluid, proppant transport is considerably enhanced. Polymer gels are extremely difficult to de-cross link, however. As a result, the gel becomes trapped downhole, coats the fracture, and thereby reduces reservoir permeability. Gel-related reservoir permeability "damage factors" can range from 40% to more than 80% depending on formation type. The lightweight high strength buoyancy property that can be exhibited by the proppants of the present invention can eliminate or greatly reduce the need to employ permeability destroying polymer gels, as they naturally stay in suspension. The use of extreme pressure, polymer gels, and/or exotic completion fluids to place ceramic proppants into formations adversely impacts the mechanical strength of the reservoir and shortens its economic life. Proppants of the present invention can enable the use of simpler completion fluids and possibly less (or slower) destructive pumping. Thus, reservoirs packed with buoyant proppants preferably exhibit improved mechanical strength/permeability and thus increased economic life.

Enhanced proppant transport enabled by buoyancy also may enable the placement of the present proppants in areas that were heretofore impossible, or at least very difficult to prop. As a result, the mechanical strength of the formation can be improved, and can reduce decline rates over time. This benefit could be of significant importance, especially within hydraulic fractures ("water fracs") where the ability to place proppants can be extremely limited. If neutrally buoyant proppants are employed, for example, water (fresh to heavy brines) may be used in place of more exotic completion fluids. The use of simpler completion fluids can reduce or eliminate the need to employ de-crossing linking agents. Further, increased use of environmentally friendly proppants may reduce the need to employ other environmentally damaging completion techniques such as flashing formations with hydrochloric acid. In addition to fresh water, salt water and brines, or synthetic fluids are sometimes used in placing proppants to the desired locations. These are of particular importance for deep wells.

While the term proppant has been used to identify the preferred use of the materials of the present invention, it is to be understood that the materials of the present invention can be used in other applications. The microsphere containing ceramic particles and SiC composites of the present invention also can be used to form other products, such as, for example, matrix materials, concrete formulations, composite reinforcement phase, thermal insulating material, electrical insulating material, abrasive material, catalyst substrate and/or support, chromatography column materials (e.g., column packings), reflux tower materials (e.g., reflux tower packings, for instance, in distillation columns), and the like. The SiC composites also may be used in medical applications, filtration, polymeric applications, catalysts, rubber applications, filler applications, drug delivery, pharmaceutical applications, and the like.

A matrix can comprise a plurality of the microsphere containing ceramic particles and at least one solid matrix material in which the microsphere containing ceramic particles are distributed. The microsphere containing ceramic particles of the present invention can be used as a composite material reinforcement phase, where the microsphere containing ceramic particles serve to toughen and/or strengthen the composite structure and are distributed homogenously within a matrix material. The matrix material can be ceramic, polymeric, or metallic or a combination thereof.

The microsphere containing ceramic particle can be used as a thermal insulating material either alone or in combination with other materials as a cavity filling material or alternatively as a monolithic type structure, e.g. block, tube, sheet, rod, and the like. The microsphere containing ceramic particle can be used as an electrical insulating material, either as a cavity filling material or in combination with other materials as a monolithic type structure, e.g. block, sheet, tube, rod, and the like. The microsphere containing ceramic particles can be used as an abrasive material either singly or incorporated into a resinous or polymeric matrix and formed into discs, rods, sheets, cups, wheels, and the like. The microsphere containing ceramic particles can be used as substrates for catalysts. The microsphere containing ceramic particles can be used as column packing for chromatography applications. The microsphere containing ceramic particles can be used as reflux tower packing in distillation columns. The present invention includes a matrix comprising a plurality of the microsphere containing ceramic particles of the present invention and at least one matrix material. The microsphere containing ceramic particle can have the outer surface of the microsphere containing ceramic particle treated after forming to modify or impart a hydrophobic nature or hydrophilic nature of the microsphere containing ceramic particle. The microsphere containing ceramic particle can have an outer surface that is treated after forming to produce, for example, a hydro neutral surface.

U.S. Pat. Nos. 4,547,468; 6,632,527 B1; 4,493,875; 5,212,143; 4,777,154; 4,637,990; 4,671,909; 5,397,759; 5,225,123; 4,743,545; 4,415,512; 4,303,432; 4,303,433; 4,303,431; 4,303,730; and 4,303,736 relating to the use of proppants, conventional components, formulations, and the like can be used with the proppants of the present invention, and are incorporated in their entirety by reference herein. The processes described in AMERICAN CERAMIC SOCIETY BULLETIN, Vol. 85, No. 1, January 2006, and U.S. Pat. Nos. 6,528,446; 4,725,390; 6,197,073; 5,472,648; 5,420,086; and 5,183,493, and U.S. Patent Application Publication No. 2004/0012105 can be used herein and is incorporated in its entirety herein.

The proppants or composite materials embodied by the microsphere containing ceramic particles of the present invention can be used in a variety of areas. The microsphere containing ceramic particles can be used as substrates as semi-permeable membranes in processes for carrying out gas and liquid separations and for use as substrates for catalysts and enzymes. The microsphere containing ceramic particles can be used in processes for the manufacture and purification of pharmaceutical or chemical products, for instance, using or derived from genetically-engineered bacteria, natural living organisms, and enzymes. The microsphere containing ceramic particles of the present invention can be used as containers for liquids, adsorbents, absorbents, or catalysts or as containers for chemical agents whose release is subject to predetermined control (e.g., controlled slow release).

The microsphere containing ceramic particles of the present invention can be used in one or more of the following areas as a composition, an additive, and/or to fully replace or partially replace the filler or reinforcing agent conventionally used, using similar or the same amounts, or lesser amounts, to achieve the same or improved properties: proppants for oil and gas industry, lightweight high strength fillers for polymers, syntactic foams for aerospace applications, high performance fillers for cement and concrete, high performance refractory materials, high strength, lightweight insulating materials, carriers for catalysis systems, water treatment systems, high strength, lightweight particulate reinforcements for polymer matrix composites, high strength, lightweight particulate reinforcements for ceramic matrix composites, high strength, lightweight particulate reinforcements for metal matrix composites, high performance casting sand for metal casting applications, or friction reducing fillers for polymer processing systems (e.g. extrusion, die casting, etc). Matrix materials may include, but are not limited to the following: polymeric systems such as polyesters, epoxies and urethanes, polyethylenes, polypropylenes, and the like, calcium silicate based cement systems, calcium aluminate based cement systems, foamed polymeric systems, extruded polymeric systems, and ceramic systems.

The present invention is not only limited to the fabrication of microsphere containing ceramic particles, but may also be applied to matrix materials and filler materials for cements, cement fiber board systems, drywall fillers, caulks, polymeric systems and other such applications that require high strength, low density filler materials.

Again, as stated above, in all of the embodiments and discussions regarding the use of a microsphere former, a particle containing a microsphere, methods to make a proppant or particle containing a microsphere, it is understood that in addition to, or in the alternative, a pore former can be used to form a pore containing proppant or particle, such as a pore containing ceramic particle or pore containing ceramic proppant, and each of the parameters, ranges, properties, and the like for the microsphere applies equally to these pore embodiments as well.

The present invention includes the following aspects/embodiments/features in any order and/or in any combination:

1. A method for producing a microsphere and/or pore containing ceramic particle, said method comprising
  a. forming a green body from a green body material that comprises at least one ceramic or ceramic precursor and at least one microsphere and/or pore former, wherein a majority of said microsphere and/or pore formers are distributed in said green body such that the majority of said microsphere and/or pore formers are not in contact with each other, and said microsphere and/or pore formers have a substantially uniform shape and size;
  b. sintering said green body under sintering conditions to form a sintered body having a plurality of microspheres and/or pores contained therein, and wherein said microspheres and/or pores are optionally at least partially surrounded by at least one glassy compound, and a majority of said microspheres and/or pores are not in contact with each other.

2. The method of any preceding or following embodiment/feature/aspect, wherein said ceramic or ceramic precursor comprises cordierite, mullite, bauxite, silica, spodumene, silicon oxide, aluminum oxide, sodium oxide, potassium oxide, calcium oxide, zirconium oxide, lithium oxide, iron oxide, spinet steatite, a silicate, a substituted alumino silicate clay, an inorganic nitride, an inorganic carbide, a non-oxide ceramic or any combination thereof.

3. The method of any preceding or following embodiment/feature/aspect, wherein said ceramic or ceramic precursor has a particle size distribution, $d_{gs}$, from about 0.5 to about 15, wherein, $d_{gs} = \{(d_{g90} - d_{g10})/d_{g50}\}$ wherein $d_{g10}$ is a particle size wherein 10% of the particles have a smaller particle size, $d_{g50}$ is a median particle size wherein 50% of the particles have a smaller particle size, and $d_{g90}$ is a particle size wherein 90% of the particle volume has a smaller particle size.

4. The method of any preceding or following embodiment/feature/aspect, wherein said ceramic or ceramic precursor has a particle size distribution, $d_{gs}$, from about 1.0 to about 6.0.

5. The method of any preceding or following embodiment/feature/aspect, wherein the median particle size, $d_{g50}$, of said ceramic or ceramic precursor is from about 0.01 μm to about 100 μm, wherein $d_{g50}$ is a median particle size where 50% of the particles of the distribution have a smaller particle size.

6. The method of any preceding or following embodiment/feature/aspect, wherein the median particle size, $d_{g50}$, of said ceramic or ceramic precursor is from about 1 μm to about 5 μm, wherein $d_{g50}$ is a median particle size where 50% of the particles of the distribution have a smaller particle size.

7. The method of any preceding or following embodiment/feature/aspect, wherein said ceramic or ceramic precursor comprises from about 50% by weight to about 99.9% by weight of said green body.

8. The method of any preceding or following embodiment/feature/aspect, wherein said ceramic or ceramic precursor comprises from about 90% by weight to about 99.9% by weight of said green body.

9. The method of any preceding or following embodiment/feature/aspect, wherein said microsphere and/or pore former is capable of forming said glassy compound and said gas.

10. The method of any preceding or following embodiment/feature/aspect, wherein said microsphere and/or pore former comprises a carbide, a nitride, an oxynitride, a sulfide, a halide, a boride or any combination thereof.

11. The method of any preceding or following embodiment/feature/aspect, wherein said microsphere and/or pore former comprises an organometalic compound or a composite.

12. The method of any preceding or following embodiment/feature/aspect, wherein said microsphere and/or pore former comprises a metallic alloy with at least one metal capable of forming an oxide vapor.

13. The method of any preceding or following embodiment/feature/aspect, wherein said microsphere and/or pore former is silicon carbide.

14. The method of any preceding or following embodiment/feature/aspect, wherein said silicon carbide has a surface area (BET) of from about 0.5 m$^2$/g to about 100 m$^2$/g.

15. The method of any preceding or following embodiment/feature/aspect, wherein said silicon carbide has a surface area (BET) of from about 8 m$^2$/g to about 15 m$^2$/g.

16. The method according to any preceding or following embodiment/feature/aspect, wherein gas is produced by a chemical reaction of said microsphere and/or pore former with an oxidizing agent comprising oxygen, air, a peroxide or any combination thereof.

17. The method of any preceding or following embodiment/feature/aspect, wherein said gas is carbon monoxide, carbon dioxide or any combination thereof.

18. The method of any preceding or following embodiment/feature/aspect, wherein said glassy compound is silicon dioxide.

19. The method of any preceding or following embodiment/feature/aspect, wherein the viscosity of said silicon dioxide is from about $1\times10^5$ Pa·s to about $2\times10^6$ Pa·s.

20. The method of any preceding or following embodiment/feature/aspect, wherein the viscosity of said silicon dioxide is from about $6\times10^5$ Pa·s to about $8\times10^5$ Pa·s.

21. The method of any preceding or following embodiment/feature/aspect, wherein the viscosity of said silicon dioxide is from about $5\times10^5$ Pa·s to about $1\times10^6$ Pa·s.

22. The method of any preceding or following embodiment/feature/aspect, wherein said microsphere and/or pore former comprises a combustible inorganic or organic material.

23. The method of any preceding or following embodiment/feature/aspect, wherein said combustible inorganic or organic material comprises cellulose-based material, wood-based material, and carbonaceous material, or any combination thereof.

24. The method of any preceding or following embodiment/feature/aspect, wherein said combustible inorganic or organic material comprises crushed tree nut shell material, carbon black, carbon fiber, charcoal, activated carbon, carbon toner, graphite, coal, paper, plant material, starch, starch granules, flour, or any combination thereof.

25. The method of any preceding or following embodiment/feature/aspect, wherein said microsphere and/or pore former at least partially decomposes to generate a gas.

26. The method of any preceding or following embodiment/feature/aspect, wherein said microsphere and/or pore former comprises a carbonate, a nitrate, a sulfate, a sulfite, a chlorate, a bromates, an iodinate, borax, a phosphate, a peroxide, a persulfide, a perchlorate, a perbromate, an ammonium salt or any combination thereof.

27. The method of any preceding or following embodiment/feature/aspect, wherein said microsphere and/or pore former comprises a microorganism that produces and release a gas.

28. The method of any preceding or following embodiment/feature/aspect, wherein said microsphere and/or pore former swells in the presence of moisture.

29. The method of any preceding or following embodiment/feature/aspect, wherein said microsphere and/or pore former has a particle size distribution, $d_{fs}$, from about 0.5 to about 5.0, wherein, $d_{fs}=\{d_{f90}-d_{f10}\}/d_{f50}\}$ wherein $d_{f10}$ is a particle size wherein 10% of the particles have a smaller particle size, $d_{f50}$ is a median particle size wherein 50% of the particles have a smaller particle size, and $d_{f90}$ is a particle size wherein 90% of the particles have a smaller particle size.

30. The method of any preceding or following embodiment/feature/aspect, wherein said microsphere and/or pore former has a particle size distribution, $d_{fs}$, from about 0.5 to about 1.5.

31. The method of any preceding or following embodiment/feature/aspect, wherein the median particle size, $d_{f50}$, of said microsphere and/or pore former is from about 0.01 μm to 50 μm, wherein $d_{f50}$ is a median particle size where 50% of the particles of the distribution have a smaller particle size.

32. The method of any preceding or following embodiment/feature/aspect, wherein the median particle size, $d_{f50}$, of said microsphere and/or pore former is from about 0.2 μm to about 5 μm, wherein $d_{f50}$ is a median particle size where 50% of the particles of the distribution have a smaller particle size.

33. The method of any preceding or following embodiment/feature/aspect, wherein said microsphere and/or pore former comprises from about 0.01% by weight to about 90% by weight of said green body.

34. The method of any preceding or following embodiment/feature/aspect, wherein said microsphere and/or pore former comprises from about 0.01% by weight to about 50% by weight of said green body.

35. The method of any preceding or following embodiment/feature/aspect, wherein said microsphere and/or pore former comprises from about 0.01% by weight to about 10% by weight of said green body.

36. The method of any preceding or following embodiment/feature/aspect, wherein said green body material further comprises at least one slurrying agent.

37. The method of any preceding or following embodiment/feature/aspect, wherein said slurrying agent comprises water, an organic solvent or any combination thereof.

38. The method of any preceding or following embodiment/feature/aspect, wherein the green body material further comprises at least one sintering promoter comprising a sintering aid, a glassy phase formation agent, a grain growth inhibitor, a ceramic strengthening agent, a crystallization control agent, or phase formation control agent, or any combination thereof.

39. The method of any preceding or following embodiment/feature/aspect, wherein said sintering promoter comprises zirconium, iron, magnesium, alumina, bismuth, lanthanum, silicon, calcium, cerium, yttrium, a silicate, a borate or any combination thereof.

40. The method of any preceding or following embodiment/feature/aspect, wherein said sintering promoter comprises a compound containing zirconium, iron, magnesium, alumina, bismuth, lanthanum, silicon, calcium, cerium, yttrium, a silicate, a borate or any combination thereof.

41. The method of any preceding or following embodiment/feature/aspect, wherein said green body material further comprises yttrium oxide, cerium oxide and any combination thereof.

42. The method of any preceding or following embodiment/feature/aspect, wherein said green body material further comprises a binder.

43. The method of any preceding or following embodiment/feature/aspect, wherein said binder comprises a wax, a starch, polyvinyl alcohol, a sodium silicate solution, a low molecular weight functionalized polymer or any combination thereof.

44. The method of any preceding or following embodiment/feature/aspect, wherein said green body material further comprises a dispersant.

45. The method of any preceding or following embodiment/feature/aspect, wherein said dispersant comprises a surfactant.

46. The method of any preceding or following embodiment/feature/aspect, wherein said green body comprises one or more layers of said green body material.

47. The method of any preceding or following embodiment/feature/aspect, wherein said layers are of differing compositions of said green body material.

48. The method of any preceding or following embodiment/feature/aspect, wherein said layers comprise different said $d_{gs}$, said $d_{g50}$, said $d_{fs}$, said $d_{f50}$ and any combination thereof.

49. The method of any preceding or following embodiment/feature/aspect, wherein said forming a green body is produced by spray drying, die pressing, extrusion coating, fluidized bed coating, mixer granulation, high shear mixing, roller compaction injection molding, tumbling or any combination thereof.

50. The method of any preceding or following embodiment/feature/aspect, wherein said green body further comprises a hollow template.

51. The method of any preceding or following embodiment/feature/aspect, wherein said hollow template comprises a cenosphere, a micro glass sphere, a synthetic cenosphere, a polymer bead or any combination thereof.

52. The method of any preceding or following embodiment/feature/aspect, wherein said green body is formed by deposition of said green body material onto said hollow template.

53. The method of any preceding or following embodiment/feature/aspect, wherein said deposition comprises spray drying, fluidized bed coating or any combination thereof.

54. The method of any preceding or following embodiment/feature/aspect, wherein said spray drying is performed at an air temperature from about 40° C. to about 90° C., air flow from about 90 liters per minute to about 150 liters per minute, and nozzle air pressure from about 10 psig to about 25 psig.

55. The method of any preceding or following embodiment/feature/aspect, wherein said sintering is performed in the presence of a gas.

56. The method of any preceding or following embodiment/feature/aspect, wherein said gas comprises from about 100 ppm to about 100% by weight oxygen.

57. The method of any preceding or following embodiment/feature/aspect, wherein said gas comprises from about 250 ppm to about 90% by weight oxygen.

58. The method of any preceding or following embodiment/feature/aspect, wherein said gas comprises from about 500 ppm to about 79% by weight oxygen.

59. The method of any preceding or following embodiment/feature/aspect, wherein said gas comprises from about 1000 ppm to about 50% by weight oxygen.

60. The method of any preceding or following embodiment/feature/aspect, wherein said sintering further comprises yttrium oxide, cerium oxide and any combination thereof introduced into the sintering furnace as a separate component.

61. The method of any preceding or following embodiment/feature/aspect, wherein said sintering is performed under a pressure of from about $0.1 \times 10^5$ Pa to about $10 \times 10^5$ Pa.

62. The method of any preceding or following embodiment/feature/aspect, wherein said sintering is performed under a pressure of from about $0.5 \times 10^5$ Pa to about $7 \times 10^5$ Pa.

63. The method of any preceding or following embodiment/feature/aspect, wherein said sintering is performed under a pressure of from about $1 \times 10^5$ Pa to about $5 \times 10^5$ Pa.

64. The method of any preceding or following embodiment/feature/aspect, wherein said sintering comprises induction heating, rotary kiln, microwave, tunnel kiln, shutter kiln, electric furnace, gas furnace, convection furnace, self-propagation high temperature sintering, radiation, plasma, spark plasma, roller hearth, chain hearth, pusher sled, vertical shaft furnace or any combination thereof.

65. The method of any preceding or following embodiment/feature/aspect, wherein said sintering creates reactive diffusion or local melting of said ceramic or ceramic precursor in said green body.

66. The method of any preceding or following embodiment/feature/aspect, wherein said sintering is performed at a temperature from about 500° C. to about 2500° C. and said pressure is from about 0.1 MPa to about 200 MPa for about 1 hour to about 20 hours.

67. The method of any preceding or following embodiment/feature/aspect, wherein said sintering is performed at a temperature from about 1100° C. to about 1300° C. and said pressure is from about 0.1 MPa to about 200 MPa for about 4 hours to about 6 hours.

68. The method of any preceding or following embodiment/feature/aspect, wherein said sintering is performed at a firing rate from about 0.01° C./min to about 2000° C./min.

69. The method of any preceding or following embodiment/feature/aspect, wherein said sintering creates a reactive liquid phase of said ceramics or ceramic precursor in said green body.

70. The method of any preceding or following embodiment/feature/aspect, wherein said temperature is from about 500° C. to about 2500° C. and said pressure is from about 0.1 MPa to about 200 MPa for about 1 hour to about 20 hours.

71. The method of any preceding or following embodiment/feature/aspect, wherein said temperature is from about 1100° C. to about 1300° C. and said pressure is from about 0.1 MPa to 200 MPa for about 4 hours to about 6 hours.

72. The method of any preceding or following embodiment/feature/aspect, wherein said glassy compound is produced from said sintering of said ceramic or ceramic precursor.

73. The method of any preceding or following embodiment/feature/aspect, wherein said microspheres and/or pores are formed from oxidation of said microsphere and/or pore former, degradation of said microsphere and/or pore former or any combination thereof.

74. The method of any preceding or following embodiment/feature/aspect, wherein said microspheres and/or pores are formed from said microsphere and/or pore former or said ceramic or ceramic precursor that at least partially decomposes to generate a gas.

75. The method of any preceding or following embodiment/feature/aspect, wherein at least 80% by total number, of said microspheres and/or pores are not in contact with each other.

76. The method of any preceding or following embodiment/feature/aspect, wherein at least 90% by total number, of said microspheres and/or pores are not in contact with each other.

77. The method of any preceding or following embodiment/feature/aspect, wherein said microsphere and/or pore containing ceramic particle is spherical, nearly spherical, oblong in shape, doughnut shape, star shape or any combination thereof.

78. The method of any preceding or following embodiment/feature/aspect, wherein said microsphere and/or pore containing ceramic particle is in the shape of a sphere having a Krumbein sphericity of at least about 0.5, and a roundness of at least about 0.5.

79. The method of any preceding or following embodiment/feature/aspect, wherein said microsphere and/or pore containing ceramic particle has microsphere and/or pore size distribution, $d_{vs}$, from about 0.5 to about 10.0, wherein $d_{vs}=(d_{v90}-d_{v10})/d_{v50}$ and wherein $d_{v10}$ is a microsphere and/or pore size wherein 10% of the microsphere and/or pores have a smaller microsphere and/or pore size, $d_{v50}$ is a median microsphere and/or pore size wherein 50% of the microspheres and/or pores have a smaller microsphere and/or pore size, and $d_{v90}$ is a microsphere and/or pore size wherein 90% of the microspheres and/or pores have a smaller microsphere and/or pore size.

80. The method of any preceding or following embodiment/feature/aspect, wherein said microsphere and/or pore containing ceramic particle has microsphere and/or pore size distribution, dvs, from about 0.5 to about 5.0.

81. The method of any preceding or following embodiment/feature/aspect, wherein said microsphere and/or pore containing ceramic particle has a median microsphere and/or pore size, $d_{v50}$, from about 0.1 μm to about 100 μm, wherein $d_{v50}$ is a median microsphere and/or pore size where 50% of the microspheres and/or pores of the distribution has a smaller microsphere and/or pore size.

82. The method of any preceding or following embodiment/feature/aspect, wherein said microsphere and/or pore containing ceramic particle has a specific gravity of from about 0.8 to about 3.5, a microsphere and/or pore total volume of from about 1% to about 49%, a crush strength of from about 10 MPa to about 300 MPa, and a four point bending strength of about 50 MPa to about 400 MPa.

83. The method of any preceding or following embodiment/feature/aspect, wherein said microsphere and/or pore containing ceramic particle has a specific gravity of from about 1.8 to about 2.25, a microsphere and/or pore placement and/or size of from about 1% to about 10%, a crush strength of from about 10 MPa to about 300 MPa, and a four point bending strength of about 50 MPa to about 400 MPa.

84. A microsphere and/or pore containing ceramic particle comprising a sintered body having a plurality of microspheres and/or pores contained therein, and wherein said microspheres and/or pores are optionally at least partially surrounded by at least one glassy compound, and a majority of said gas microspheres and/or pores are not in contact with each other.

85. The microsphere and/or pore containing ceramic particle of any preceding or following embodiment/feature/aspect, wherein said sintered body comprises at least in part cordierite, mullite, bauxite, silica, spodumene, silicon oxide, aluminum oxide, sodium oxide, potassium oxide, calcium oxide, zirconium oxide, lithium oxide, iron oxide, spinet steatite, a silicate, a substituted alumino silicate clay, an inorganic nitride, an inorganic carbide, a non-oxide ceramic or any combination thereof.

86. The microsphere and/or pore containing ceramic particle of any preceding or following embodiment/feature/aspect, wherein said sintered body surrounds or encapsulates a cenosphere, a micro glass bead, a synthetic cenosphere, a polymer bead or any combination thereof.

87. The microsphere and/or pore containing ceramic particle of any preceding or following embodiment/feature/aspect, wherein said microsphere and/or pore containing ceramic particle is in the shape of a sphere having a Krumbein sphericity of at least about 0.5, and a roundness of at least about 0.5.

88. The microsphere and/or pore containing ceramic particle of any preceding or following embodiment/feature/aspect, wherein said microsphere and/or pore containing ceramic particle has a specific gravity of from about 0.8 to about 3.5, a microsphere and/or pore total volume of from about 1% to about 49%, a crush strength of from about 10 MPa to about 300 MPa, and a four point bending strength of about 50 MPa to about 400 MPa.

89. The microsphere and/or pore containing ceramic particle of any preceding or following embodiment/feature/aspect, wherein said microsphere and/or pore containing ceramic particle has a specific gravity of from about 1.8 to about 2.25, a microsphere and/or pore total volume of from about 1% to about 10%, a crush strength of from about 10 MPa to about 300 MPa, and a four point bending strength of about 50 MPa to about 400 MPa.

90. The microsphere and/or pore containing ceramic particle of any preceding or following embodiment/feature/aspect, wherein said microsphere and/or pore containing ceramic particle is a proppant.

91. The microsphere and/or pore containing ceramic particle of any preceding or following embodiment/feature/aspect, wherein said microsphere and/or pore containing ceramic particle has $d_{ps}$ from about 0.4 to about 1.0, wherein $d_{ps}=(d_{p90}-d_{p10})/d_{p50}$ and wherein $d_{p10}$ is a particle size wherein 10% of the particles have a smaller particle size, $d_{p10}$ is a median particle size wherein 50% of the particles have a smaller particle size, and $d_{p90}$ is a particle size wherein 90% of the particles have a smaller particle size.

92. The microsphere and/or pore containing ceramic particle of any preceding or following embodiment/feature/aspect, wherein said microsphere and/or pore containing ceramic particle has $d_{ps}$ from about 0.4 to about 0.6.

93. The microsphere and/or pore containing ceramic particle of any preceding or following embodiment/feature/aspect, wherein said microsphere and/or pore containing ceramic particle has a median particle size, $d_{p50}$, from about 90 μm to about 2000 μm, wherein $d_{p50}$ is a median particle size where 50% of the particles of the distribution have a smaller particle size.

94. The microsphere and/or pore containing ceramic particle of any preceding or following embodiment/feature/aspect, wherein $R_p$ is from about 0.01 to about 0.1, wherein $R_p=d_{v50}/d_{p50}$ wherein $d_{v50}$ is a median microsphere and/or pore size where 50% of the microsphere and/or pores of the distribution has a smaller microsphere and/or pore size and $d_{p50}$ is a median particle size where 50% of the particles of the distribution have a smaller particle size.

95. The microsphere and/or pore containing ceramic particle of any preceding or following embodiment/feature/aspect, wherein $R_p$ is from about 0.03 to about 0.05.

96. The microsphere and/or pore containing ceramic particle of any preceding or following embodiment/feature/aspect, wherein said proppant has at least one of the following characteristics:
    a. an overall diameter of from about 90 microns to about 2,000 microns;
    b. a Krumbein sphericity of at least about 0.5 and a roundness of at least about 0.5;
    c. a crush strength of about 10 MPa or greater;
    d. a specific gravity of from about 1.0 to about 3.0;
    e. a microsphere and/or pore total volume of from about 6% to about 40%;

f. at least 90% of microsphere and/or pores having a microsphere and/or pore size of from about 0.1 μm to about 10 μm;

g. at least 80% of microsphere and/or pores are not in contact with each other.

97. The microsphere and/or pore containing ceramic particle of any preceding or following embodiment/feature/aspect, wherein said microsphere and/or pore containing ceramic particle is present in a product comprising a matrix material, a concrete formulation, a composite reinforcement phase, a thermal insulating material, an electrical insulating material, an abrasive material, a catalyst substrate a catalyst support, a chromatography column material, or a reflux tower material.

98. A method to prop open subterranean formation fractures comprising introducing a proppant formulation comprising the microsphere and/or pore containing ceramic particle of any preceding or following embodiment/feature/aspect into a subterranean formation.

99. A method of treating a subterranean producing zone penetrated by a well bore comprising the steps of:
a. preparing or providing a treating fluid that comprises a fluid, energized fluid, foam, or a gas carrier having the microsphere and/or pore containing ceramic particle of claim 90 suspended therein, and
b. pumping said treating fluid into said subterranean producing zone whereby said particles are deposited therein.

100. The method of any preceding or following embodiment/feature/aspect, wherein said treating fluid is a fracturing fluid and said particles are deposited in fractures formed in said subterranean producing zone.

101. The method of any preceding or following embodiment/feature/aspect, wherein said treating fluid is a gravel packing fluid and said particles are deposited in said well bore adjacent to said subterranean producing zone.

102. A matrix comprising a plurality of the proppant of any preceding or following embodiment/feature/aspect and at least one solid matrix material in which the proppant is distributed.

103. The method of any preceding or following embodiment/feature/aspect, wherein said green body is formed over or around at least one template so that the green body encapsules or surrounds said template.

104. The method of any preceding or following embodiment/feature/aspect, wherein said template is a cenosphere, micro glass bead, synthetic cenosphere, polymer bead, or any combination thereof.

105. The method of any preceding or following embodiment/feature/aspect, wherein said ceramic or ceramic precursor comprises at least one sedimentary material or at least one synthetically produced material or both.

106. The microsphere and/or pore containing ceramic particle of any preceding or following embodiment/feature/aspect, wherein said sintered body comprises at least one material derived from at least one sedimentary material or at least one synthetically produced material or both.

107. The method of any preceding or following embodiment/feature/aspect, wherein said at least one ceramic or ceramic precursor is filtered through a membrane filtration to obtain a particle distribution.

108. The method of any preceding or following embodiment/feature/aspect, wherein said at least one microsphere and/or pore former is filtered through a membrane filtration to obtain a particle distribution.

109. A method for producing proppants, wherein said method comprises filtering by membrane filtration one or more of the starting materials that form said proppant, and then forming a green body from said starting materials that have been filtered by membrane filtration and then sintering said green body to form a sintered body.

110. The method of any preceding or following embodiment/feature/aspect, wherein said membrane filtration is a cross flow membrane separation.

111. The method of any preceding or following embodiment/feature/aspect, wherein said membrane filtration is a dead end filtration.

112. The method of any preceding or following embodiment/feature/aspect, wherein said at least one of said starting materials has a particle distribution, D, of from 0.4 to 1.

113. The method of any preceding or following embodiment/feature/aspect, wherein said at least two or more of said starting materials has a particle distribution, D, of from 0.4 to 1.

114. The method of any preceding or following embodiment/feature/aspect, wherein said filtration is achieved by forming a slurry containing one or more of said starting materials and passing said slurry through one or more membrane filtrations.

115. A method for producing microsphere and/or pore formers comprising the steps of
a. producing microsphere and/or pore former templates of a predetermined size, and
b. selecting a subset of said sized microsphere and/or pore former templates, and
c. coating said selected subset of said sized microsphere and/or pore former templates with inorganic or organic materials.

116. The method of any preceding or following embodiment/feature/aspect, wherein said microsphere and/or pore former templates are produced by means comprising crushing, grinding, pilling, pelletizing, roller mill, hammer mill, rod mill, jar mill, pulverizing, disc mill, attrition mill, and any combination thereof.

117. The method of any preceding or following embodiment/feature/aspect, wherein said means may be performed in the presence of a liquid comprising water, solvents, oil and any combination thereof.

118. The method of any preceding or following embodiment/feature/aspect, wherein said selecting a subset of said sized microsphere and/or pore former templates is produced by means comprising screening, filtration, air separation, sedimentation, impingement, flotation, and any combination thereof.

119. The method of any preceding or following embodiment/feature/aspect, wherein said coating is produced by means comprising spray coating, fluid bed coating, vapor deposition, tumbling and any combination thereof.

120. The method of any preceding or following embodiment/feature/aspect, wherein said microsphere and/or pore former template is a hollow particle.

121. The method of any preceding or following embodiment/feature/aspect, wherein said hollow particle comprises a cenosphere, polymer microsphere and/or pore, glass microsphere and/or pore or any combination thereof.

122. The method of any preceding or following embodiment/feature/aspect, wherein said microsphere and/or pore former template is an organic, inorganic or polymeric solid particle.

123. The method of any preceding or following embodiment/feature/aspect, wherein said solid particle comprises a carbide, a nitride, an oxynitride, a sulfide, a halide, a boride, organometallic compound, metal, metal alloy, carbonate, a nitrate, a sulfate, a sulfite, a chlorate, a bromates, an iodinate, borax, a phosphate, a peroxide, a persulfide, a perchlorate, a perbromate, an ammonium salt, a microorganism or any combination thereof.

124. The method of any preceding or following embodiment/feature/aspect, wherein said solid particle comprises starches, walnut shells, flour, carbon, carbon black, graphite, toner particles, or any combination thereof.

125. The method of any preceding or following embodiment/feature/aspect, wherein said solid particle has a specific gravity lower than materials into which the microsphere and/or pore former is incorporated.

126. The method of any preceding or following embodiment/feature/aspect, wherein said solid particle is porous.

127. The method of any preceding or following embodiment/feature/aspect, wherein said inorganic material comprises, oxides, nitrides, borides, carbides, halides, metals, metal oxides or any combination thereof.

128. The method of any preceding or following embodiment/feature/aspect, wherein said organic material is a polymer comprising polymethyl methacrylate, polystyrene, ployolefins, polycarbonate, silicone polymers and any combination thereof.

129. The method of any preceding or following embodiment/feature/aspect, wherein said organic material comprises a dispersant.

130. The method of any preceding or following embodiment/feature/aspect, wherein said dispersant comprises a surfactant.

131. The method of any preceding or following embodiment/feature/aspect, wherein said inorganic or organic coating comprises silica, alumina, silanes, organo silicons, hydrophobic materials, hydrophilic materials and any combination thereof.

132. The method of any preceding or following embodiment/feature/aspect, wherein the surface of the microsphere and/or pore former may be made to contain a static electrical charge.

133. The method of any preceding or following embodiment/feature/aspect, wherein said coating comprises more than one layer of said inorganic or organic material.

134. The method of any preceding or following embodiment/feature/aspect, wherein said more than one layer comprises layers of different materials with different compositions and thicknesses.

135. The method of any preceding or following embodiment/feature/aspect, wherein said inorganic or organic materials may optionally include a minor amount of fibers or whiskers.

136. The method of any preceding or following embodiment/feature/aspect, wherein said inorganic or organic material contains a promoter to form whiskers or fibers inside an in situ microsphere and/or pore.

137. The method of any preceding or following embodiment/feature/aspect, wherein said inorganic or organic material contains a promoter to form whiskers or fibers inside a glass-ceramic, ceramic, metal or combinations thereof matrix.

138. The method of any preceding or following embodiment/feature/aspect, wherein said promoter comprises zirconium, iron, magnesium, alumina, bismuth, lanthanum, silicon, calcium, cerium, yttrium, a silicate, a borate, a halide particularly fluorine or chlorine or any combination thereof.

139. The method of any preceding or following embodiment/feature/aspect, wherein said promoter comprises a compound containing zirconium, iron, magnesium, alumina, bismuth, lanthanum, silicon, calcium, cerium, yttrium, a silicate, a borate, a halide particularly fluoride or chloride or any combination thereof.

140. The method of any preceding or following embodiment/feature/aspect, wherein said coating may be formed in situ on said microsphere and/or pore former template by chemical reaction with gases, liquids and/or ceramic or ceramic precursor materials.

141. A microsphere and/or pore former comprising a microsphere and/or pore former template with an organic or inorganic coating and having a select average particle size and select particle size distribution.

142. The microsphere and/or pore former of any preceding or following embodiment/feature/aspect, wherein said microsphere and/or pore former template is a hollow particle.

143. The microsphere and/or pore former of any preceding or following embodiment/feature/aspect, wherein said hollow particle comprises a cenosphere, polymer microsphere and/or pore, glass microsphere and/or pore or any combination thereof.

144. The microsphere and/or pore former of any preceding or following embodiment/feature/aspect, wherein said microsphere and/or pore former template is a solid particle.

145. The microsphere and/or pore former of any preceding or following embodiment/feature/aspect, wherein said solid particle comprises a carbide, a nitride, an oxynitride, a sulfide, a halide, a boride, organometallic compound, metal, metal alloy, carbonate, a nitrate, a sulfate, a sulfite, a chlorate, a bromates, an iodinate, borax, a phosphate, a peroxide, a persulfide, a perchlorate, a perbromate, an ammonium salt, a microorganism or any combination thereof.

146. The microsphere and/or pore former of any preceding or following embodiment/feature/aspect, wherein said solid particle comprises walnut shells, flour, carbon, carbon black, graphite, toner particles, or any combination thereof.

147. The microsphere and/or pore former of any preceding or following embodiment/feature/aspect, wherein said solid particle has a specific gravity lower than materials into which the microsphere and/or pore former is incorporated.

148. The microsphere and/or pore former of any preceding or following embodiment/feature/aspect, wherein said solid particle is porous.

149. The microsphere and/or pore former of any preceding or following embodiment/feature/aspect, wherein said inorganic material comprises, oxides, nitrides, borides, carbides halides, metals, metal oxides or any combination thereof.

150. The microsphere and/or pore former of any preceding or following embodiment/feature/aspect, wherein said organic material is a polymer comprising polymethyl methacrylate, polystyrene, polyolefins, polycarbonate, silicone polymers and any combination thereof.

151. The microsphere and/or pore former of any preceding or following embodiment/feature/aspect, wherein said organic material comprises a dispersant.

152. The microsphere and/or pore former of any preceding or following embodiment/feature/aspect, wherein said dispersant comprises a surfactant.

153. The microsphere and/or pore former of any preceding or following embodiment/feature/aspect, wherein said inorganic or organic coating comprises silica, alumina, silanes, organo silicons, hydrophobic materials, hydrophilic materials and any combination thereof.

154. The microsphere and/or pore former of any preceding or following embodiment/feature/aspect, wherein the surface of the microsphere and/or pore former may be made to contain a static electrical charge.

155. The microsphere and/or pore former of any preceding or following embodiment/feature/aspect, wherein said coating comprises more than one layer of said inorganic or organic material.

156. The microsphere and/or pore former of any preceding or following embodiment/feature/aspect, wherein said more than one layer comprises layers of different materials with different compositions and thicknesses.

157. The microsphere and/or pore former of any preceding or following embodiment/feature/aspect, wherein said inorganic or organic materials may optionally include a minor amount of fibers or whiskers.

158. The microsphere and/or pore former of any preceding or following embodiment/feature/aspect, wherein said inorganic or organic material contains a promoter to form whiskers or fibers inside an in situ microsphere and/or pore microsphere and/or pore.

159. The microsphere and/or pore former of any preceding or following embodiment/feature/aspect, wherein said inorganic or organic material contains a promoter to form whiskers or fibers inside a glass-ceramic, ceramic, metal or combinations thereof matrix.

160. The microsphere and/or pore of any preceding or following embodiment/feature/aspect, wherein said promoter comprises zirconium, iron, magnesium, alumina, bismuth, lanthanum, silicon, calcium, cerium, yttrium, a silicate, a borate, a halide particularly fluorine or chlorine or any combination thereof.

161. The microsphere and/or pore of any preceding or following embodiment/feature/aspect, wherein said promoter comprises a compound containing zirconium, iron, magnesium, alumina, bismuth, lanthanum, silicon, calcium, cerium, yttrium, a silicate, a borate, a halide particularly fluoride or chloride or any combination thereof.

162. A method for producing a glass-ceramic, ceramic, metal or combinations thereof article, said method comprising
a. forming a green body from a green body material that comprises at least one ceramic or ceramic precursor and said microsphere and/or pore former of any preceding or following embodiment/feature/aspect, wherein a majority of said microsphere and/or pore formers are distributed in said green body such that the majority of said microsphere and/or pore formers are not in contact with each other, and said microsphere and/or pore formers have a substantially uniform shape and size;
b. sintering said green body under sintering conditions to form a sintered body having gas bubbles contained therein, and wherein said gas bubbles are at least partially surrounded by at least one glassy compound which forms a microsphere and/or pore in situ in said glass-ceramic, ceramic, metal or combinations thereof particle.

163. The method of any preceding or following embodiment/feature/aspect, wherein said ceramic or ceramic precursor comprises cordierite, mullite, bauxite, silica, spodumene, silicon oxide, aluminum oxide, sodium oxide, potassium oxide, calcium oxide, zirconium oxide, lithium oxide, iron oxide, spinet steatite, a silicate, a clay, a substituted alumino silicate clay, an inorganic nitride, an inorganic carbide, a non-oxide ceramic, ground cenospheres or any combination thereof.

164. The method of any preceding or following embodiment/feature/aspect, wherein said ceramic or ceramic precursor has a particle size distribution, $d_{gs}$, from about 0.5 to about 15, wherein, $d_{gs}=\{(d_{g90}-d_{g10})/d_{g50}\}$ wherein $d_{g10}$ is a particle size wherein 10% of the particles have a smaller particle size, $d_{g50}$ is a median particle size wherein 50% of the particles have a smaller particle size, and $d_{g90}$ is a particle size wherein 90% of the particle volume has a smaller particle size.

165. The method of any preceding or following embodiment/feature/aspect, wherein said ceramic or ceramic precursor has a particle size distribution, $d_{es}$, from about 1.0 to about 6.0.

166. The method of any preceding or following embodiment/feature/aspect, wherein the median particle size, $d_{g50}$, of said ceramic or ceramic precursor is from about 0.01 μm to about 100 μm, wherein $d_{g50}$ is a median particle size where 50% of the particles of the distribution have a smaller particle size.

167. The method of any preceding or following embodiment/feature/aspect, wherein the median particle size, $d_{g50}$, of said ceramic or ceramic precursor is from about 1 μm to about 5 μm, wherein $d_{g50}$ is a median particle size where 50% of the particles of the distribution have a smaller particle size.

168. The method of any preceding or following embodiment/feature/aspect, wherein said ceramic or ceramic precursor comprises from about 50% by weight to about 99.9% by weight of said green body.

169. The method of any preceding or following embodiment/feature/aspect, wherein said ceramic or ceramic precursor comprises from about 90% by weight to about 99.9% by weight of said green body.

170. The method of any preceding or following embodiment/feature/aspect, wherein said microsphere and/or pore former has a particle size distribution, $d_{fs}$, from about 0.5 to about 5.0, wherein, $d_{fs}=\{(d_{f90}-d_{f10})/d_{f50}\}$ wherein $d_{f10}$ is a particle size wherein 10% of the particles have a smaller particle size, $d_{f50}$ is a median particle size wherein 50% of the particles have a smaller particle size, and $d_{f90}$ is a particle size wherein 90% of the particles have a smaller particle size.

171. The method of any preceding or following embodiment/feature/aspect, wherein said microsphere and/or pore former has a particle size distribution, $d_{fs}$, from about 0.5 to about 1.5.

172. The method of any preceding or following embodiment/feature/aspect, wherein the median particle size, $d_{f50}$, of said microsphere and/or pore former is between about 0.01 μm to 50 μm, wherein $d_{f50}$ is a median particle size where 50% of the particles of the distribution have a smaller particle size.

173. The method of any preceding or following embodiment/feature/aspect, wherein the median particle size, $d_{f50}$, of said microsphere and/or pore former is from about 0.2 μm to about 5 μm, wherein $d_{f50}$ is a median particle size where 50% of the particles of the distribution have a smaller particle size.

174. The method of any preceding or following embodiment/feature/aspect, wherein said microsphere and/or pore former comprises from about 0.01% by weight to about 90% by weight of said green body.

175. The method of any preceding or following embodiment/feature/aspect, wherein said microsphere and/or pore former comprises from about 0.01% by weight to about 50% by weight of said green body.

176. The method of any preceding or following embodiment/feature/aspect, wherein said microsphere and/or pore former comprises from about 0.01% by weight to about 10% by weight of said green body.

177. The method of any preceding or following embodiment/feature/aspect, wherein said green body material further comprises at least one slurrying agent.

178. The method of any preceding or following embodiment/feature/aspect, wherein said slurrying agent comprises water, an organic solvent or any combination thereof.

179. The method of any preceding or following embodiment/feature/aspect, wherein the green body material further comprises at least one sintering promoter comprising a sintering aid, a glassy phase formation agent, a grain growth inhibitor, a ceramic strengthening agent, a crystallization control agent, or phase formation control agent, or any combination thereof.

180. The method of any preceding or following embodiment/feature/aspect, wherein said sintering promoter comprises zirconium, iron, magnesium, alumina, bismuth, lanthanum, silicon, calcium, cerium, yttrium, a silicate, a borate or any combination thereof.

181. The method of any preceding or following embodiment/feature/aspect, wherein said sintering promoter comprises a compound containing zirconium, iron, magnesium, alumina, bismuth, lanthanum, silicon, calcium, cerium, yttrium, a silicate, a borate or any combination thereof.

182. The method of any preceding or following embodiment/feature/aspect, wherein said green body material further comprises yttrium oxide, cerium oxide and any combination thereof.

183. The method of any preceding or following embodiment/feature/aspect, wherein said green body material further comprises a binder.

184. The method of any preceding or following embodiment/feature/aspect, wherein said binder comprises a wax, a starch, polyvinyl alcohol, a sodium silicate solution, a low molecular weight functionalized polymer or any combination thereof.

185. The method of any preceding or following embodiment/feature/aspect, wherein said green body material further comprises a dispersant.

186. The method of any preceding or following embodiment/feature/aspect, wherein said dispersant comprises a surfactant.

187. The method of any preceding or following embodiment/feature/aspect, wherein said green body material optionally comprises a whisker promoter comprising zirconium, iron, magnesium, alumina, bismuth, lanthanum, silicon, calcium, cerium, yttrium, a silicate, a borate, a halide particularly fluorine or chlorine or any combination thereof.

188. The method of any preceding or following embodiment/feature/aspect, wherein said green body material optionally comprises a whisker promoter comprising a compound containing zirconium, iron, magnesium, alumina, bismuth, lanthanum, silicon, calcium, cerium, yttrium, a silicate, a borate, a halide particularly fluorine or chlorine or any combination thereof.

189. The method of any preceding or following embodiment/feature/aspect, wherein said green body comprises at least one or more layers of said green body material.

190. The method of any preceding or following embodiment/feature/aspect, wherein said layers are of differing compositions of said green body material.

191. The method of any preceding or following embodiment/feature/aspect, wherein said layers comprise different said $d_{gs}$, said $d_{g50}$, said $d_{fs}$, said $d_{f50}$ and any combination thereof.

192. The method of any preceding or following embodiment/feature/aspect, wherein said layers may comprise concentration gradients at the interface between said layers comprising varying concentrations of the materials in adjacent layers.

193. The method of any preceding or following embodiment/feature/aspect, wherein said forming a green body is produced by spray drying, die pressing, extrusion coating, fluidized bed coating, mixer granulation, high shear mixing, roller compaction injection molding, tumbling or any combination thereof.

194. The method of any preceding or following embodiment/feature/aspect, wherein said green body further comprises a hollow template.

195. The method of any preceding or following embodiment/feature/aspect, wherein said hollow template comprises a cenosphere, a micro glass sphere, a synthetic cenosphere, a polymer bead or any combination thereof.

196. The method of any preceding or following embodiment/feature/aspect, wherein said green body is formed by deposition of said green body material onto said hollow template.

197. The method of any preceding or following embodiment/feature/aspect, wherein said deposition comprises spray drying, fluidized bed coating or any combination thereof.

198. The method of any preceding or following embodiment/feature/aspect, wherein said spray drying is performed at an air temperature from about 40° C. to about 90° C., air flow from about 90 liters per minute to about 150 liters per minute, and nozzle air pressure from about 10 psig to about 25 psig.

199. The method of any preceding or following embodiment/feature/aspect, wherein said sintering is performed in the presence of a gas.

200. The method of any preceding or following embodiment/feature/aspect, wherein said gas comprises from about 100 ppm to about 100% by weight oxygen.

201. The method of any preceding or following embodiment/feature/aspect, wherein said gas comprises from about 250 ppm to about 90% by weight oxygen.

202. The method of any preceding or following embodiment/feature/aspect, wherein said gas comprises from about 500 ppm to about 79% by weight oxygen.

203. The method of any preceding or following embodiment/feature/aspect, wherein said gas comprises from about 1000 ppm to about 50% by weight oxygen.

204. The method of any preceding or following embodiment/feature/aspect, wherein said sintering further comprises yttrium oxide, cerium oxide and any combination thereof introduced into the sintering furnace as a separate component.

205. The method of any preceding or following embodiment/feature/aspect, wherein said sintering is performed under a pressure of from about $0.1 \times 10^5$ Pa to about $10 \times 10^5$ Pa.

206. The method of any preceding or following embodiment/feature/aspect, wherein said sintering is performed under a pressure of from about $0.5 \times 10^5$ Pa to about $7 \times 10^5$ Pa.

207. The method of any preceding or following embodiment/feature/aspect, wherein said sintering is performed under a pressure of from about $1 \times 10^5$ Pa to about $5 \times 10^5$ Pa.

208. The method of any preceding or following embodiment/feature/aspect, wherein said sintering comprises induction heating, rotary kiln, microwave, tunnel kiln, shutter kiln, electric furnace, gas furnace, convection furnace, self-propagation high temperature sintering, radiation, plasma, spark plasma, roller hearth, chain hearth, pusher sled, vertical shaft furnace or any combination thereof.

209. The method of any preceding or following embodiment/feature/aspect, wherein said sintering creates reactive diffusion or local melting of said ceramic or ceramic precursor in said green body.

210. The method of any preceding or following embodiment/feature/aspect, wherein said sintering is performed at a temperature from about 500° C. to about 2500° C. and said pressure is from about 0.1 MPa to about 200 MPa for about 1 hour to about 20 hours.

211. The method of any preceding or following embodiment/feature/aspect, wherein said sintering is performed at a temperature from about 1100° C. to about 1300° C. and said pressure is from about 0.1 MPa to about 200 MPa for about 4 hours to about 6 hours.

212. The method of any preceding or following embodiment/feature/aspect, wherein said sintering is performed at a firing rate from about 0.01° C./min to about 2000° C./min.

213. The method of any preceding or following embodiment/feature/aspect, wherein said sintering creates a reactive viscous liquid phase of said ceramics or ceramic precursor in said green body.

214. The method of any preceding or following embodiment/feature/aspect, wherein said temperature is from about 500° C. to about 2500° C. and said pressure is from about 0.1 MPa to about 200 MPa for about 1 hour to about 20 hours.

215. The method of any preceding or following embodiment/feature/aspect, wherein said temperature is from about 1100° C. to about 1300° C. and said pressure is from about 0.1 MPa to 200 MPa for about 4 hours to about 6 hours.

216. The method of any preceding or following embodiment/feature/aspect, wherein said sintering may optionally produce whiskers or fibers in said glass-ceramic, ceramic, metal or combinations thereof article.

217. The method of any preceding or following embodiment/feature/aspect, wherein said glassy compound is produced from said sintering of said ceramic or ceramic precursor.

218. The method of any preceding or following embodiment/feature/aspect, wherein said gas bubbles are formed from oxidation of said microsphere and/or pore former, degradation of said microsphere and/or pore former or any combination thereof.

219. The method of any preceding or following embodiment/feature/aspect, wherein said gas bubbles are formed from said microsphere and/or pore former or said ceramic or ceramic precursor that at least partially decomposes to generate a gas.

220. The method of any preceding or following embodiment/feature/aspect, wherein at least 80% by total number, of said gas bubbles are not in contact with each other.

221. The method of any preceding or following embodiment/feature/aspect, wherein at least 90% by total number, of said gas bubbles are not in contact with each other.

222. The method of any preceding or following embodiment/feature/aspect, wherein said glass-ceramic, ceramic, metal or combinations thereof article is spherical, nearly spherical, oblong in shape, doughnut shape, star shape or any combination thereof.

223. The method of any preceding or following embodiment/feature/aspect, wherein said glass-ceramic, ceramic, metal or combinations thereof article is in the shape of a sphere having a Krumbein sphericity of at least about 0.5, and a roundness of at least about 0.5.

224. The method of any preceding or following embodiment/feature/aspect, wherein said glass-ceramic, ceramic, metal or combinations thereof article has microsphere and/or pore size distribution, $d_{vs}$, from about 0.5 to about 10.0, wherein $d_{vs}=(d_{v90}-d_{v10})/d_{v50}$ and wherein $d_{v10}$ is a microsphere and/or pore size wherein 10% of the microspheres and/or pores have a smaller microsphere and/or pore size, $d_{v50}$ is a median microsphere and/or pore size wherein 50% of the microspheres and/or pores have a smaller microsphere and/or pore size, and $d_{v90}$ is a microsphere and/or pore size wherein 90% of the microsphere and/or pores have a smaller microsphere and/or pore size.

225. The method of any preceding or following embodiment/feature/aspect, wherein said glass-ceramic, ceramic, metal or combinations thereof article has microsphere and/or pore size distribution, $d_{vs}$, from about 0.5 to about 5.0.

226. The method of any preceding or following embodiment/feature/aspect, wherein said glass-ceramic, ceramic, metal or combinations thereof article has a median microsphere and/or pore size, $d_{v50}$, from about 0.1 µm to about 100 µm, wherein $d_{v50}$ is a median microsphere and/or pore size where 50% of the microspheres and/or pores of the distribution has a smaller microsphere and/or pore size.

227. The method of any preceding or following embodiment/feature/aspect, wherein said glass-ceramic, ceramic, metal or combinations thereof article has a specific gravity of from about 1.0 to about 3.5, a porosity of from about 1% to about 49%, a crush strength of from about 10 MPa to about 300 MPa, and a four point bending strength of about 50 MPa to about 400 MPa.

228. The method of any preceding or following embodiment/feature/aspect, wherein said glass-ceramic, ceramic, metal or combinations thereof article has a specific gravity of from about 1.8 to about 2.25, a porosity of from about 1% to about 10%, a crush strength of from about 10 MPa to about 300 MPa, and a four point bending strength of about 50 MPa to about 400 MPa.

229. A glass-ceramic, ceramic, metal or combinations thereof article comprising a sintered body having gas bubbles contained therein, and wherein said gas bubbles are optionally at least partially surrounded by at least one glassy compound forming in situ microspheres and/or pores, and a majority of said in situ microspheres and/or pores are not in contact with each other.

230. The glass-ceramic, ceramic, metal or combinations thereof article of any preceding or following embodiment/feature/aspect, wherein said sintered body comprises at least in part cordierite, mullite, bauxite, silica, spodumene, silicon oxide, aluminum oxide, sodium oxide, potassium oxide, calcium oxide, zirconium oxide, lithium oxide, iron oxide, spinel, steatite, a silicate, a clay, a substituted alumino silicate clay, an inorganic nitride, an inorganic carbide, a non-oxide ceramic or any combination thereof.

231. The glass-ceramic, ceramic, metal or combinations thereof article of any preceding or following embodiment/feature/aspect, wherein said sintered body surrounds a cenosphere, a micro glass bead, a synthetic cenosphere, a polymer bead or any combination thereof.

232. The glass-ceramic, ceramic, metal or combinations thereof article of any preceding or following embodiment/feature/aspect, wherein said glass-ceramic, ceramic, metal or combinations thereof article is in the shape of a sphere having a Krumbein sphericity of at least about 0.5, and a roundness of at least about 0.5.

233. The glass-ceramic, ceramic, metal or combinations thereof article of any preceding or following embodiment/feature/aspect, wherein said glass-ceramic, ceramic, metal or combinations thereof article has a specific gravity of from about 1.0 to about 3.5, a porosity of from about 1% to about 49%, a crush strength of from about 10 MPa to about 300 MPa, and a four point bending strength of about 50 MPa to about 400 MPa.

234. The glass-ceramic, ceramic, metal or combinations thereof article of any preceding or following embodiment/feature/aspect, wherein said glass-ceramic, ceramic, metal or combinations thereof article has a specific gravity of from about 1.8 to about 2.25, a porosity of from about 1% to about 10%, a crush strength of from about 10 MPa to about 300 MPa, and a four point bending strength of about 50 MPa to about 400 MPa.

235. The glass-ceramic, ceramic, metal or combinations thereof article of any preceding or following embodiment/feature/aspect, wherein said glass-ceramic, ceramic, metal or combinations thereof article has microsphere and/or pore size distribution, $d_{vs}$, from about 0.5 to about 10.0, wherein $d_{vs}=(d_{v90}-d_{v10})/d_{v50}$ and wherein $d_{v10}$ is a microsphere and/or pore size wherein 10% of the microspheres and/or pores have a smaller microsphere and/or pore size, $d_{v50}$ is a median microsphere and/or pore size wherein 50% of the microsphere and/or pores have a smaller microsphere and/or pore size, and $d_{v90}$ is a microsphere and/or pore size wherein 90% of the microspheres and/or pores have a smaller microsphere and/or pore size.

236. The glass-ceramic, ceramic, metal or combinations thereof article of any preceding or following embodiment/feature/aspect, wherein said glass-ceramic, ceramic, metal or combinations thereof article has microsphere and/or pore size distribution, $d_{vs}$, from about 0.5 to about 5.0.

237. The glass-ceramic, ceramic, metal or combinations thereof article of any preceding or following embodiment/feature/aspect, wherein said glass-ceramic, ceramic, metal or combinations thereof article has a median microsphere and/or pore size, $d_{v50}$, from about 0.1 µm to about 100 µm, wherein $d_{v50}$ is a median microsphere and/or pore size where 50% of the microsphere and/or pores of the distribution has a smaller microsphere and/or pore size.

238. The glass-ceramic, ceramic, metal or combinations thereof article of any preceding or following embodiment/feature/aspect, wherein said in situ formed microspheres and/or pores contain whiskers or fibers.

239. The glass-ceramic, ceramic, metal or combinations thereof article of any preceding or following embodiment/feature/aspect, wherein said sintered body contains whiskers or fibers.

240. The glass-ceramic, ceramic, metal or combinations thereof article of any preceding or following embodiment/feature/aspect, wherein the interface between said sintered body and said microspheres and/or pores contains whiskers or fibers.

241. The glass-ceramic, ceramic, metal or combinations thereof article of any preceding or following embodiment/feature/aspect, wherein said glass-ceramic, ceramic, metal or combinations thereof article is a proppant.

242. The proppant of any preceding or following embodiment/feature/aspect, wherein said glass-ceramic, ceramic, metal or combinations thereof article has $d_{ps}$ from about 0.4 to about 1.0, wherein $d_{ps}=(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{p90}$ is a particle size wherein 90% of the particles have a smaller particle size.

243. The proppant of any preceding or following embodiment/feature/aspect, wherein said glass-ceramic, ceramic, metal or combinations thereof article has $d_{ps}$ from about 0.4 to about 0.6.

244. The proppant of any preceding or following embodiment/feature/aspect, wherein said glass-ceramic, ceramic, metal or combinations thereof article has a median particle size, $d_{p50}$, from about 90 µm to about 2000 µm, wherein $d_{p50}$ is a median particle size where 50% of the particles of the distribution have a smaller particle size.

245. The proppant of any preceding or following embodiment/feature/aspect, wherein $R_p$ is from about 0.01 to about 0.1, wherein $R_p=d_{v50}/d_{p50}$ wherein $d_{v50}$ is a median pore size where 50% of the pores of the distribution has a smaller pore size and $d_{p50}$ is a median particle size where 50% of the particles of the distribution have a smaller particle size.

246. The proppant of any preceding or following embodiment/feature/aspect, wherein $R_p$ is from about 0.03 to about 0.05.

247. The proppant of any preceding or following embodiment/feature/aspect, wherein said proppant has at least one of the following characteristics:
  a. an overall diameter of from about 90 microns to about 2,000 microns;
  b. a Krumbein sphericity of at least about 0.5 and a roundness of at least about 0.5;
  c. a crush strength of about 10 MPa or greater;
  d. a specific gravity of from about 1.0 to about 3.0;
  e. a porosity of from about 6% to about 40%;
  f. at least 90% of proppant pores having a pore size of from about 0.1 µm to about 10 µm,
  g. and at least 80% of proppant pores are not in contact with each other.

248. The glass-ceramic, ceramic, metal or combinations thereof article of any preceding or following embodiment/feature/aspect, wherein said glass-ceramic, ceramic, metal or combinations thereof article can be used to form other products comprising a matrix materials, a concrete formulation, a composite reinforcement phase, a thermal insulating material, an electrical insulating material, an abrasive material, a catalyst substrate a catalyst support, a chromatography column material and a reflux tower material.

249. A method to prop open subterranean formation fractures comprising introducing a proppant formulation comprising the proppant of any preceding or following embodiment/feature/aspect into a subterranean formation.

250. A method of treating a subterranean producing zone penetrated by a well bore comprising the steps of
  a. preparing or providing a treating fluid that comprises a fluid, energized fluid, foam, or a gas carrier having the proppant of any preceding or following embodiment/feature/aspect suspended therein, and
  b. pumping said treating fluid into said subterranean producing zone whereby said particles are deposited therein.

251. The method of any preceding or following embodiment/feature/aspect, wherein said treating fluid is a fracturing fluid and said particles are deposited in fractures formed in said subterranean producing zone.

252. The method of any preceding or following embodiment/feature/aspect, wherein said treating fluid is a gravel packing fluid and said particles are deposited in said well bore adjacent to said subterranean producing zone.

253. A matrix comprising a plurality of the proppant of any preceding or following embodiment/feature/aspect and at least one solid matrix material in which the proppant is distributed.

254. A microsphere and/or pore containing ceramic proppant having one or more of the following characteristics:
  a) a majority of pores and/or microspheres in said proppant (excluding any optional central void) have a size of less than 50 cubic microns,
  b) a population of proppants (based on a 50 gram sample of proppants) have a specific gravity variance of +0.8 or less,
  c) a total porosity of 5% to 33% by volume of proppant (excluding any optional central void), wherein a majority of the pores/microspheres are not in contact with each other, d) the pores/microspheres are uniformly distributed in the proppant such that the pore/microsphere density is about the same throughout the proppant.

255. The microsphere and/or pore containing ceramic material of any preceding or following embodiment/feature/aspect, wherein said majority is 50% to 95% based on a count of total pores/microspheres present in said proppant excluding any central voids optionally present.

256. The microsphere and/or pore containing ceramic material of any preceding or following embodiment/feature/aspect, wherein said proppant has a crush strength of at least 2,000 psi.

257. The microsphere and/or pore containing ceramic material of any preceding or following embodiment/feature/aspect, wherein said proppant has a crush strength of at least 5,000 psi.

258. The proppant of any preceding or following embodiment/feature/aspect, wherein said pore/microsphere density is such that a sector of said proppant has a density of within +25% compared to a different sector of said proppant.

259. The proppant of any preceding or following embodiment/feature/aspect, wherein said proppant has a specific gravity of 1.0 to 2.6.

260. The proppant of any preceding or following embodiment/feature/aspect, wherein said specific gravity variance is +0.3 or less.

261. The proppant of any preceding or following embodiment/feature/aspect, wherein said proppant has all of said characteristics.

262. The proppant of any preceding or following embodiment/feature/aspect, wherein a) is present in said proppant and said size is less than 20 microns.

The present invention can include any combination of these various features or embodiments above and/or below as set forth in sentences and/or paragraphs. Any combination of disclosed features herein is considered part of the present invention and no limitation is intended with respect to combinable features.

The present invention will be further clarified by the following examples, which are intended to be exemplary of the present invention. Unless indicated otherwise, all percentages, ratios, and amounts are given on a weight basis.

EXAMPLES

Example 1

SiC-cordierite composites were made using ceramic processing. SiC powder (Grade 0.7 μm, Electro Abrasives Corporation, 701 Willet Road, Buffalo, N.Y. 14218) with an average particle size of 0.7 μm and a surface area (BET) of 10 $m^2$/g, and cordierite powder (KC-300, TradeGroup Asia Limited, Unit 2703 Golden Centre, 188 Des Voeux Road-Central, Hong Kong) with a particle size of 44 μm (−325 mesh), were employed. A series of test samples were prepared with different percentages of SiC powders homogenously mixed with the cordierite. The cordierite powder was attrition-milled to an average particle size of around 2 μm, and then mixed with the SiC powders in deionized (DI)-water, and ball-milled in a plastic jar with high purity alumina media, for 4 hours. The slurry was dried in an oven at 125° C. for 4-8 hours and the dry powder was sieved through a −80 mesh screen. Pellets Φ0.5"×0.2" uniaxially were pressed at 12 MPa and sintered at 1230° C.-1270° C. from 4 h to 6 h in air. After the sintering, the pellets were cleaned. The physical and mechanical properties were measured from the pellets. Specific gravity (SG) was determined by measuring the weight and dimensions of the pellets. The percentage of microsphere placement and/or size was determined by the formula below: Microsphere placement and/or size=100%−(Measured SG/Theoretical SG) %. Split tensile strength was determined by ASTM C 1144-89, "Standard Test Method for Splitting Tensile Strength for Brittle Nuclear Waste Forms." The results are summarized in the Table 1 below:

TABLE 1

Physical and Mechanical Properties of SiC-Cordierite Composites

| % SiC (wt %) | SG | Microsphere | Wt Gain % | Strength (MPa) |
|---|---|---|---|---|
| 0.0 | 2.39 | 4.4 | −1.47 | 36.2 |
| 5.0 | 2.24 | 9.8 | 0.57 | 37.2 |
| 7.5 | 2.16 | 12.8 | 1.59 | 37.4 |
| 10.0 | 2.12 | 14.1 | 3.70 | 37.5 |
| 15.0 | 1.99 | 18.9 | 5.79 | 30.3 |
| 20.0 | 1.77 | 27.5 | 8.17 | 23.0 |
| 25.0 | 1.64 | 32.5 | 10.75 | 20.3 |
| 30.0 | 1.68 | 30.5 | 13.00 | 18.2 |

The standard deviation for the split tensile strength was typically in the range of 20%-25% of the mean value.

From the results in Table 1, it can be seen that a significant drop in specific gravity (SG) can be achieved without reduction of strength with the SiC composites that were made as indicated. With an increasing percentage of SiC in the composite, the SG decreased due to the introduction of microspheres. The strength does not drop until the SiC loading is over 10% or microsphere volume is over 14% in the composites that were examined. Without adding the SiC (i.e., 0% SiC), the pellet lost about 1.5% of weight. However, weight gain was seen when adding SiC to the cordierite, which is believed to be due to reaction (1) above (the molar weight of SiC is 40 and the molar weight of $SiO_2$ is 60, thus weight gains after the oxidation). It is believed that the SiC may have at least two beneficial functions in this application: (1) formation of microspheres by its conversion into silica, (2) the melt/flow silica may glaze the inner surfaces of the microspheres, and thus improve the strength. The Figure is a SEM image taken from the fractured surface of a split-tested pellet, showing very fine, uniformly-distributed and narrowly-distributed microspheres. The SiC loading in this SiC-cordierite composition is 10%.

In FIG. 1, SEM Images are shown of the fractured surface of a split-tested pellet. Pellet composition: 10% SiC in the cordierite. Uniformly distributed microspheres were seen. Microsphere size was around 1-5 μm.

In the microsphere-forming process, the product $SiO_2$ softened at the forming temperature. With the CO gas formed, the $SiO_2$ expanded into the ceramics, which subsequently reacted with the rest of the ceramics, to form a glaze in the inner surface of the microsphere. This led to cure defects in the ceramics.

The same technique of microsphere forming by SiC oxidation would be applicable for other ceramics, such as alumina, mullite silica, and bauxite, or other metal oxides.

Example 2

Using the same process as in Example #1, 10% wt of SiC powder was mixed with the balance of mullite powder, MUL-COA 47® (C-E Minerals, King of Prussia, Pa.). The pellets were sintered at 1450° C. for 2 hours in air. The Table below shows the specific gravity, microsphere total volume and crush strength measured.

| Materials | SG | Microsphere placement and/or size | Strength psi |
|---|---|---|---|
| 10% SIC25-Mullite | 2.47 | 14.3% | 9570 |

Example 3

In this example, the effects of using pore formers in proppants were studied. In particular, a pore former, silicon carbide, was used in forming proppants. As a comparison, some proppants were prepared without pore formers. Specifically, proppants were prepared based on the components listed for each sample. In each case, the materials used to form the proppants were in powder form co-milled together in an attrition mill as a wet slurry (using water), and sprayed onto cenosphere templates (TG 425 grade template) to form green bodies. The sintering conditions (fired temperature) and time of sintering are provided for each sample. Prior to milling, each starting material had a size of 80 mesh or less. For the green bodies for each sample, a general mesh size of 300 to 500 microns was targeted with a median size of 430 to 450 microns for the green body. As can be seen by the results below, the use of a pore former, had a significant effect in reducing specific gravity, with only slight or without any significant effect on the crush strength. The amounts in percent (%) are by total weight of components present. The % fines are by weight of proppant tested and the testing procedure is based on API RP60. The ksi (kpsi) is the testing criterion for the amount of pressure applied to the proppants to determine the % weight fines. Upon analysis of the proppants by SEM, the proppants prepared with pore formers resulted in sintered proppants with pores wherein a majority of the pores did not contact each other and were uniformly distributed throughout the proppant body due to uniform mixing of the green materials used to form the green bodies.

For purposes of the tables below, the abbreviations have the following meaning (these abbreviations are trade designations):

AC300: pure alumina;
SG1174, SG1028/1158: various cenosphere grades that have been crushed;
HX-1: cordierite powder;
EA07 and GNP GS 16.5: silicon carbide powder.

Figure 11:
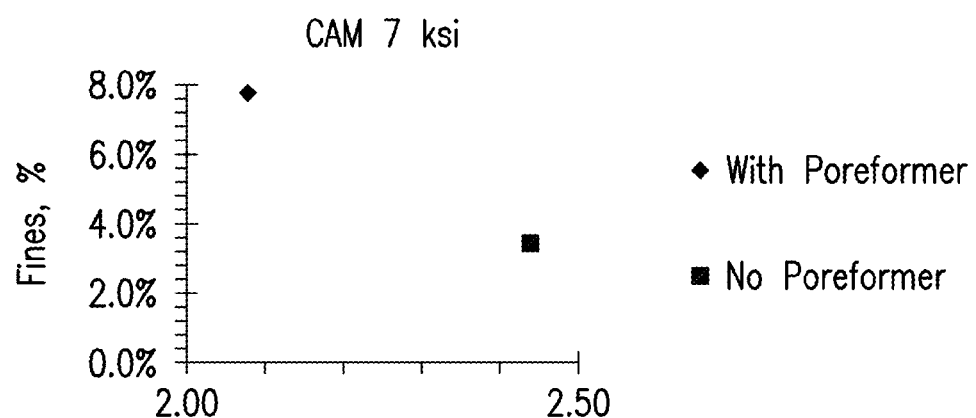
FIGS. 11 and 12 are graphs that compare the amount of fines in weight percent and specific gravity for certain proppants which contain pore formers and certain proppants which do not contain pore formers. As can be seen from the figures, proppants prepared with pore formers provided a proppant with a lower specific gravity and about the same crush strength.
Figure 12:
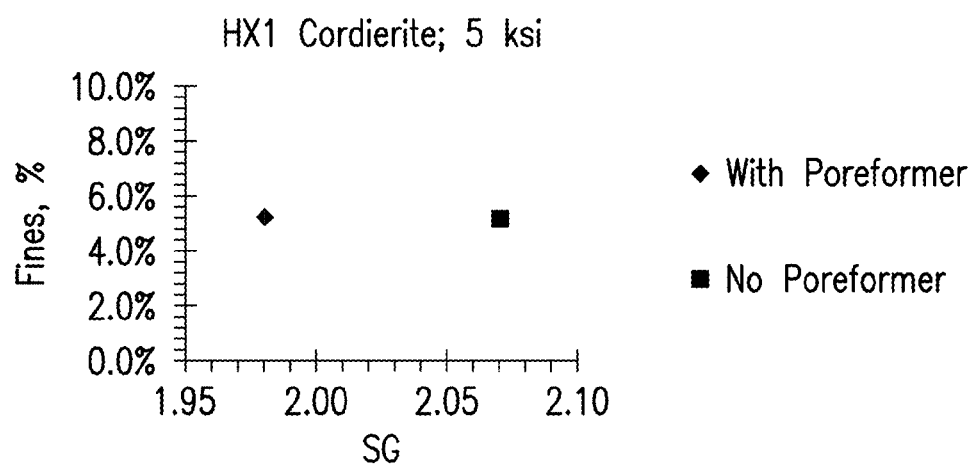

Samples without Pore Formers Present:

| | SG | % Fines | ksi | FIGURE reference |
|---|---|---|---|---|
| CAM: 50% SG1174 Cenospheres, 50% AC300 Alumina; Fired 1225° C./2 hrs. | 2.44 | 3.4% | 7 | FIG. 11 |
| Cordierite: P-00912; 100% HX-1 Cordierite; Fired 1260° C./6 hrs. | 2.07 | 5.0% | 5 | FIG. 12 |

Samples with Pore Formers Present:

| | SG | % Fines | ksi | FIGURE reference |
|---|---|---|---|---|
| CAM: 50% SG1028/1158 Cenospheres, 50% AC300 Alumina, 3% GNP GS 16.5 Silicon Carbide; Fired 1200° C./2 hrs. | 2.08 | 7.8% | 7 | FIG. 11 |

-continued

| | SG | % Fines | ksi | FIGURE reference |
|---|---|---|---|---|
| Cordierite: 90% HX-1 Cordierite, 10% EA07 Silicon Carbide; Fired 1260° C./3 hrs. | 1.98 | 5.3% | 5 | FIG. 12 |

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method for producing a microsphere containing particle, said method comprising
   a. forming a green body from a green body material that comprises at least one ceramic or ceramic precursor and a plurality of microsphere formers, wherein a majority of said microsphere formers are distributed in said green body such that the majority of said microsphere formers are not in contact with each other, and said microsphere formers have a substantially uniform shape and size;
   b. sintering said green body under sintering conditions to form a sintered body having a plurality of microspheres contained therein, and wherein said microspheres are each characterized by a void volume surrounded by a material different from said ceramic in said sintered body, and a majority of said microspheres are not in contact with each other.

2. The method of claim 1, wherein said ceramic or ceramic precursor comprises cordierite, mullite, bauxite, silica, spodumene, silicon oxide, aluminum oxide, sodium oxide, potassium oxide, calcium oxide, zirconium oxide, lithium oxide, iron oxide, spinet steatite, a silicate, a substituted alumino silicate clay, an inorganic nitride, an inorganic carbide, a non-oxide ceramic or any combination thereof.

3. The method of claim 1, wherein said ceramic or ceramic precursor has a particle size distribution, $d_{gs}$, from about 0.5 to about 15, wherein, $d_{gs} = \{(d_{g90} - d_{g10})/d_{g50}\}$ wherein $d_{g10}$ is a particle size wherein 10% of the particles have a smaller particle size, $d_{g50}$ is a median particle size wherein 50% of the particles have a smaller particle size, and $d_{g90}$ is a particle size wherein 90% of the particle volume has a smaller particle size.

4. The method of claim 1, wherein said ceramic or ceramic precursor comprises from about 90% by weight to about 99.9% by weight of said green body.

5. The method of claim 1, wherein said microsphere formers are capable of forming a glassy compound and a gas.

6. The method of claim 1, wherein said microsphere formers comprise a carbide, a nitride, an oxynitride, a sulfide, a halide, a boride or any combination thereof.

7. The method of claim 1, wherein said microsphere formers comprise an organometalic compound or a composite.

8. The method of claim 1, wherein said microsphere formers comprise a metallic alloy with at least one metal capable of forming an oxide vapor.

9. The method of claim 1, wherein said microsphere formers are silicon carbide.

10. The method of claim 5, wherein said glassy compound is silicon dioxide.

11. The method of claim 1, wherein said microsphere formers comprise a combustible inorganic or organic material.

12. The method of claim 1, wherein said microsphere formers at least partially decompose to generate a gas.

13. The method of claim 1, wherein said microsphere formers have a particle size distribution, $d_{fs}$, from about 0.5 to about 5.0, wherein, $d_{fs}=\{(d_{f90}-d_{f10})/d_{f50}\}$ wherein $d_{f10}$ is a particle size wherein 10% of the particles have a smaller particle size, $d_{f50}$ is a median particle size wherein 50% of the particles have a smaller particle size, and $d_{f90}$ is a particle size wherein 90% of the particles have a smaller particle size.

14. The method of claim 1, wherein said microsphere formers comprise from about 0.01% by weight to about 10% by weight of said green body.

15. The method of claim 1, wherein the green body material further comprises at least one sintering promoter comprising a sintering aid, a glassy phase formation agent, a grain growth inhibitor, a ceramic strengthening agent, a crystallization control agent, or phase formation control agent, or any combination thereof.

16. The method of claim 1, wherein said green body material further comprises yttrium oxide, cerium oxide and any combination thereof.

17. The method of claim 1, wherein said green body further comprises a hollow template.

18. The method of claim 1, wherein said sintering is performed in the presence of a gas.

19. The method of claim 18, wherein said gas comprises from about 100 ppm to about 100% by weight oxygen.

20. The method of claim 1, wherein said sintering is performed under a pressure of from about $1 \times 10^5$ Pa to about $5 \times 10^5$ Pa.

21. The method of claim 1, wherein said sintering creates reactive diffusion or local melting of said ceramic or ceramic precursor in said green body.

22. The method of claim 1, wherein said sintering is performed at a temperature from about 500° C. to about 2500° C. and said pressure is from about 0.1 MPa to about 200 MPa for about 1 hour to about 20 hours.

23. The method of claim 1, wherein at least 80% by total number, of said microspheres are not in contact with each other.

24. The method of claim 1, wherein said microsphere containing ceramic particle has a specific gravity of from about 1.8 to about 2.25, a microsphere placement and/or size of from about 1% to about 10%, a crush strength of from about 10 MPa to about 300 MPa, and a four point bending strength of about 50 MPa to about 400 MPa.

25. The method of claim 1, wherein said ceramic or ceramic precursor comprises at least one sedimentary material or at least one synthetically produced material or both.

26. A microsphere containing ceramic particle comprising a sintered body having a plurality of microspheres contained therein, and wherein said microspheres are each characterized by a void volume surrounded by a material that defines a wall and that is different from said sintered body, and a majority of said microspheres are not in contact with each other, and wherein said material is partially diffused into said sintered body.

27. The microsphere containing ceramic particle of claim 26, wherein said sintered body comprises at least in part cordierite, mullite, bauxite, silica, spodumene, silicon oxide, aluminum oxide, sodium oxide, potassium oxide, calcium oxide, zirconium oxide, lithium oxide, iron oxide, spinet steatite, a silicate, a substituted alumino silicate clay, an inorganic nitride, an inorganic carbide, a non-oxide ceramic or any combination thereof.

28. The microsphere containing ceramic particle of claim 26, wherein said sintered body further surrounds or encapsulates a cenosphere, a micro glass bead, a synthetic cenosphere, a polymer bead or any combination thereof.

29. The microsphere containing ceramic particle of claim 26, wherein said microsphere containing ceramic particle has a specific gravity of from about 0.8 to about 3.5, a microsphere total volume of from about 1% to about 49%, a crush strength of from about 10 MPa to about 300 MPa, and a four point bending strength of about 50 MPa to about 400 MPa.

30. The microsphere containing ceramic particle of claim 26, wherein said microsphere containing ceramic particle has a specific gravity of from about 1.8 to about 2.25, a microsphere total volume of from about 1% to about 10%, a crush strength of from about 10 MPa to about 300 MPa, and a four point bending strength of about 50 MPa to about 400 MPa.

31. The microsphere containing ceramic particle of claim 26, wherein said microsphere containing ceramic particle has $d_{ps}$ from about 0.4 to about 1.0, wherein $d_{ps}(d_{p90}-d_{p10})/d_{p50}$ and wherein $d_{p10}$ is a particle size wherein 10% of the particles have a smaller particle size, $d_{p50}$ is a median particle size wherein 50% of the particles have a smaller particle size, and $d_{90}$ is a particle size wherein 90% of the particles have a smaller particle size.

32. The microsphere containing ceramic particle of claim 26, wherein $R_p$ is from about 0.01 to about 0.1, wherein $R_p=d_{v50}/d_{p50}$ wherein $d_{v50}$ is a median microsphere size where 50% of the microspheres of the distribution has a smaller microsphere size and $d_{p50}$ is a median particle size where 50% of the particles of the distribution have a smaller particle size.

33. The microsphere containing ceramic particle of claim 26, wherein said sintered body comprises at least one material derived from at least one sedimentary material or at least one synthetically produced material or both.

34. The microsphere containing ceramic particle of claim 26, having one or more of the following characteristics:
a) a majority of microspheres in said particle (excluding any optional central void) have a size of less than 50 cubic microns,
b) a population of particles (based on a 50 gram sample of particles) have a specific gravity variance of ±0.8 or less,
c) a total porosity of 5% to 33% by volume of particle (excluding any optional central void), wherein a majority of the microspheres are not in contact with each other,
d) the microspheres are uniformly distributed in the particle such that the microsphere density is about the same throughout the particle.

35. The microsphere containing ceramic particle of claim 34, wherein said majority is 50% to 95% based on a count of total microspheres present in said particle excluding any central voids optionally present.

36. The microsphere containing ceramic particle of claim 34, wherein said particle has a crush strength of at least 2,000 psi.

37. The microsphere containing ceramic particle of claim 34, wherein said particle has a crush strength of at least 5,000 psi.

38. The microsphere containing ceramic particle of claim 34, wherein said microsphere density is such that a sector of said particle has a density of within ±25% compared to a different sector of said particle.

39. The microsphere containing ceramic particle of claim 34, wherein said particle has a specific gravity of 1.0 to 2.6.

40. The microsphere containing ceramic particle of claim 34, wherein said specific gravity variance is ±0.3 or less.

41. The microsphere containing ceramic particle of claim 34, wherein said particle has all of said characteristics.

42. The microsphere containing ceramic particle of claim 34, wherein a) is present in said particle and said size is less than 20 microns.

43. A method to prop open subterranean formation fractures comprising introducing a proppant formulation comprising the microsphere containing ceramic particle of claim 26 into a subterranean formation.

44. A method of treating a subterranean producing zone penetrated by a well bore comprising the steps of:
  a. preparing or providing a treating fluid that comprises a fluid, energized fluid, foam, or a gas carrier having the microsphere containing ceramic particle of claim 26 suspended therein, and
  b. pumping said treating fluid into said subterranean producing zone whereby said particles are deposited therein.

* * * * *